United States Patent
Gurevich et al.

(10) Patent No.: US 12,492,380 B2
(45) Date of Patent: Dec. 9, 2025

(54) METHODS FOR THE PRODUCTION OF HEPATOCYTES

(71) Applicants: FUJIFILM Cellular Dynamics, Inc., Madison, WI (US); FUJIFILM Holdings America Corporation, Valhalla, NY (US)

(72) Inventors: Igor Gurevich, Madison, WI (US); Sarah Burton, Madison, WI (US); Christie Munn, Madison, WI (US); Madelyn Donegan, Madison, WI (US); Katherine Czysz, Madison, WI (US); Deepika Rajesh, Madison, WI (US); Makiko Ohshima, Madison, WI (US)

(73) Assignees: FUJIFILM Cellular Dynamics, Inc., Madison, WI (US); FUJIFILM Holdings America Corporation, Valhalla, NY (US)

( * ) Notice: Subject to any disclaimer, the term of this patent is extended or adjusted under 35 U.S.C. 154(b) by 856 days.

(21) Appl. No.: 17/610,123

(22) PCT Filed: May 11, 2020

(86) PCT No.: PCT/US2020/032332
§ 371 (c)(1),
(2) Date: Nov. 9, 2021

(87) PCT Pub. No.: WO2020/227711
PCT Pub. Date: Nov. 12, 2020

(65) Prior Publication Data
US 2022/0220440 A1     Jul. 14, 2022

Related U.S. Application Data

(60) Provisional application No. 63/022,257, filed on May 8, 2020, provisional application No. 62/845,623, filed on May 9, 2019.

(51) Int. Cl.
| | | |
|---|---|---|
| *C12N 5/071* | (2010.01) | |
| *A61K 35/407* | (2015.01) | |
| *A61P 1/00* | (2006.01) | |
| *G01N 33/50* | (2006.01) | |

(52) U.S. Cl.
CPC ............ *C12N 5/067* (2013.01); *A61K 35/407* (2013.01); *A61P 1/00* (2018.01); *G01N 33/5067* (2013.01); *C12N 2500/02* (2013.01); *C12N 2500/62* (2013.01); *C12N 2500/90* (2013.01); *C12N 2501/115* (2013.01); *C12N 2501/119* (2013.01); *C12N 2501/12* (2013.01); *C12N 2501/15* (2013.01); *C12N 2501/155* (2013.01); *C12N 2501/16* (2013.01); *C12N 2501/165* (2013.01); *C12N 2501/727* (2013.01); *C12N 2502/1352* (2013.01); *C12N 2506/45* (2013.01); *C12N 2533/54* (2013.01)

(58) Field of Classification Search
None
See application file for complete search history.

(56) References Cited

U.S. PATENT DOCUMENTS

| | | |
|---|---|---|
| 2018/0119095 A1 | 5/2018 | Osafune et al. |
| 2018/0147242 A1 | 5/2018 | Miyajima et al. |
| 2019/0024044 A1 | 1/2019 | Kuppers-Munther |

FOREIGN PATENT DOCUMENTS

| | | |
|---|---|---|
| CN | 1439049 | 8/2003 |
| CN | 107532144 | 1/2018 |
| EP | 3401391 | 11/2018 |
| EP | 3401391 A1 * | 11/2018 |
| JP | 2009-520474 | 5/2009 |
| JP | 2014-519854 | 8/2014 |
| JP | 2016-503304 | 2/2016 |
| JP | 2016-517266 | 6/2016 |
| WO | WO 2001-081549 | 11/2001 |
| WO | WO 2007-071339 | 6/2007 |
| WO | WO 2012-178215 | 12/2012 |
| WO | WO 2014-083132 | 6/2014 |
| WO | WO 2014-124527 | 8/2014 |
| WO | WO 2016-104717 | 6/2016 |
| WO | WO 2016-131959 | 8/2016 |
| WO | WO 2016-148216 | 9/2016 |

OTHER PUBLICATIONS

Kim et al. "Enhanced metabolizing activity of human ES cell derived hepatocytes using 3D culture system with repeated exposure to xenobiotics". Society of Toxicology. (Year: 2015).*
Kaserman & Wilson, "Protocol for directed differentiation of human induced pluripotent stem cell (iPSCs) to a hepatic lineage" Methods Mol Biol. (Year: 2015).*
Sauer et al., "Induced pluripotent stem cells as a source of hepatocytes." Curr Pathobiol Rep. (Year: 2014).*
EMD Millipore. www.millipore.com. "Stem Cell Qualified ECM Gel" Data Sheet. Copyright 2008-2018 (Year: 2018).*
Kim et al., "Enhanced metabolizing activity of human ES cell-derived hepatocytes using a 3D culture system with repeated exposures to xenobiotics," *Toxicological Sciences*, 147(1):190-206, 2015.
Office Action issued in Japanese Application No. 2021-566542, mailed Mar. 26, 2024, and English translation thereof.
Office Action and Search Report issued in Chinese Application No. 202080034500.0, mailed Jun. 11, 2024, and English translation thereof.
Alsaeedi F, Wilson R, Candlish C, Ibrahim I, Leitch AC, Abdelghany TM, et al. Expression of serine/threonine protein kinase SGK1F promotes an hepatoblast state in stem cells directed to differentiate into hepatocytes. PLoS One. 2019;14(6):e0218135.

(Continued)

*Primary Examiner* — Robert M Kelly
*Assistant Examiner* — John David Moore
(74) *Attorney, Agent, or Firm* — pH IP Law

(57) ABSTRACT

The present disclosure provides methods of producing hepatocytes from induced pluripotent stem cells. Further provided herein are methods of using the hepatocytes for the treatment of a liver disease.

25 Claims, 54 Drawing Sheets

(56) References Cited

OTHER PUBLICATIONS

Bogacheva MS, Khan S, Kanninen LK, Yliperttula M, Leung AW, Lou YR. Differences in definitive endoderm induction approaches using growth factors and small molecules. J Cell Physiol. 2018;233(4):3578-89.

Cai et al., "Protocol for directed differentiation of human pluripotent stem cells toward a hepatocyte fate," *StemBook*, Bookshelf ID NBK133278, 2012.

Chen et al., "Rapid generation of mature hepatocyte-like cells from human induced pluripotent stem cells by an efficient three-step protocol," Hepatology. 55(4): 1193-1203, 2012.

Cheng X, Ying L, Lu L, Galvao AM, Mills JA, Lin HC, et al. Self-renewing endodermal progenitor lines generated from human pluripotent stem cells. Cell Stem Cell. 2012;10(4):371-84.

Chistiakov DA, Chistiakov PA. Strategies to produce hepatocytes and hepatocyte-like cells from pluripotent stem cells. Hepatol Res. 2012;42(2):111-9.

Du et al., "Highly efficient and expedited hepatic differentiation from human pluripotent stem cells by pure small-molecule cocktails," *Stem Cell Research & Therapy*, 9(1):58, 2018.

Freyer N, Knospel F, Strahl N, Amini L, Schrade P, Bachmann S, et al. Hepatic Differentiation of Human Induced Pluripotent Stem Cells in a Perfused Three-Dimensional Multicompartment Bioreactor. Biores Open Access. 2016;5(1):235-48.

Iwamuro M, Komaki T, Kubota Y, Seita M, Kawamoto H, Yuasa T, et al. Hepatic differentiation of mouse iPS cells in vitro. Cell Transplant. 2010;19(6):841-7.

Jellali R, Lereau Bernier M, Tauran Y, Gilard F, Danoy M, Kido T, et al. Metabolomic profiling during the differentiation of human induced pluripotent stem cells into hepatocyte-like cells. Differentiation. 2020;112:17-26.

Jin XR, Chen XS, Xiao L. MeCP2 Deficiency in Neuroglia: New Progress in the Pathogenesis of Rett Syndrome. Front Mol Neurosci. 2017;10:316.

Kanninen LK, Harjumaki R, Peltoniemi P, Bogacheva MS, Salmi T, Porola P, et al. Laminin-511 and laminin-521-based matrices for efficient hepatic specification of human pluripotent stem cells. Biomaterials. 2016;103:86-100.

Kaserman JE, Wilson AA. Protocol for Directed Differentiation of Human Induced Pluripotent Stem Cells (iPSCs) to a Hepatic Lineage. Methods Mol Biol. 2017;1639:151-60.

Kotaka et al., "Adrenergic receptor agonists induce the differentiation of pluripotent stem cell-derived hepatoblasts into hepatocyte-like cells," *Scientific Reports*, 7:16734, 2017.

Li Q, Hutchins AP, Chen Y, Li S, Shan Y, Liao B, et al. A sequential EMT-MET mechanism drives the differentiation of human embryonic stem cells towards hepatocytes. Nat Commun. 2017;8:15166.

Li X, Yuan J, Li W, Liu S, Hua M, Lu X, et al. Direct differentiation of homogeneous human adipose stem cells into functional hepatocytes by mimicking liver embryogenesis. J Cell Physiol. 2014;229(6):801-12.

Lin R, Wang Y, Ji K, Liu Z, Xiao S, Zhou D, et al. Bioinformatics analysis to screen key genes implicated in the differentiation of induced pluripotent stem cells to hepatocytes. Mol Med Rep. 2018;17(3):4351-9.

Liu H, Ye Z, Kim Y, Sharkis S, Jang YY. Generation of endoderm-derived human induced pluripotent stem cells from primary hepatocytes. Hepatology. 2010;51(5):1810-9.

Mahmoodinia Maymand M, Soleimanpour-Lichaei HR, Ardeshirylajimi A, Soleimani M, Mirzaei S, Hajarizadeh A, et al. Hepatogenic Differentiation of Human Induced Pluripotent Stem cells on Collagen-Coated Polyethersulfone Nanofibers. ASAIO J. 2017;63(3):316-23.

Mallanna and Duncan, "Differentiation of hepatocytes from pluripotent stem cells," Curr Protoc Stem Cell Biol 26:1G.4.1-1G.4.13, 2013.

Matoba N, Yamashita T, Takayama K, Sakurai F, Mizuguchi H. Optimal human iPS cell culture method for efficient hepatic differentiation. Differentiation. 2018;104:13-21.

Mobarra N, Soleimani M, Kouhkan F, Hesari Z, Lahmy R, Mossahebi-Mohammadi M, et al. Efficient Differentiation of Human Induced Pluripotent Stem Cell (hiPSC) Derived Hepatocyte-Like Cells on hMSCs Feeder. Int J Hematol Oncol Stem Cell Res. 2014;8(4):20-9.

Palakkan AA, Nanda J, Ross JA. Human Induced Pluripotent Stem Cell-Derived Definitive Endoderm Bulk Culture and Hepatic Differentiation. Methods Mol Biol. 2019;1994:41-53.

Pauwelyn K, Roelandt P, Notelaers T, Sancho-Bru P, Fevery J, Verfaillie CM. Culture of mouse embryonic stem cells with serum but without exogenous growth factors is sufficient to generate functional hepatocyte-like cells. PLoS One. 2011;6(8):e23096.

PCT International Preliminary Report on Patentability issued in International Application No. PCT/US2020/032332, mailed Nov. 18, 2021.

PCT International Search Report and Written Opinion issued in International Application No. PCT/US2020/032332, mailed Aug. 7, 2020.

Ramasamy TS, Yu JS, Selden C, Hodgson H, Cui W. Application of three-dimensional culture conditions to human embryonic stem cell-derived definitive endoderm cells enhances hepatocyte differentiation and functionality. Tissue Eng Part A. 2013;19(3-4):360-7.

Roelandt P, Vanhove J, Verfaillie C. Directed differentiation of pluripotent stem cells to functional hepatocytes. Methods Mol Biol. 2013;997:141-7.

Shan et al., "Identification of small molecules for human hepatocyte expansion and iPS differentiation," *Nat Chem Biol.*, 9(8):514-520, 2013.

Sullivan GJ, Hay DC, Park IH, Fletcher J, Hannoun Z, Payne CM, et al. Generation of functional human hepatic endoderm from human induced pluripotent stem cells. Hepatology. 2010;51(1):329-35.

Vosough M, Omidinia E, Kadivar M, Shokrgozar MA, Pournasr B, Aghdami N, et al. Generation of functional hepatocyte-like cells from human pluripotent stem cells in a scalable suspension culture. Stem Cells Dev. 2013;22(20):2693-705.

Office Action issued in Chinese Application No. 202080034500.0, mailed May 27, 2025, and English translation thereof.

\* cited by examiner

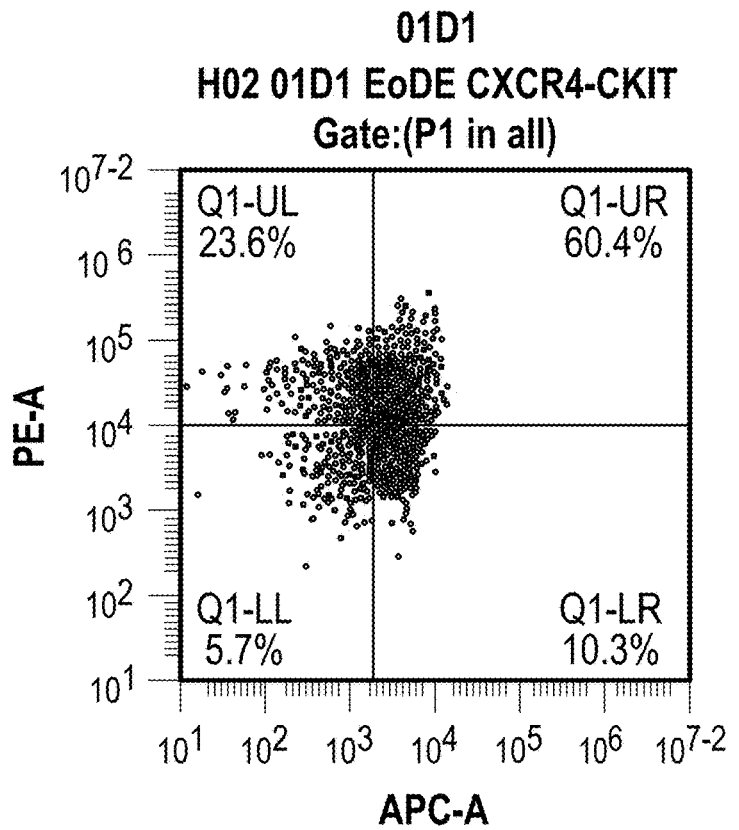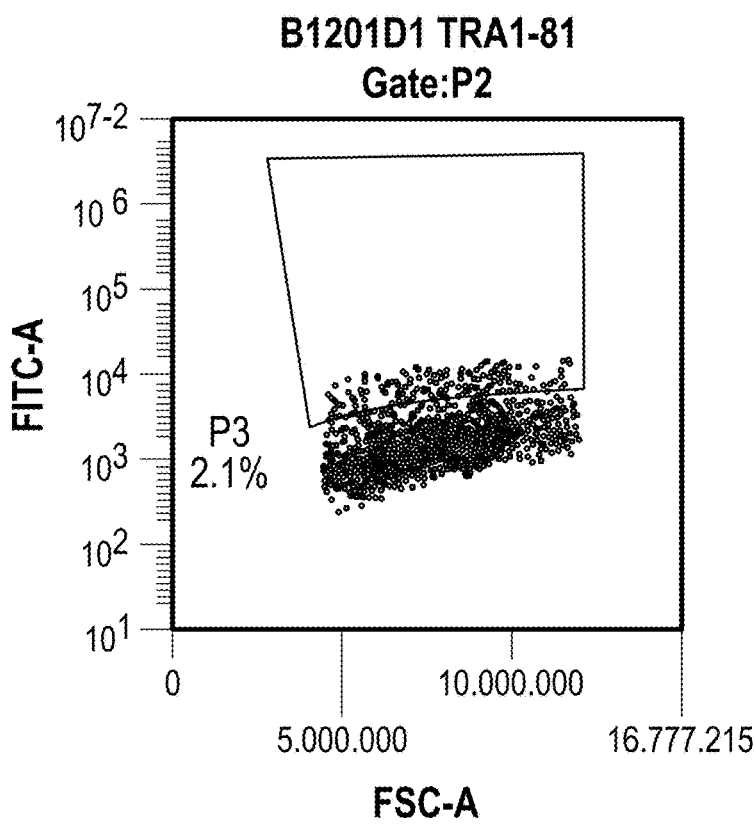
FIG. 6 Cont.

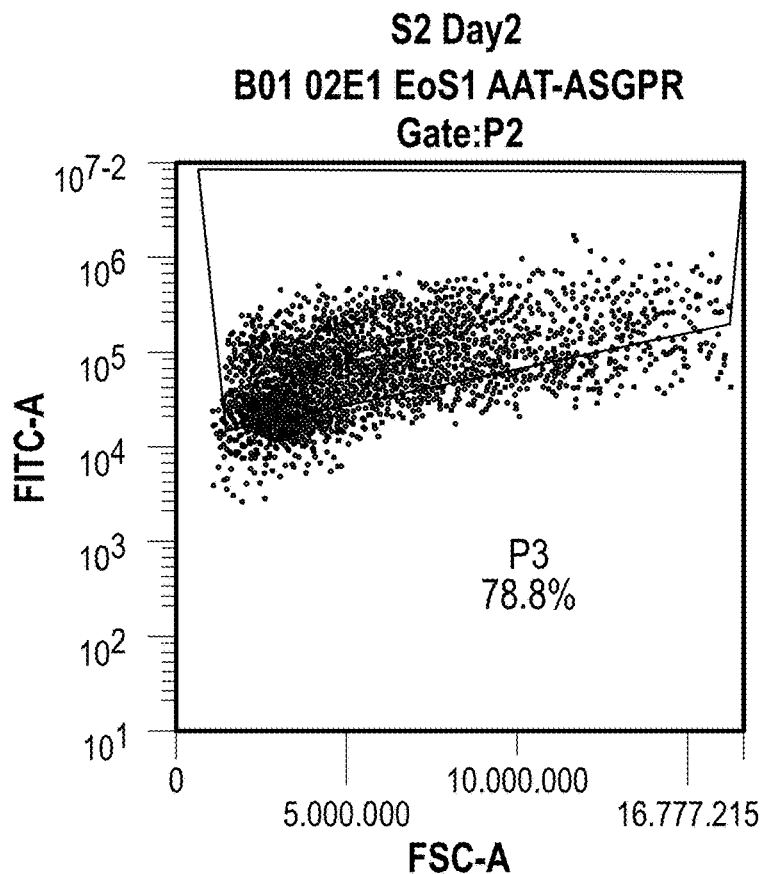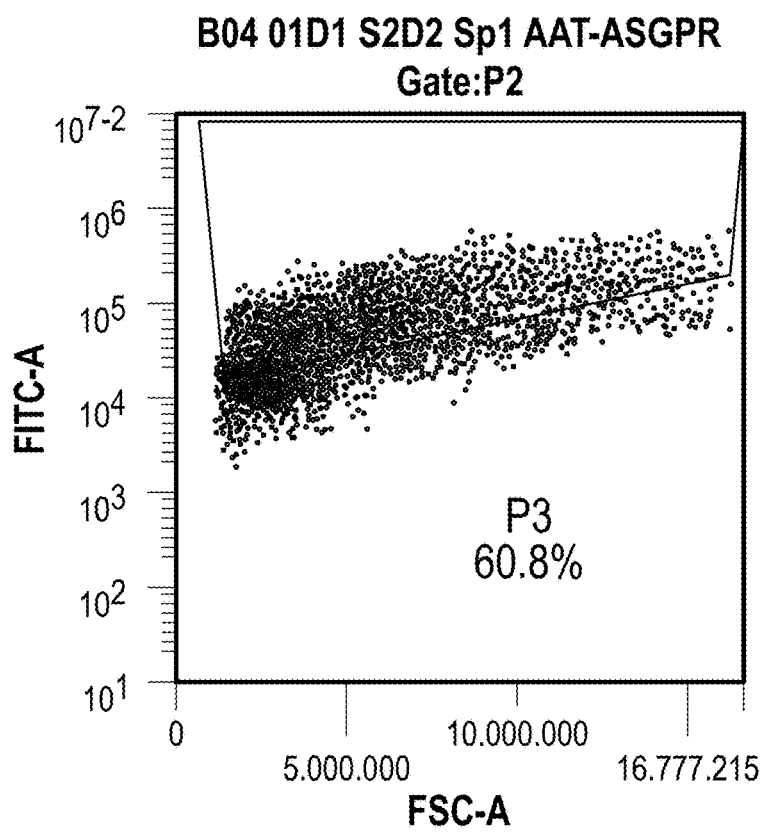
FIG. 9 Cont.

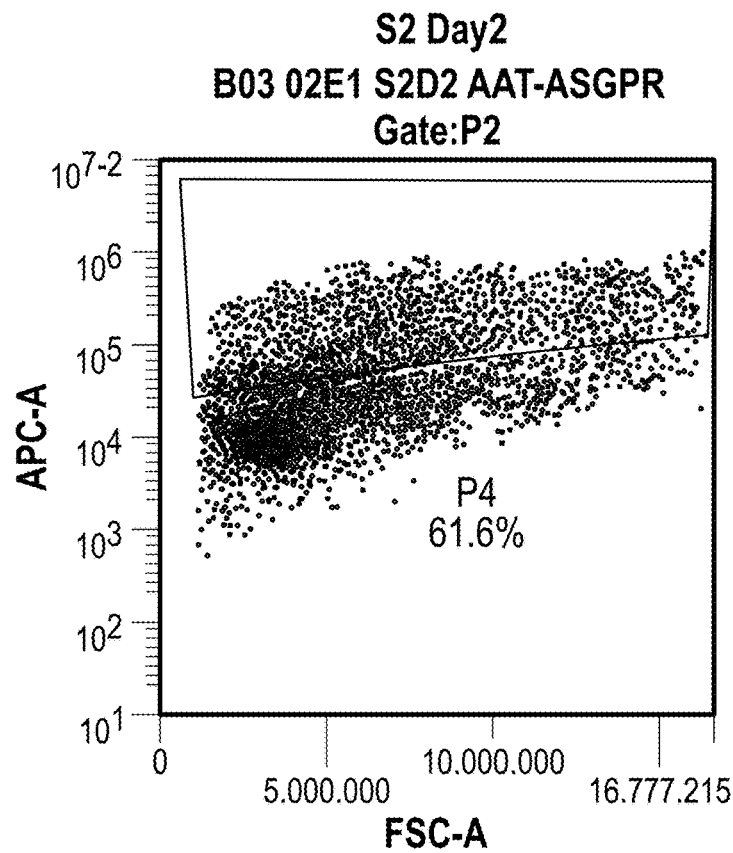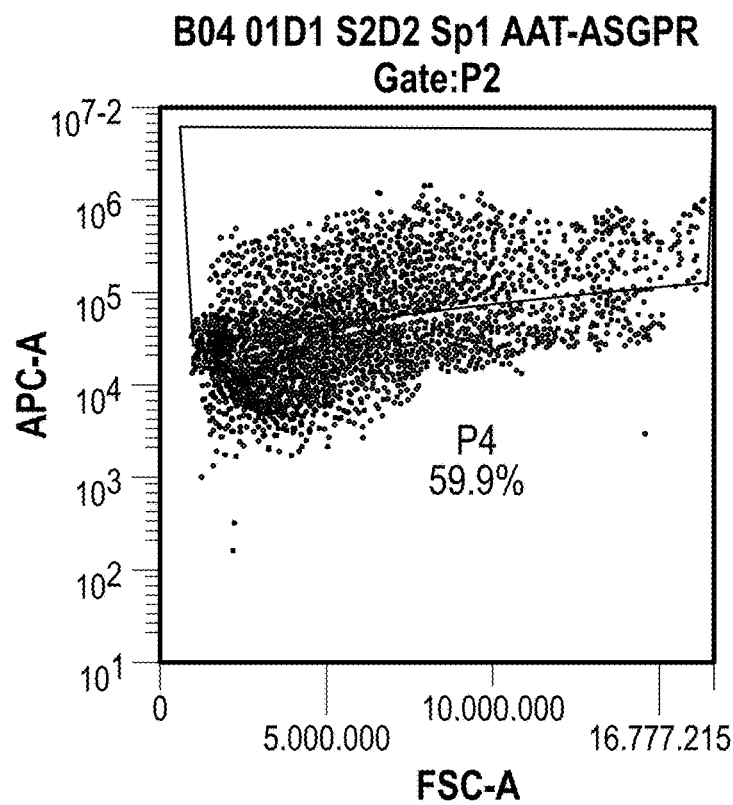
FIG. 10 Cont.

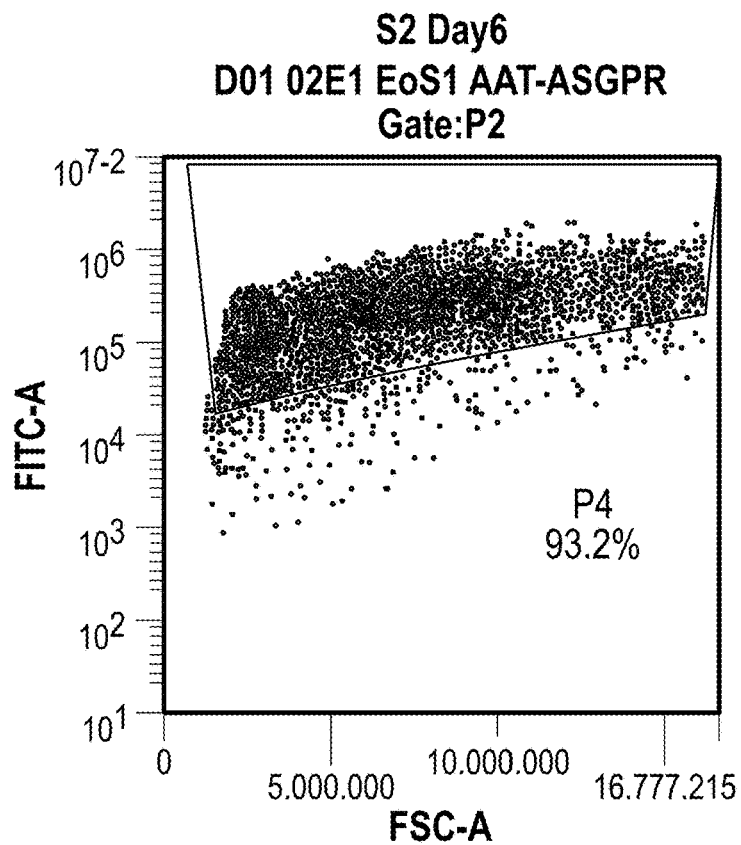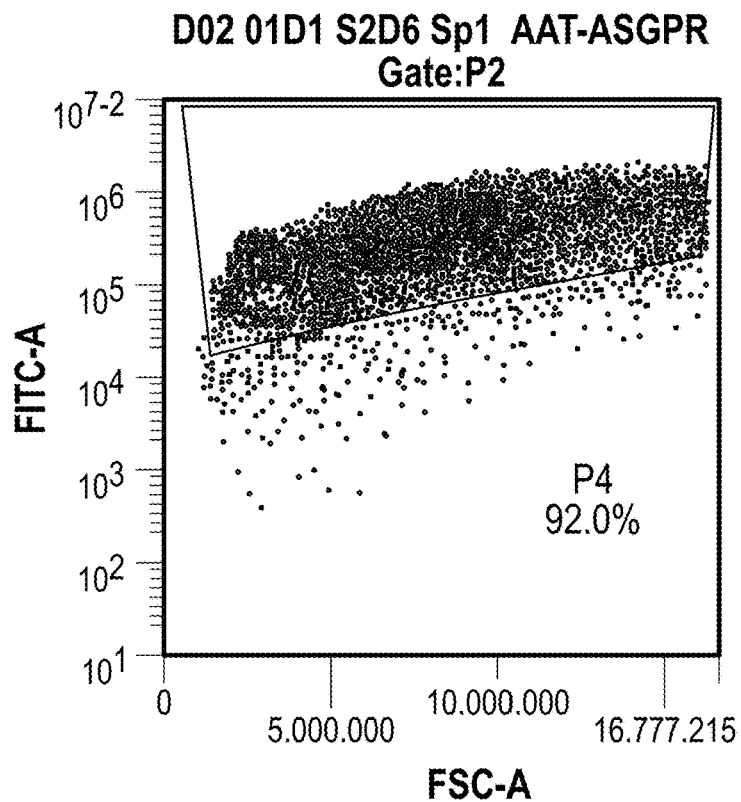
FIG. 10 Cont.

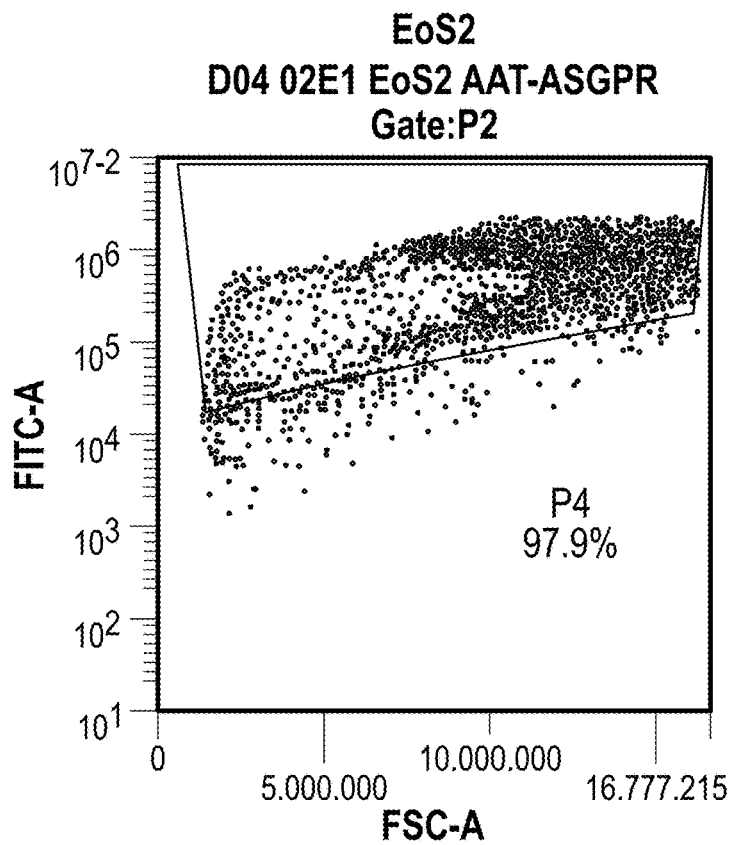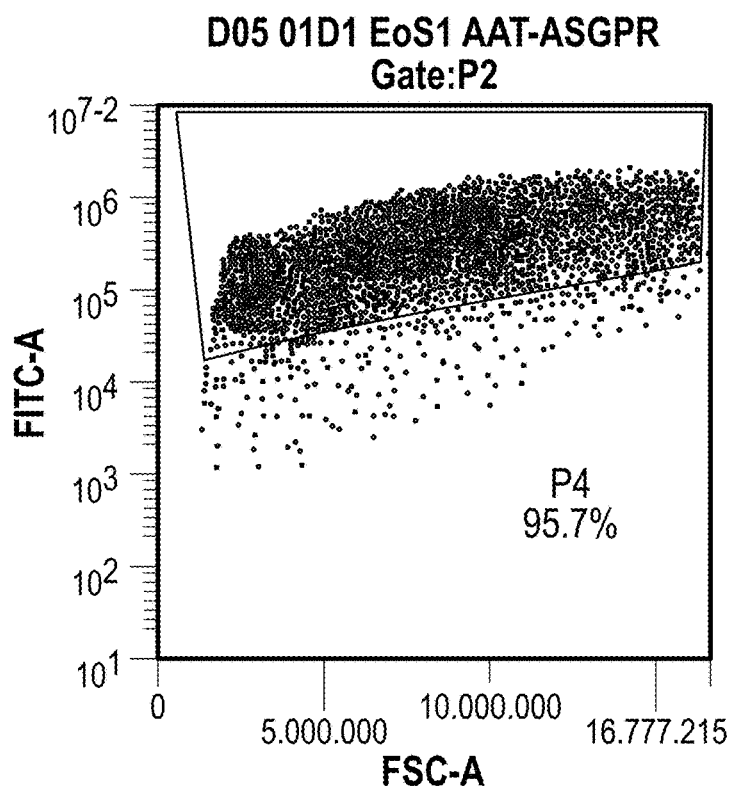
FIG. 10
Cont.

| Stage 3 Hep A | | Stage 3 Hep B | | Stage 3 Hep C | | Stage 3 Hep D | | Stage 3 Hep E | |
|---|---|---|---|---|---|---|---|---|---|
| Williams'E | | Williams'E | | Williams'E | | Williams'E | | Williams'E | |
| B27 + RA | 2% | B27 + RA | 2% | B27 + RA | 2% | B27 + RA | 2% | B27 + RA | 2% |
| OSM | 20ng/mL | OSM | 20ng/mL | OSM | 20ng/mL | OSM | 20ng/mL | OSM | 20ng/mL |
| Dex | 0.2μM | Dex | 0.2μM | Dex | 0.2μM | Dex | 0.2μM | Dex | 0.2μM |
| BIT9500 | 5% | BIT9500 | 5% | BIT9500 | 5% | BIT9500 | 5% | BIT9500 | 5% |
| Pen/Strep | 1% | Pen/Strep | 1% | Pen/Strep | 1% | Pen/Strep | 1% | Pen/Strep | 1% |
| SB431542 | 10μM | FH1 and FPH1 | 5-10μM | Methoximine | 5-10μM | EPO | 2U/ML | Src Kinase Inhibitors | 0.5-5μM |
| DAPT | 2μM | | | | | IGF-I/IGF-II, TGFa | 5-25ng/ML | | |

FIG. 17

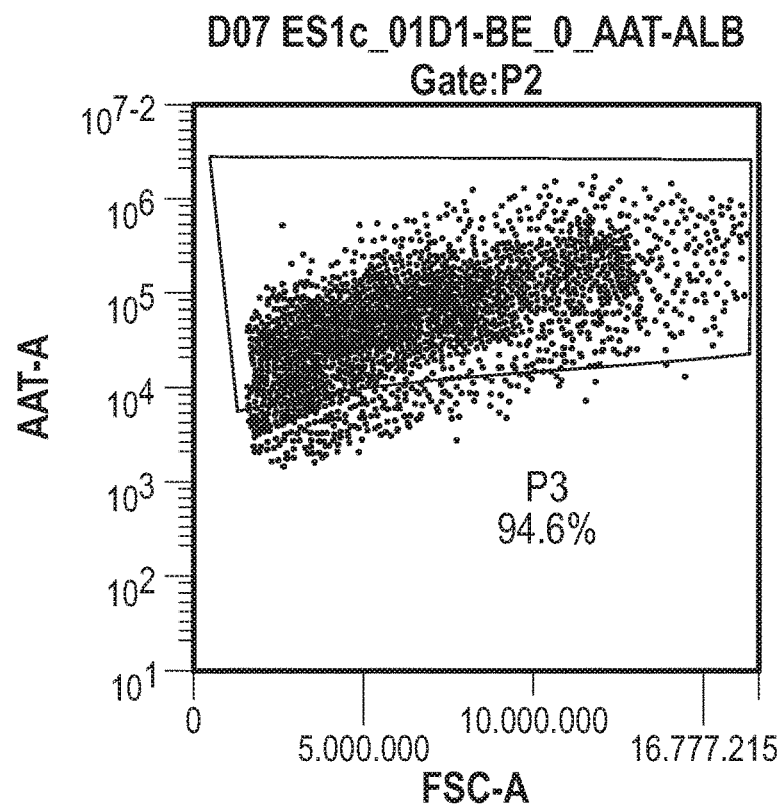
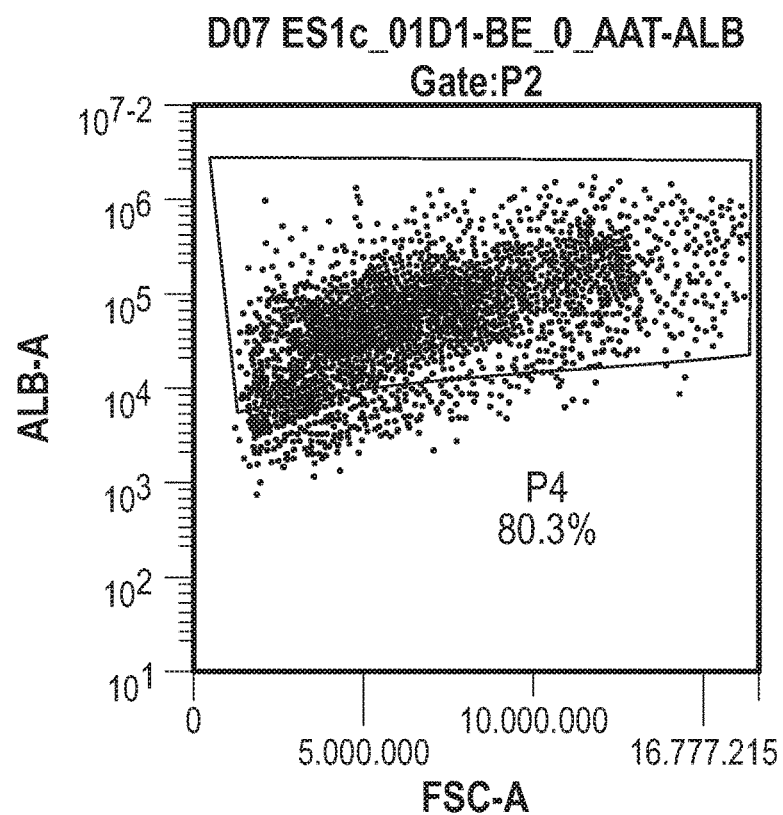
FIG. 18

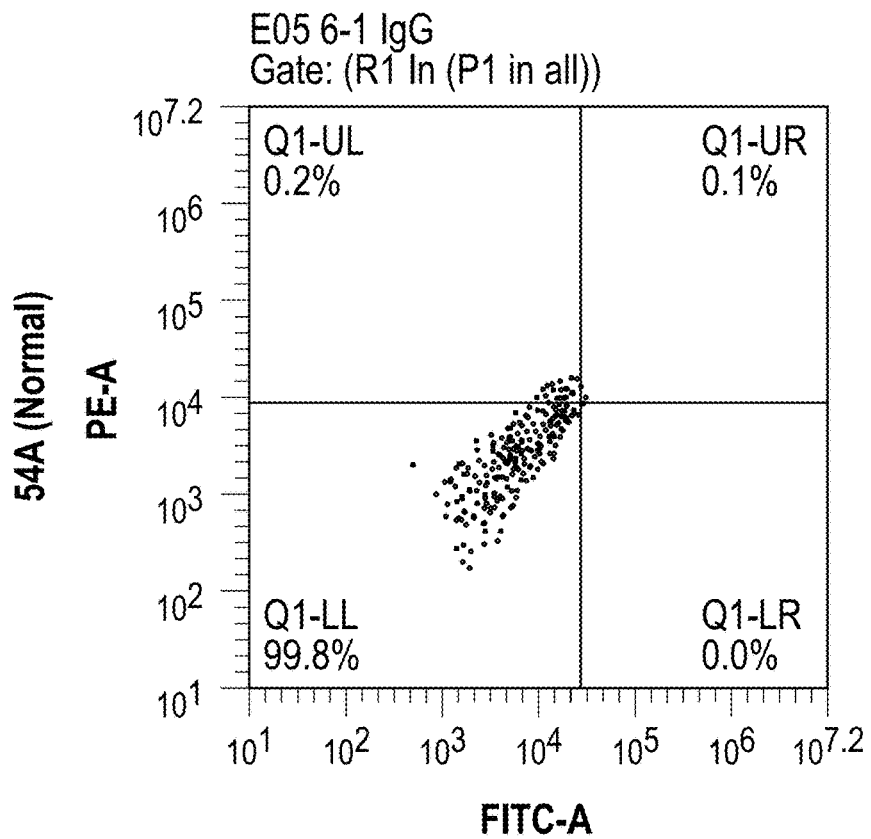
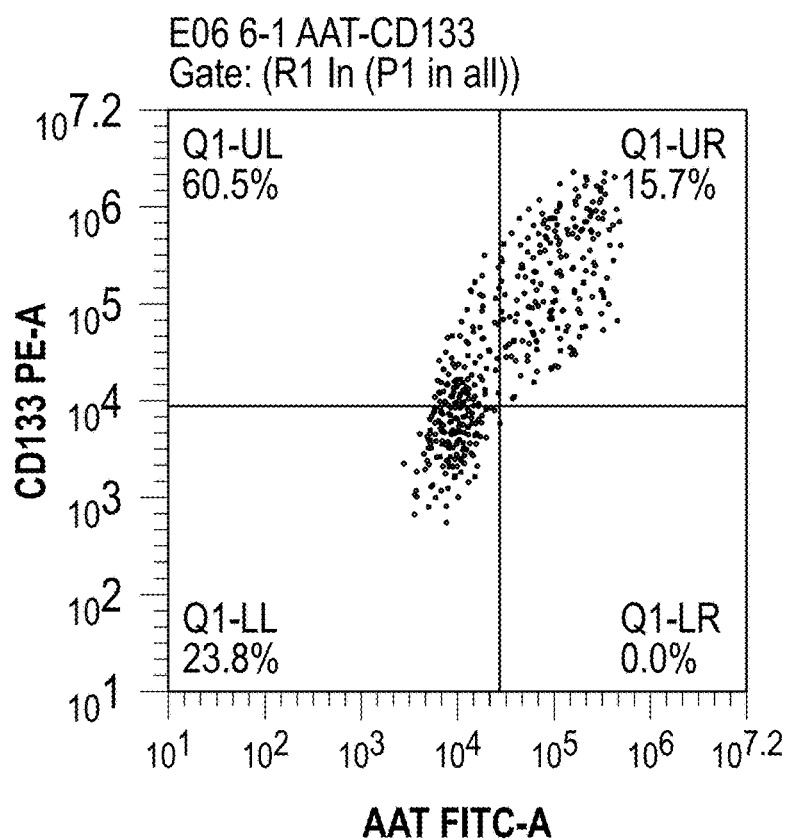
FIG. 21B Cont.

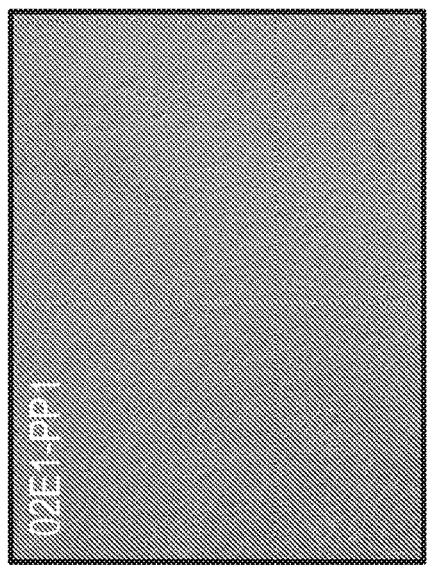
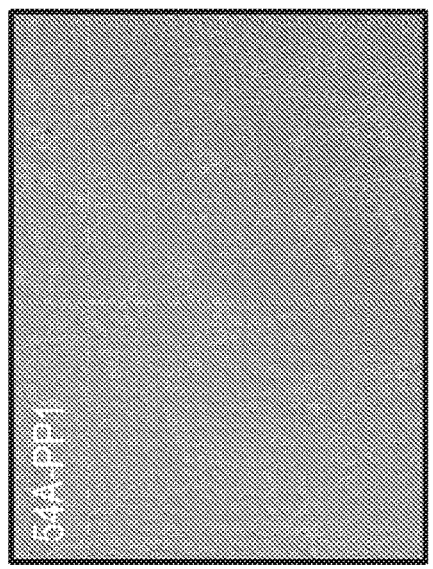
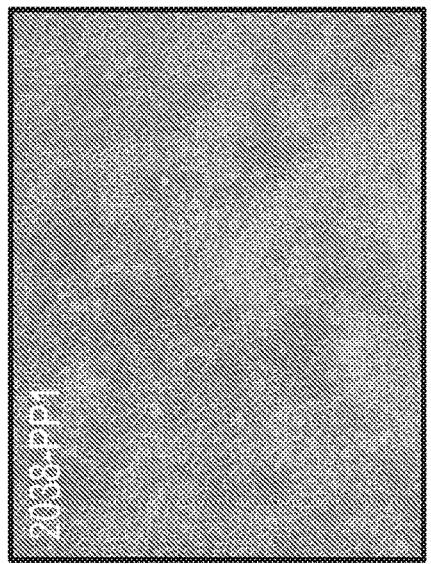
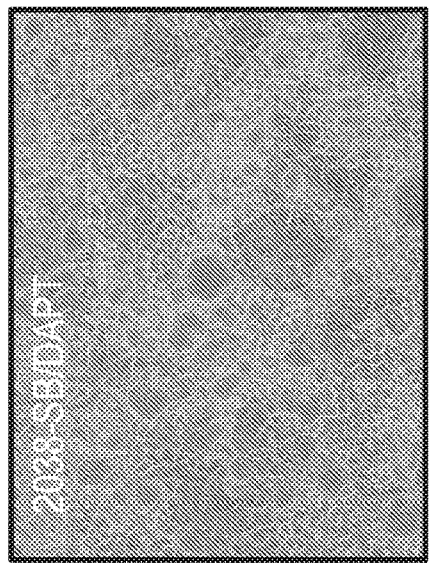
FIG. 23

| | |
|---|---|
| 1 | Stage 3 Hepatocytes |
| 2 | IPSC Derived Macrophages (IPSC Derived Kupffer cells) |
| 3 | MSC (IPSC Derived Stellate cells) |
| 4 | Endothelial cells |
| 5 | Hepatocytes/Macrophages |
| 6 | Macrophages/Mesenxhymal cells |
| 7 | Macrophages/Endothelial cells |
| 8 | Mesenchymal cells/Endothelial cells |
| 9 | Hepatocytes/Endothelial cells |
| 10 | Hepatocytes/Mesenchymal cells |
| 11 | Hepatocytes/Macrophages/Mesenchymal cells |
| 12 | Macrophages/Mesenchaymal cells/Endothelial cells |
| 13 | Hepatocytes/Macrophages/Endothelial cells |
| 14 | Hepatocytes/Macrophages/Mesenchymal cells/Endothelial cells |

FIG. 28A

METHODS FOR THE PRODUCTION OF HEPATOCYTES

This application is a national phase application under 35 U.S.C. § 371 of International Application No. PCT/US2020/032332, filed May 11, 2020, which claims the benefit of U.S. Provisional Patent Application Nos. 62/845,623, filed May 9, 2019, and 63/022,257, filed May 8, 2020, each of which is incorporated herein by reference in its entirety.

BACKGROUND

1. Field

The present invention relates generally to the field of molecular biology and medicine. More particularly, it concerns methods of directed differentiation of induced pluripotent stem cells to hepatocytes.

2. Description of Related Art

In mammals the liver plays a pivotal role for diverse functions, including protein synthesis, metabolism, detoxification and excretion. Reproducing all or most of these functions in isolated liver cells is a major challenge. Availability of viable, functional hepatocytes would be been highly beneficial for pharmacological and toxicological evaluation, creating cellular models for pathophysiological analysis of diseases, generating bioartificial liver support and regenerative therapy of the liver. Orthotopic liver transplantation can replace virtually all liver functions and rescue patients with acute and chronic liver failure, as well as monogenic liver diseases, such as Crigler-Najjar Syndrome type 1, alpha-1 antitrypsin deficiency, primary hyperoxaluria, etc.

Because liver transplantation is a formidable and expensive procedure, and is dependent on the immediate availability of livers, hepatocyte transplantation is being explored as a minimally invasive alternative to organ transplantation for many of these disorders. However, the severe shortage of donor livers, which are prioritized normally for organ transplantation, limits drastically the availability of usable livers for isolating primary hepatocytes. The problem is compounded by the fact that primary hepatocytes rapidly deteriorate in function in culture and their viability after cryopreservation is extremely variable. Therefore, there is a great need for alternative renewable sources of human hepatocytes. Tissue stem cells, such as mesenchymal and hematopoietic stem cells, liver progenitor cells and pluripotent stem cells are being evaluated as sources of human hepatocytes. There is an unmet need for methods for differentiation of induced pluripotent stem cells (iPSC) into hepatocytes.

SUMMARY

In a first embodiment, the present disclosure provides a method for producing hepatocytes comprising: (a) culturing pluripotent stem cells (PSCs) in the presence of a GSK-3 inhibitor to provide pre-conditioned PSCs; (b) differentiating the pre-conditioned PSCs to definitive endoderm (DE) cells; (c) culturing the DE cells to induce formation of hepatoblasts; and (d) differentiating the hepatoblasts to hepatocytes. In certain aspects, the PSCs are induced pluripotent stem cells (iPSCs). In some aspects, the method comprises: (a) culturing iPSCs in the presence of a GSK-3 inhibitor to provide pre-conditioned iPSCs; (b) differentiating the pre-conditioned iPSCs to definitive endoderm (DE) cells; (c) culturing the DE cells to induce formation of hepatoblasts; and (d) differentiating the hepatoblasts to hepatocytes. In some aspects, the hepatocytes are human.

In certain aspects, the iPSCs are pre-conditioned for 1-3 days, such as 1, 2, or 3 days. In some aspects, the GSK3 inhibitor is CHIR99021, BIO, SB216763, CHIR98014, TWS119, SB415286, and Tideglusib. In some aspects, the GSK3 inhibitor is CHIR99021. In particular aspects, the CHIR99021 is at a concentration of 1-5 µM, such as 1, 2, 3, 4, or 5 µM. In certain aspects, the iPSCs are pre-conditioned in media essentially free of or free of ascorbic acid.

In some aspects, one or more of steps (a)-(d) are performed under xeno-free conditions, feeder-free conditions, or conditioned-media free conditions. In particular aspects, each of steps (a)-(d) are performed under xeno-free conditions, feeder-free conditions, or conditioned-media free conditions. In some aspects, the xeno-free conditions comprise using defined media.

In some aspects, differentiating to DE cells comprises sequentially culturing the iPSCs in a first endoderm induction media (EIM) comprising Activin A, a second EIM comprising BMP4, VEGF, and bFGF, and a third EIM comprising VEGF and DMSO. In some aspects, differentiating to DE cells is for 8-10 days, such as 8, 9, or 10 days. In certain aspects, the DE cells are positive for CXCR4, CD117, FOXA1, FOXA2, EOMES, and/or HNF4α.

In certain aspects, step (c) comprises culturing DE cells in hepatocyte induction media (HIM) comprising HGF, BMP4, FGF10, FGF2, VEGF, EGF, dexamethasone, and/or DMSO. In particular aspects, step (c) comprises culturing DE cells in HIM comprising BMP4, HGF, and FGF10. In some aspects, step (c) comprises culturing DE cells in HIM comprising HGF, BMP4, FGF10, FGF2, VEGF, EGF, dexamethasone, and DMSO. In specific aspects, the HGF is at a concentration of 20-30 ng/mL, such as 20, 21, 22, 23, 24, 25, 26, 27, 28, 29, or 30 ng/mL. In some aspects, inducing is for 5-7 days, such as 5, 6, or 7 days.

In some aspects, the method comprises forming aggregates after inducing hepatoblasts. In particular aspects, steps (a) and (b) are essentially free of aggregates.

In certain aspects, the cells are cultured on an extracellular matrix. In some aspects, the extracellular matrix is MATRIGEL®, Collagen I, or laminin. In specific aspects, the extracellular matrix is MATRIGEL®. In some aspects, the extracellular matrix is basement membrane extract (BME) purified from murine Engelbreth-Holm-Swarm tumor. In certain aspects, the extracellular matrix is GELTREX™.

In some aspects, the hepatoblasts are digested prior to step (d). In certain aspects, differentiating comprises culturing the hepatoblasts in hepatocyte differentiation media (HDM) comprising bFGF, HGF, oncostatin M, and DMSO. In particular aspects, the HDM further comprises a GSK3 inhibitor. In some aspects, the HDM is essentially free of VEGF and EGF. In some aspects, differentiating of step (d) is for 8-10 days, such as 8, 9, or 10 days.

In particular aspects, steps (a)-(c) are performed under hypoxic conditions. In some aspects, step (d) comprises culturing the cells under hypoxic conditions for a first differentiation period and under normoxic conditions for a second differentiation period. In specific aspects, the first differentiation period and second differentiation period are each 3-5 days, such as 3, 4, or 5 days.

In additional aspects, the method further comprises culturing the hepatocytes in maturation media comprising dexamethasone and oncostatin M. In some aspects, the hepatocytes are cultured on Collagen I during maturation. In other aspects, the hepatocytes are cultured on MATRIGEL®, Collagen I, laminin, basement membrane extract (BME) purified from murine Engelbreth-Holm-Swarm tumor, or GELTREX™.

In some aspects, the maturation media further comprises a SRC kinase inhibitor. In certain aspects, the SRC kinase inhibitor is bosutinib, dasatinib, A419259, alsterpaullone, AZM475271, AZM475271, or PP1. In particular aspects, the maturation media further comprises EPO. In some aspects, the maturation media further comprises a γ-secretase inhibitor. For example, the γ-secretase inhibitor is DAPT. In certain aspects, the maturation media further comprises a TGFβ inhibitor. In some aspects, the TGFβ inhibitor is SB431542, SB525334, SB431542-505124, Lefty, A 83-01, D 4476, GW 788388, LY 364847, R 268712 or RepSox. For example, the TGFβ inhibitor is SB431542. In particular aspects, the maturation media further comprises a MEK inhibitor, such as PD0325901. In some aspects, the MEK inhibitor is PD0325901, GSK1120212, MEK162, RDEA119, and AZD6244. In certain aspects, the maturation media further comprises EPO, IGF1, IGF2, and/or TGFα. In some aspects, the maturation media further comprises antiapoptotic compound XMU-MP1. In certain aspects, the maturation media further comprises FH1, FPH1, and/or methoxamine (e.g., 15 µM FH1, 15 FPH1, and 1 µM methoxamine).

In additional aspects, the method further comprises selecting for CD133-positive cells. In some aspects, at least 70%, 80% or 90% of the mature hepatocytes are positive for alpha anti trypsin (AAT). In certain aspects, at least 40%, 50% or 60% of the mature hepatocytes are positive for albumin. In some aspects, at least 70%, 80%, or 90% of the mature hepatocytes are positive for albumin.

In some aspects, the method further comprises co-culturing the mature hepatocytes in the presence of mesenchymal stem cells (MSCs) or MSC conditioned medium supplemented with one or more Src kinase inhibitors. In some aspects, the method further comprises co-culturing the mature hepatocytes in the presence of macrophages with one or more Src kinase inhibitors. In some aspects, the method further comprises co-culturing the mature hepatocytes in the presence of endothelial cells with one or more Src kinase inhibitors. In some aspects, the method further comprises co-culturing the mature hepatocytes in the presence of MSCs, macrophages and endothelial cells with one or more Src kinase inhibitors to generate liver organoids.

In further aspects, the method further comprises cryopreserving the mature hepatocytes as aggregates.

In another embodiment, there is provided a composition comprising hepatocyte cells, at least 90% (e.g., 91%, 92%, 93%, 94%, 95%, 96%, 97%, 98%, 99%, or 100%) positive for AAT and/or at least 80% positive for albumin. In some aspects, the composition is xeno-free, feeder-free, conditioned-media free, and defined.

In a further embodiment, there is provided a method of treating a subject with a liver disease comprising administering to the subject an effective amount of hepatocytes produced by the present embodiments. In some aspects, the liver disease is acute liver disease, chronic liver disease, or inherited impairment of liver function. In certain aspects, administering comprises hepatocyte transplantation.

Further provided herein is a platform for predictive toxicology comprising hepatocytes produced by the method of the present embodiments.

Further provided herein is a composition comprising hepatocytes produced by the method of the present embodiments. Also provided herein is the composition comprising hepatocytes produced by the method of the present embodiments for use in the treatment of a liver disease in a subject.

Further embodiments comprise the composition of the present hepatocytes for use in the treatment of a liver disease in a subject. Additional embodiments comprise the composition for use in disease modeling or drug discovery. In some aspects, the liver disease is non-alcoholic fatty steatohepatitis (NASH). In particular aspects, the drug discovery identifies a target for NASH, acute liver disease, chronic liver disease, or inherited impairment of liver function.

Another embodiment provides a method of performing methylation-based analysis for the identification of candidate agents for the treatment of a disease, wherein the method comprises performing omics-based analysis on a composition of the present embodiments. In some aspects, the disease is NASH, acute liver disease, chronic liver disease, or inherited impairment of liver function.

A further embodiment provides a method for performing high-throughput screening to identify a therapeutic agent comprising contacting 3D aggregates of mature hepatocytes derived according to the methods of the present embodiments with a plurality of candidate agents and measuring function of said mature hepatocytes. In some aspects, the 3D aggregates of mature hepatocytes are cocultured with MSCs, macrophages, endothelial cells, or MSC conditioned medium supplemented with one or more Src kinase inhibitors. In other aspects, the 3D aggregates of mature hepatocytes are cultured in the absence of other cell types.

In yet another embodiment, there is provided an in vitro model of liver disease comprising mature hepatocytes derived according to the present embodiments. In some aspects, the mature hepatocytes are cocultured with MSCs, macrophages, endothelial cells, or MSC conditioned medium supplemented with one or more Src kinase inhibitors. In certain aspects, the mature hepatocytes are cultured in the absence of other cell types. In particular aspects, the liver disease is acute liver disease, chronic liver disease, or inherited impairment of liver function, or fatty liver disease. In specific aspects, the fatty liver disease is NASH. In some aspects, the mature hepatocytes undergo lipidosis, such as spontaneous lipidosis, upon treatment with fatty acids. In certain aspects, the fatty acids are oleic acid and/or linoleic acid. In some aspects, the liver disease is liver fibrosis.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 17: Hepatocyte Maturation Media formulations used during Stage 3 of the hepatocyte differentiation process.

(FIG. 21A) Flow cytometric plots to reveal the co expression of CD133 and AAT across multiple Normal (20D, 54A, and 1505) and NASH (24D, 42F, and 45B) iPSCs (FIG. 21B).

FIG. 23: End of Stage 3 morphology of hepatocytes matured in the presence of SB431542/DAPT or PP1 (Src Kinase Inhibitors): Hepatocytes from Normal (2.038 and 54A) or NASH specific iPSCs (02E1) cryopreserved at the end of Stage 2 of the process were thawed and cultured through Stage 3 of hepatocyte differentiation in the presence of 10 M SB431542/2 M DAPT (SB/DAPT) or 5 M PP1 (PP1) in the maturation media. The morphology of the emerging hepatocytes post thaw was captured at 10× magnification.

FIGS. 28A-28D: Development of liver organoids: Co-culture of hepatocytes with macrophages, MSC, and endothelial cells was attempted to mimic liver organoid culture. End of Stage 2 hepatocyte aggregates from Normal (2.038) and NASH specific iPSCs (02E1) were dissociated and reaggregated in Stage 3 media with either 10 µM SB431542+2 µM DAPT (SB/DAPT) or 5 µM PP1 (PP1). Cells were aggregated either by themselves or in combination with macrophages, MSC, and endothelial cells for 2.038 (normal) or with macrophages and MSC derived from 02E1 (NASH) adapted to hepatocyte Stage 3 media. For both cell lines, aggregates consisting of each individual cell type as well as every combination outlined in FIG. 28A was attempted. Representative images of aggregates of Normal (2.038) hepatocytes (Hep), macrophages (MAC), MSC, and endothelial cells (endo), and co-culture of all 4 cell types (Hep/MAC/MSC/Endo) are depicted in FIG. 28B. Representative images of aggregates of NASH specific 02E1 hepatocytes (Hep), macrophages (MAC), and MSC, and co-culture of all 3 cell types (Hep/MAC/MSC) are outlined in FIG. 28C. All images were taken using IncuCyte high content imager (Essen BioScience) under a 4× objective. Quantification of albumin secretion at End of Stage 3 co-culture aggregates is depicted in (FIG. 28D). End of Stage 2 hepatocyte aggregates derived from normal (2.038) and NASH specific (02E1) iPSCs were dissociated and reaggregated in Stage 3 media (Table 2), either by themselves (Hepatocyte) or in combination with macrophages, MSC, and endothelial cells derived from the same cell lines (Co-culture). The resulting aggregates were maintained in Stage 3 media supplemented with either 10 µM SB431542+2 µM DAPT (SB/DAPT) or 5 µM PP1 (PP1) for 10 days with complete media changes every other day. Media from the last exchange (days 8-10) was collected and secreted albumin was measured using human albumin ELISA according to manufacturer's instructions.

DESCRIPTION OF ILLUSTRATIVE EMBODIMENTS

Figure 1:
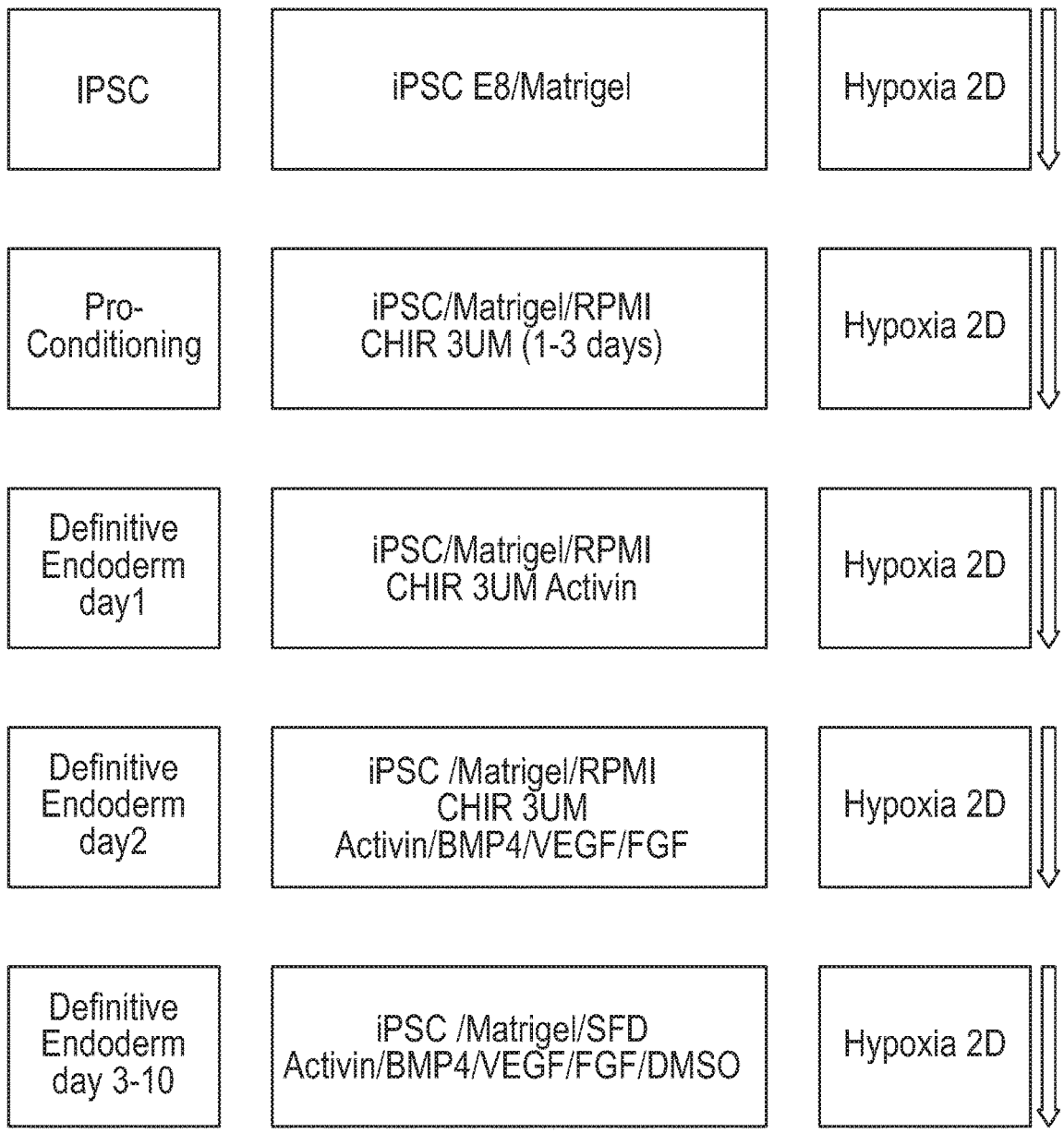
FIG. 1: Schematic depicting initial lineage specification of hepatocyte differentiation process for differentiation of iPSCs to definitive endoderm.
Figure 2:
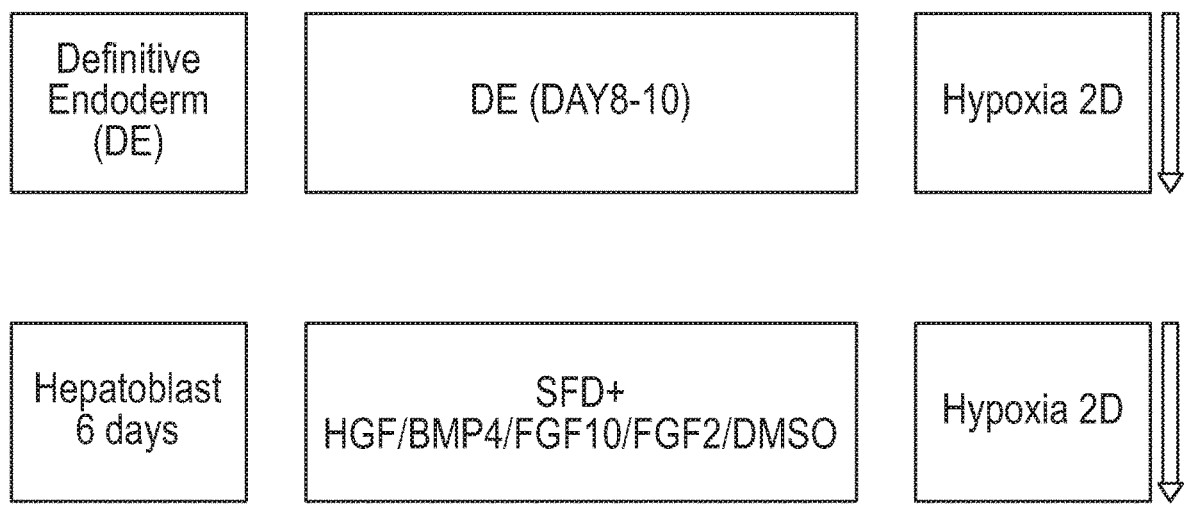
FIG. 2: Schematic depicting Stage 1 of hepatocyte differentiation for induction of hepatoblasts.
Figure 3:
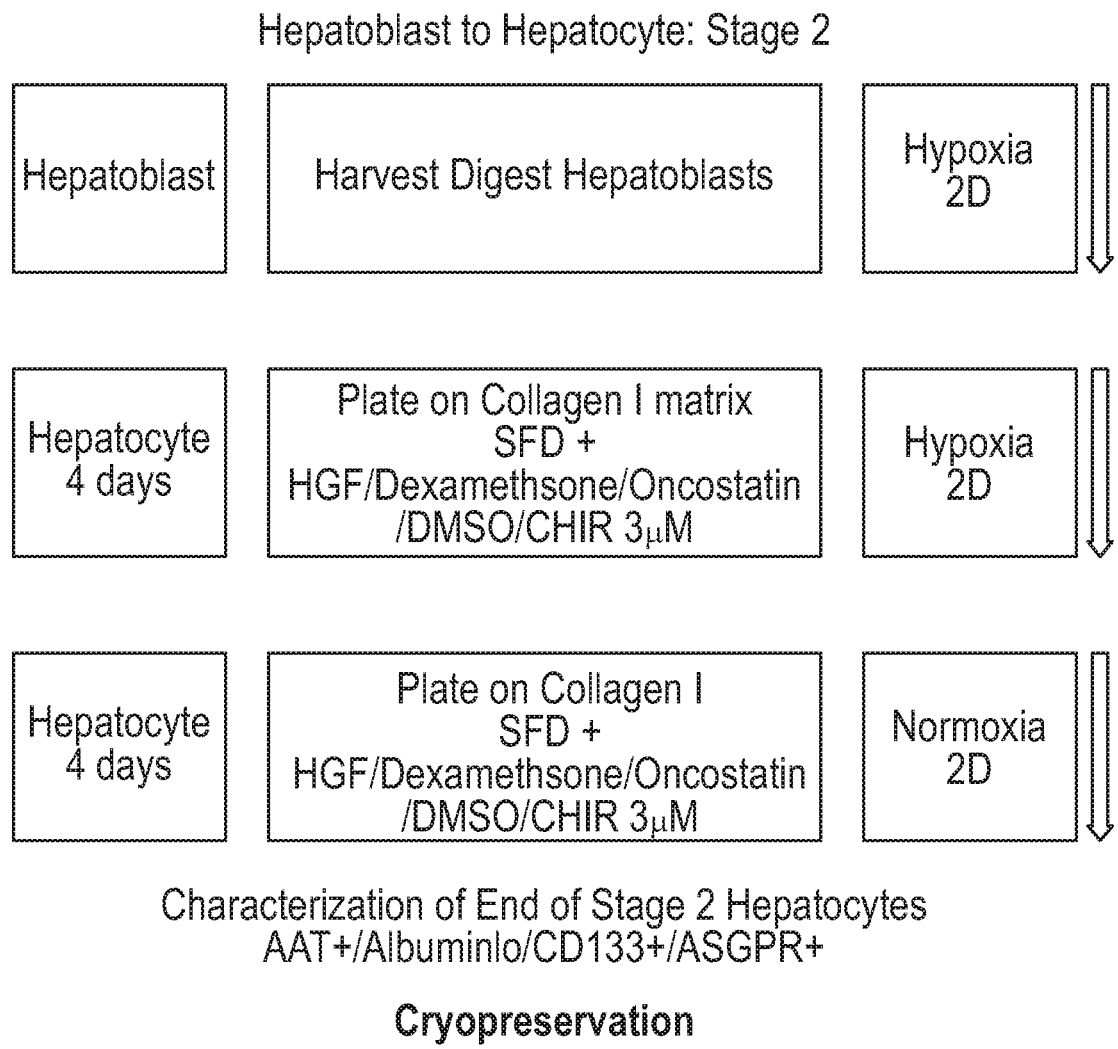
FIG. 3: Schematic depicting Stage 2 of hepatocyte differentiation process.
Figure 3:
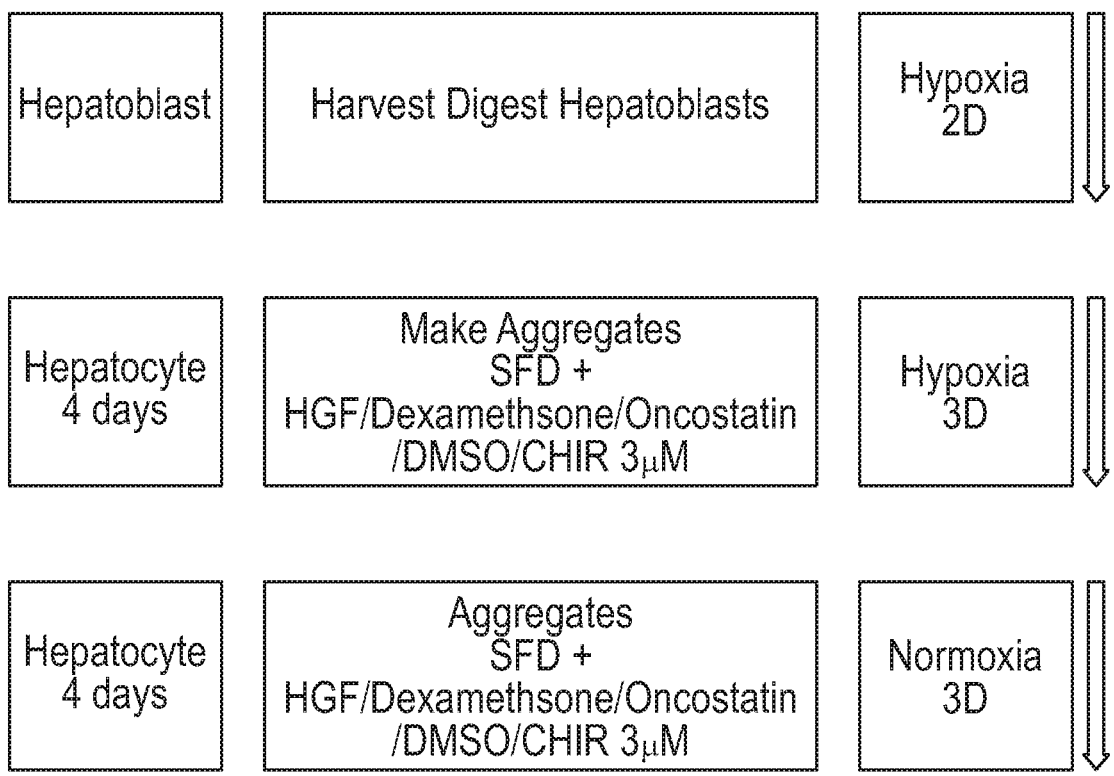
Figure 4:
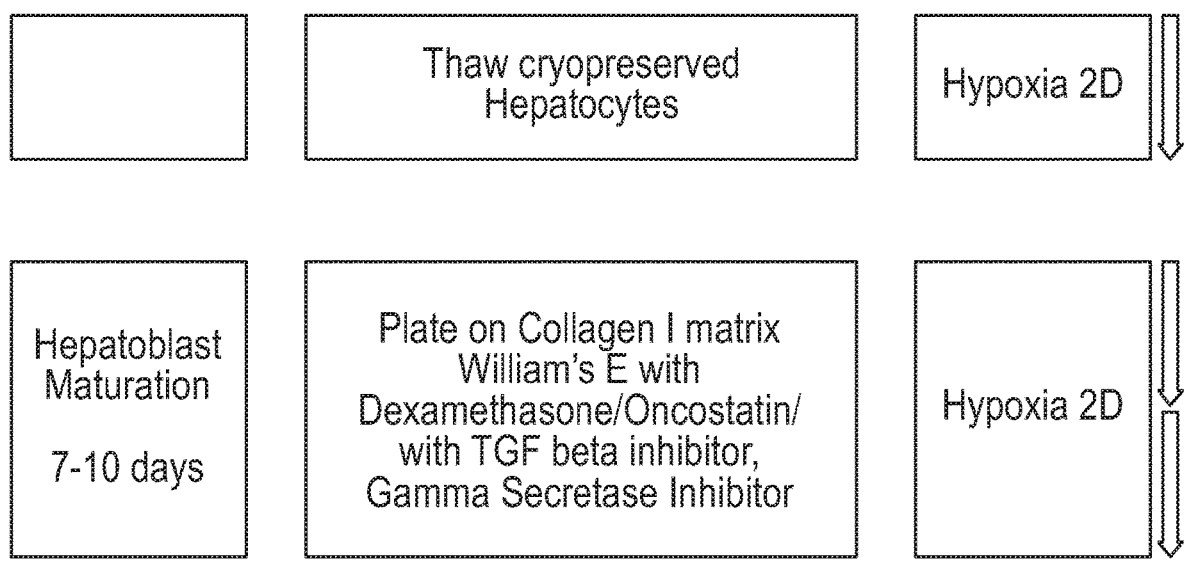
FIG. 4: Schematic depicting Stage 3 of hepatocyte differentiation process for maturation of hepatocytes.
Figure 5:
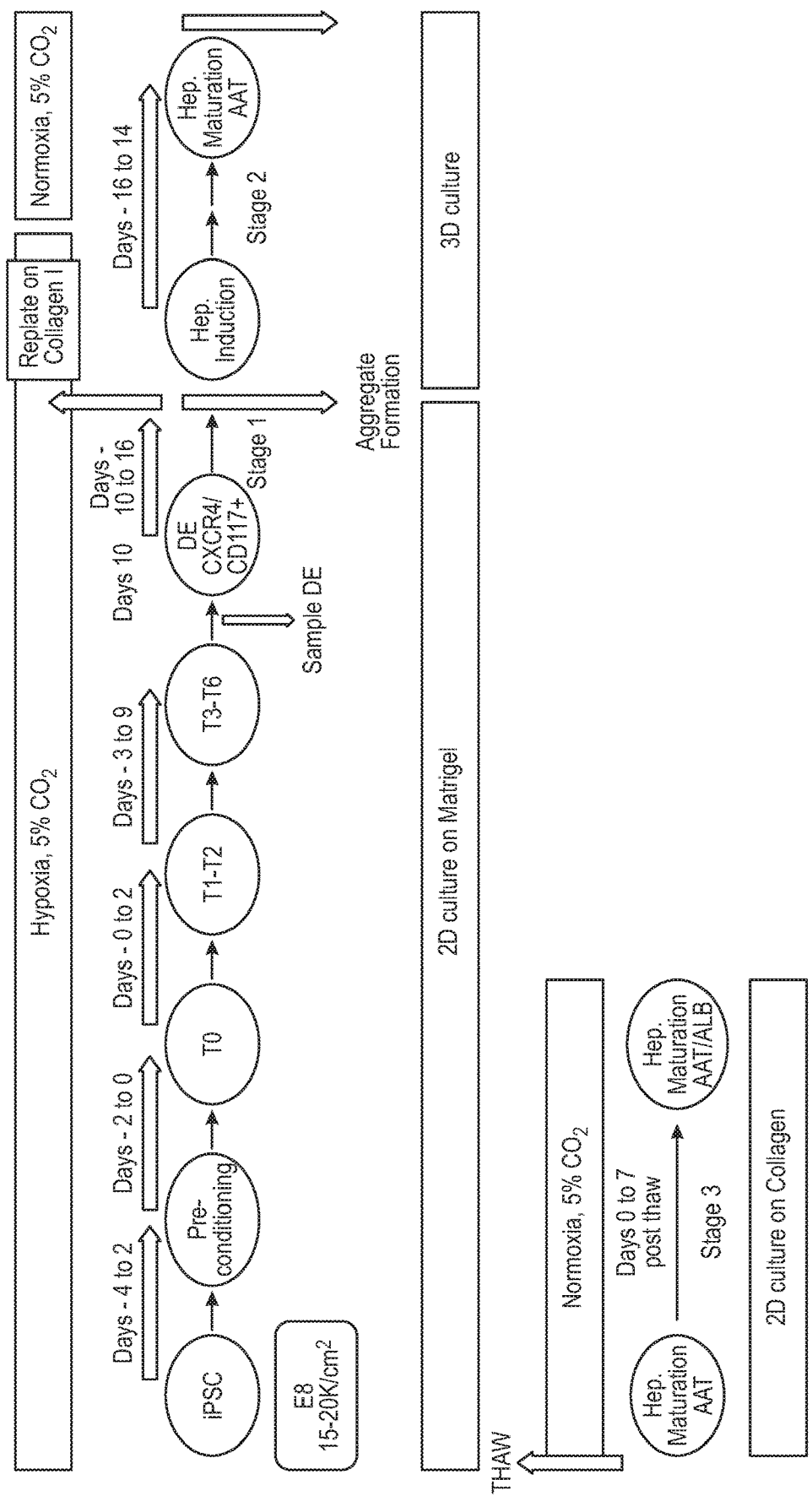
FIG. 5: Schematic of modified protocol for hepatocyte differentiation. iPSCs are seeded onto MATRIGEL® coated plates and expanded for 2 days, followed by a preconditioning with CHIR99021 for two days. The conversion to definitive endoderm (DE) cells is undertaken by placing the cells in Day 0 (T0) media, followed by sequential changes in media in days 1, 2 (T1-T2) followed by placing the cells in T3-T6 media until process day 10. At the end of DE induction the cells are sampled for DE markers CXCR4 and CD117. The cells are steered to hepatoblast Stage by placing the cells Stage 1 for 6 days. At the end of Stage 1, cells can be cryopreserved or converted further to hepatocytes. The Stage 2 of differentiation to hepatocytes is performed in either a three-dimensional (3D) or two-dimensional (2D) format. The Stage 1 cells are harvested and allowed to form aggregates and the cells are maintained in Stage 2 media supplemented with CHIR99021 for 8 days. At the end of Stage 2, the cells are sampled for alpha-1 antitrypsin (AAT) purity and either cryopreserved or plated directly onto Collagen I coated plates where hepatocyte maturation takes place during Stage 3 giving rise to cells expressing both AAT and albumin (ALB). The entire differentiation process takes place under hypoxic conditions until the middle of Stage 2, when the cells are transitioned to normoxia.

In certain embodiments, the present disclosure provides methods for the production of hepatocytes from induced pluripotent stem cells (iPSCs). Generally, the method comprises differentiating iPSCs to endoderm lineage cells which are then induced to form hepatoblasts and then differentiated to hepatocytes.

Specifically, the method may comprise culturing the iPSCs in the presence of a GSK3 inhibitor to pre-condition the cells for differentiation to definitive endoderm (DE) cells by facilitating their exit from pluripotency and improving downstream differentiation. Initially, the iPSCs can be differentiated to DE cells in endoderm induction media. The iPSCs may be cultured in two-dimensional culture, such as on MATRIGEL®, and then the DE cells may be transferred to three-dimensional aggregate culture at the end of hepatoblast induction. The cells may be cultured in the presence of a GSK3 inhibitor during Stage 2 of the process comprising induction of hepatoblasts and differentiation to hepatocytes. In Stage 3 the hepatocytes may be matured in the presence of a TGFβ inhibitor and γ-secretase inhibitor to improve cell morphology.

The hepatocytes produced by the present methods may be used for disease modeling, drug discovery, and regenerative medicine. Thus, in preferred embodiments, the methods of the present disclosure provide hepatocytes for a wide range of applications that include model systems for the development of new treatments for a spectrum of liver diseases, the establishment of platforms for predictive toxicology and the creation of in vitro models of diseases such as fibrosis, steatosis, and viral infection. In addition, the methods described herein can be used to derive hepatocytes for use in clinical applications of hepatocyte transplantation to restore a degree of liver function to a subject needing such therapy, perhaps due to an acute, chronic, or inherited impairment of liver function.

I. Definitions

As used herein the specification, "a" or "an" may mean one or more. As used herein in the claim(s), when used in conjunction with the word "comprising," the words "a" or "an" may mean one or more than one.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

The term "essentially" is to be understood that methods or compositions include only the specified steps or materials and those that do not materially affect the basic and novel characteristics of those methods and compositions.

As used herein, a composition or media that is "substantially free" of a specified substance or material contains ≤30%, ≤20%, ≤15%, more preferably ≤10%, even more preferably ≤5%, or most preferably ≤1% of the substance or material.

The terms "substantially" or "approximately" as used herein may be applied to modify any quantitative comparison, value, measurement, or other representation that could permissibly vary without resulting in a change in the basic function to which it is related.

The term "about" means, in general, within a standard deviation of the stated value as determined using a standard analytical technique for measuring the stated value. The terms can also be used by referring to plus or minus 5% of the stated value.

As used herein, "essentially free," in terms of a specified component, is used herein to mean that none of the specified component has been purposefully formulated into a composition and/or is present only as a contaminant or in trace amounts. The total amount of the specified component resulting from any unintended contamination of a composition is therefore well below 0.05%, preferably below 0.01%. Most preferred is a composition in which no amount of the specified component can be detected with standard analytical methods.

"Treatment" or "treating" includes (1) inhibiting a disease in a subject or patient experiencing or displaying the pathology or symptomatology of the disease (e.g., arresting further development of the pathology and/or symptomatology), (2) ameliorating a disease in a subject or patient that is experiencing or displaying the pathology or symptomatology of the disease (e.g., reversing the pathology and/or symptomatology), and/or (3) effecting any measurable decrease in a disease in a subject or patient that is experiencing or displaying the pathology or symptomatology of the disease.

"Prophylactically treating" includes: (1) reducing or mitigating the risk of developing the disease in a subject or patient which may be at risk and/or predisposed to the disease but does not yet experience or display any or all of the pathology or symptomatology of the disease, and/or (2) slowing the onset of the pathology or symptomatology of a disease in a subject or patient which may be at risk and/or predisposed to the disease but does not yet experience or display any or all of the pathology or symptomatology of the disease.

As used herein, the term "patient" or "subject" refers to a living mammalian organism, such as a human, monkey, cow, sheep, goat, dog, cat, mouse, rat, guinea pig, or transgenic species thereof. In certain embodiments, the patient or subject is a primate. Non-limiting examples of human patients are adults, juveniles, infants and fetuses.

The term "effective," as that term is used in the specification and/or claims, means adequate to accomplish a desired, expected, or intended result. "Effective amount," "therapeutically effective amount" or "pharmaceutically effective amount" when used in the context of treating a patient or subject with a compound means that amount of the compound which, when administered to a subject or patient for treating or preventing a disease, is an amount sufficient to affect such treatment or prevention of the disease.

As generally used herein "pharmaceutically acceptable" refers to those compounds, materials, compositions, and/or dosage forms which are, within the scope of sound medical judgment, suitable for use in contact with the tissues, organs, and/or bodily fluids of human beings and animals without excessive toxicity, irritation, allergic response, or other problems or complications commensurate with a reasonable benefit/risk ratio.

"Induced pluripotent stem cells (iPSCs)" are cells generated by reprogramming a somatic cell by expressing or inducing expression of a combination of factors (herein referred to as reprogramming factors). iPSCs can be generated using fetal, postnatal, newborn, juvenile, or adult somatic cells. In certain embodiments, factors that can be used to reprogram somatic cells to pluripotent stem cells include, for example, Oct4 (sometimes referred to as Oct 3/4), Sox2, c-Myc, Klf4, Nanog, and Lin28. In some embodiments, somatic cells are reprogrammed by expressing at least two reprogramming factors, at least three reprogramming factors, or four reprogramming factors to reprogram a somatic cell to a pluripotent stem cell.

The term "hepatocyte" as used herein is meant to include hepatocyte-like cells that exhibit some but not all characteristics of mature hepatocytes, as well as mature and fully functional hepatocytes which have all characteristics of hepatocytes as determined by morphology, marker expression, and in vitro and in vivo functional assays. A hepatocyte may express mature hepatic gene expression and lack expression of specific fetal hepatocyte and embryonic endoderm genes. Hepatocytes may be characterized by enzymatic measurements of hepatic function. In specific aspects, the present stem cell derived hepatocytes are capable of the full range of mature hepatocyte functions including one or more of the following: analysis of mature hepatocyte gene expression—gene Arrays and qPCR (e.g. alpha-1-antitrypsin, Cyp3a4); quantitative assessment of the amount of fetal hepatocyte, visceral endoderm and non-parenchymal liver cell gene expression—(e.g. Afp, Sox7, Ckl9, Cd24a); metabolism of xenobiotics and endogenous substances (hormones and ammonia); synthesis and secretion of albumin, clotting factors, complement, transport proteins, bile, lipids and lipoproteins; storage of glucose (glycogen), fat soluble vitamins A, B12, D, E, K, folate, copper and iron; presence and activity of the glucuronidation pathway by assessing UGT1A1 (clinical); active gluconeogenesis by the presence of glucose-6-phosphatase (G6P) and PEPCK; active ureagenesis—ammonia detoxification and urea cycle gene expression; and/or determine whether hepatocytes can repopulate a liver in vivo via portal vein/spleen injections The term "extracellular matrix protein" refers to a molecule which provides structural and biochemical support to the surrounding cells. The extracellular matrix protein can be recombinant and also refers to fragments or peptides thereof. Examples include collagen and heparin sulfate.

A "three-dimensional (3-D) culture" refers to an artificially-created environment in which biological cells are permitted to grow or interact with their surroundings in all three dimensions. The 3-D culture can be grown in various cell culture containers such as bioreactors, small capsules in which cells can grow into spheroids, or non-adherent culture plates. In particular aspects, the 3-D culture is scaffold-free. In contrast, a "two-dimensional (2-D)" culture refers to a cell culture such as a monolayer on an adherent surface.

As used herein "definitive endoderm (DE)" and definitive endoderm cells (DE-cells) refers to cells exhibiting such as but not limited to protein or gene expression and or/or morphology typical to cells of the definitive endoderm or a composition comprising a significant number of cells resembling the cells of the definitive endoderm. In some aspects, the definitive endoderm cells or cell populations that are produced express one or more of the markers selected from the group consisting of EOMES, FOXA1, FOA2, SOX17, CXCR4, GSC, FGF17, VWF, CALCR, FOXQ1, CMKOR1 and CRIP1.

II. Production of Hepatocytes

In certain embodiments, the present disclosure concerns the production of hepatocytes from pluripotent stem cells, such as iPSCs. The differentiation process for the production of the hepatocytes comprises differentiation of the iPSCs to DE cells which are then induced to form hepatoblasts and then differentiated to hepatocytes.

The PSCs, such as iPSCs, are generally cultured on culture plates coated by one or more cellular adhesion proteins to promote cellular adhesion while maintaining cell viability. For example, preferred cellular adhesion proteins include extracellular matrix proteins such as vitronectin, laminin, collagen, and/or fibronectin, which may be used to coat a culturing surface as a means of providing a solid support for pluripotent cell growth. The term "extracellular matrix (ECM)" is recognized in the art. Its components can include, but are not limited to, one or more of the following proteins: fibronectin, laminin, vitronectin, tenascin, entactin, thrombospondin, elastin, gelatin, collagen, fibrillin, merosin, anchorin, chondronectin, link protein, bone sialoprotein, osteocalcin, osteopontin, epinectin, hyaluronectin, undulin, epiligrin, and kalinin. Other ECM components may include synthetic peptides for adhesion (e.g., RGD or IKVAV motifs), synthetic hydrogels (e.g., PEG, PLGA, etc.) or natural hydrogels, such as alginate. In exemplary methods, the PSCs are grown on culture plates coated with MATRIGEL®, such as until the end of endoderm induction, or on collagen, such as during Stage 2. In some embodiments, the cellular adhesion proteins are human proteins.

General stepwise methods of differentiating iPSCs to hepatocytes or hepatocyte-like cells are known in the art and may be applied to the present methods. For example, Chen et al. describe a method of culturing cells with activin A, Wnt3a, and HGF for endodermal induction; and next the cells are cultured in knockout DMEM, and then matured with oncostatin M and dexamethasone (Chen et al., 2012). In another method, iPSCs are differentiated to DE in the presence of activin A, BMP4, and FGF2; the cells ae further cultured in BMP4 and FGF2 to specified hepatic endoderm; and then cultured in HGF to derive immature hepatocytes; and then cultured in OSM to produce mature hepatocytes (Mallanna and Duncan, 2013). A further method comprises culturing iPSCs with activin A to derive DE, the cells are then cultured in KO-serum replacement medium, and then with ROCK inhibitor to form spheroids (Ramasamy et al., 2013). The iPSCs may be cultured with activin A, FGF, and BMP to derive DE, cultured with FGF2 and BMP4 to derive hepatic progenitor cells, cultured with HGF to derive immature hepatocytes, and then with OSM to produce mature hepatocytes (Cai et al., 2013).

In one particular method, the iPSCs may be pre-conditioned towards hepatocyte differentiation by culturing the cells in the presence of a GSK3 inhibitor to pre-condition the cells for differentiation to definitive endoderm (DE) cells by facilitating their exit from pluripotency and improving downstream differentiation. Initially, the iPSCs can be differentiated to DE cells in endoderm induction media. The iPSCs may be cultured in two-dimensional culture, such as on MATRIGEL®, and then the hepatoblast cells may be transferred to three-dimensional aggregate culture at the end of Stage 1. The cells may be cultured in the presence of a GSK3 inhibitor during Stage 2 of the process comprising induction of hepatoblasts and differentiation to hepatocytes. In Stage 3, the hepatocytes may be matured in the presence of a TGFβ inhibitor and γ-secretase inhibitor to improve cell morphology. Alternatively, the hepatocytes may be matured in the presence of a SRC kinase inhibitor and, optionally, EPO. The SRC kinase inhibitor may be bosutinib, dasatinib, A419259, alsterpaullone, AZM475271, or AZM475271.

A. Differentiation Media

The extracellular matrix proteins may be of natural origin and purified from human or animal tissues or, alternatively, the ECM proteins may be genetically engineered recombinant proteins or synthetic in nature. The ECM proteins may be a whole protein or in the form of peptide fragments, native or engineered. Examples of ECM protein that may be useful in the matrix for cell culture include laminin, collagen I, collagen IV, fibronectin and vitronectin. In some embodiments, the matrix composition is xeno-free. For example, in the xeno-free matrix to culture human cells, matrix components of human origin may be used, wherein any non-human animal components may be excluded.

In some aspects, the total protein concentration in the matrix composition may be about 1 ng/mL to about 1 mg/mL. In some preferred embodiments, the total protein concentration in the matrix composition is about 1 µg/mL to about 300 µg/mL. In more preferred embodiments, the total protein concentration in the matrix composition is about 5 µg/mL to about 200 µg/mL.

Cells can be cultured with the nutrients necessary to support the growth of each specific population of cells. Generally, the cells are cultured in growth media including a carbon source, a nitrogen source and a buffer to maintain pH. The medium can also contain fatty acids or lipids, amino acids (such as non-essential amino acids), vitamin(s), growth factors, cytokines, antioxidant substances, pyruvic acid, buffering agents, pH indicators, and inorganic salts. An exemplary growth medium contains a minimal essential media, such as Dulbecco's Modified Eagle's medium (DMEM) or ESSENTIAL 8™ (E8™) medium, supplemented with various nutrients, such as non-essential amino acids and vitamins, to enhance stem cell growth. Examples of minimal essential media include, but are not limited to, Minimal Essential Medium Eagle (MEM) Alpha medium, Dulbecco's modified Eagle medium (DMEM), RPMI-1640 medium, 199 medium, and F12 medium. Additionally, the minimal essential media may be supplemented with additives such as horse, calf or fetal bovine serum. Alternatively, the medium can be serum free. In other cases, the growth media may contain "knockout serum replacement," referred to herein as a serum-free formulation optimized to grow and maintain undifferentiated cells, such as stem cell, in culture. KNOCKOUT™ serum replacement is disclosed, for example, in U.S. Patent Application No. 2002/0076747, which is incorporated herein by reference. Preferably, the PSCs are cultured in a fully-defined and feeder-free media.

In some embodiments, the medium may contain or may not contain any alternatives to serum. The alternatives to serum can include materials which appropriately contain albumin (such as lipid-rich albumin, albumin substitutes such as recombinant albumin, plant starch, dextrans and protein hydrolysates), transferrin (or other iron transporters), fatty acids, insulin, collagen precursors, trace elements, 2-mercaptoethanol, 3-thioglycerol, or equivalents thereto. The alternatives to serum can be prepared by the method disclosed in International Publication No. WO 98/30679, for example. Alternatively, any commercially available materials can be used for more convenience. The commercially available materials include KNOCKOUT™ Serum Replacement (KSR), Chemically-defined Lipid concentrated (Gibco), and GLUTAMAX™ (Gibco).

Other culturing conditions can be appropriately defined. For example, the culturing temperature can be about 30 to 40° C., for example, at least or about 31, 32, 33, 34, 35, 36, 37, 38, 39° C. but particularly not limited to them. In one embodiment, the cells are cultured at 37° C. The $CO_2$ concentration can be about 1 to 10%, for example, about 2 to 5%, or any range derivable therein. The oxygen tension can be at least, up to, or about 1, 2, 3, 4, 5, 6, 7, 8, 9, 10, 20%, or any range derivable therein.

a. Pre-Conditioning Media

The PSCs, such as iPSCs, may be maintained in E8 media at a cell density of about 15,000-20,000 cells/cm$^2$ for about 1, 2, 3, or 4 days prior to culturing the cells in pre-conditioning medium (PCM) for about 1, 2, or 3 days. An exemplary PCM comprises a GSK3 inhibitor, such as CHIR99021, at about 1-5 µM, such as about 2, 3, or 4 µM, particularly about 3 µM, and all ranges in between, for example the following, 1-3, 1-2, 2-4, 2-5, 2-3, 3-4, or 3-5 µM. The PCM may further comprise RPMI1640, serum-free differentiation (SFD) medium (e.g., about 5-15%, particularly about 10%), glutaMAX (e.g., about 0.5-5%, particularly about 1%), monothioglycerol (MTG), (e.g., about 250-750 µM, particularly about 450 µM), and Penicillin Streptomycin (e.g., 0.5%-5%, particularly about 1%). The pre-conditioning may be performed in hypoxic conditions.

b. Endoderm Induction Media

After pre-conditioning, the iPSCs can then be cultured in a first endoderm induction media (EIM T0) for about 1 or 2 days. An exemplary EIM T0 comprises RPMI, SFD medium (e.g., about 5-15%, particularly about 10%), glutaMAX (e.g., about 0.5-5%, particularly about 1%), MTG, (e.g., about 250-750 µM, particularly about 450 µM), Penicillin Streptomycin (e.g., 0.5%-5%, particularly about 1%), and Activin A (e.g., 10-50 ng/mL, particularly about 20 ng/mL). In particular aspects, the EIM T0 is essentially free of or is free of ascorbic acid.

The cells are then cultured in a second EIM (EIM T1-2) for about 1 or 2 days, particularly about 2 days. An exemplary EIM T1-2 comprises the EIM T0 media with ascorbic acid (e.g., 25-100 µg/mL, particularly about 50 µg/mL), BMP4 (e.g., about 1-5 ng/mL, particular about 2.5 ng/mL), bFGF (e.g., about 1-10 ng/mL, particularly about 5 ng/mL), and VEGF (e.g, about 10-50 ng/mL, particularly about 10 ng/mL).

Finally, the cells are cultured in a third EIM (EIM T3-6) for about 4, 5, 6, 7, 8, 9, or 10 days to produce DE cells. The EIM T3-6 may comprise SFD, BMP4 (e.g., about 1-5 ng/mL, particular about 2.5 ng/mL), bFGF (e.g., about 1-10 ng/mL, particularly about 5 ng/mL), VEGF (e.g, about 10-50 ng/mL, particularly about 10 ng/mL) and dimethyl sulfoxide (DMSO) (e.g., about 0.1%-1%, particularly about 0.5%). The differentiation to DE cells may be performed in hypoxic conditions. The DE cells may be characterized by flow cytometry or qPCR for positive expression of CXCR4 and CD117.

c. Hepatoblast Induction Media (Stage 1)

The DE cells then undergo Stage 1 of hepatocyte differentiation by induction of hepatoblasts. The DE cells may be cultured in three-dimensional culture, such as aggregates, or as two-dimensional culture to form hepatoblasts. The Hepatoblast Induction Media (HIM or Stage 1 media) may comprise SFD, BMP4 (e.g., about 25-75 ng/mL, particular about 50 ng/mL), bFGF (e.g., about 5-20 ng/mL, particularly about 10 ng/mL), HGF (e.g., about 10-50 ng/mL, particularly about 25 ng/mL), VEGF (e.g, about 10-50 ng/mL, particularly about 10 ng/mL), dimethyl sulfoxide (DMSO) (e.g., about 0.1%-2%, particularly about 1%), and FGF-10 (e.g., about 40-100 ng/mL, particularly about 60 ng/mL).

d. Hepatocyte Differentiation Media (Stage 2)

Stage 2 of the process comprises differentiation of the hepatoblasts to hepatocytes. The hepatoblasts may be either digested to an essentially single cell suspension and plated down as 2D cultures or the cell suspension can be used to generate 3D aggregates. This step of hepatocyte differentiation can be performed in a 2D or 3D format. The hepatocyte differentiation media (HDM or Stage 2) may comprise SFD, bFGF (e.g., about 1-20 ng/mL, particularly about 10 ng/mL), HGF (e.g, about 50-200 ng/mL, particularly about 100 ng/mL), Oncostatin M (OSM) (e.g., about 10-30 ng/mL, particularly about 20 ng/mL), dexamethasone (e.g., about 0.01-1 µM, particularly about 0.1 µM), DMSO (e.g., about 0.1%-2%, particularly about 1%), and a GSK3 inhibitor, such as CHIR99021 (e.g., about 1-5 µM, such as about 2, 3, or 4 µM, particularly about 3 µM). The HDM may be free of VEGF and EGF. The Stage 2 process may comprise culture at hypoxia followed by culture at normoxia, such as 4 days hypoxia and 4 days normoxia.

e. Hepatocyte Maturation Media (Stage 3)

Finally, the hepatocytes may be matured during Stage 3 of the process, such as about 7-10 days. The hepatocyte maturation media (HMM or Stage 3 media) may comprise William's E media, B27+ vitamin A (e.g., about 1%-5%, particularly about 2%), OSM (e.g., about 10-30 ng/mL, particularly about 20 ng/mL), dexamethasone (e.g, about 0.01-1 µM, particularly about 0.1 µM), and Penicillin Streptomycin (e.g., 0.5%-5%, particularly about 1%). The HMM may further comprise a TGFβ inhibitor and γ-secretase inhibitor, such as SB431542 (e.g., about 1-20 µM, particularly about 10 µM) and DAPT (e.g., about 1-5 µM, particularly about 2 µM). Alternatively, the HMM may further comprise a SRC kinase inhibitor and EPO. The maturation may be performed in two-dimensional culture, such as on Collagen I. The HMM may comprise a TGFβ inhibitor and a MEK inhibitor. Alternatively, the HMM may comprise FH1, FPH1, and/or methoxamine (Shan et al., 2013).

B. Inhibitors a. GSK3 Inhibitors

Glycogen synthase kinase 3 (GSK3) is a serine/threonine protein kinase that mediates the addition of phosphate molecules onto serine and threonine amino acid residues. Exemplary inhibitors include CHIR99021, BIO, SB216763, CHIR98014, TWS119, SB415286, and Tideglusib.

b. TGFβ Pathway Inhibitors

Transforming growth factor beta (TGFβ) is a secreted protein that controls proliferation, cellular differentiation, and other functions in most cells. It is a type of cytokine which plays a role in immunity, cancer, bronchial asthma, lung fibrosis, heart disease, diabetes, and multiple sclerosis. TGF-β exists in at least three isoforms called TGF-β1, TGF-β2 and TGF-β3. The TGF-β family is part of a superfamily of proteins known as the transforming growth factor beta superfamily, which includes inhibins, activin, anti-mullerian hormone, bone morphogenetic protein, decapentaplegic and Vg-1.

TGFβ pathway inhibitors (also referred to herein as TGFβ inhibitors) may include any inhibitors of TGFβ signaling in general. For example, the TGFβ inhibitor is 4-[4-(1,3-benzodioxol-5-yl)-5-(2-pyridinyl)-1H-imidazol-2-yl]benzamide (SB431542), 6-[2-(1,1-Dimethylethyl)-5-(6-methyl-2-pyridinyl)-1H-imidazol-4-yl]quinoxaline (SB525334), 2-(5-Benzo[1,3]dioxol-5-yl-2-tert-butyl-3H-imidazol-4-yl)-6-methylpyridine hydrochloride hydrate (SB431542-505124), 4-(5-Benzol[1,3]dioxol-5-yl-4-pyridin-2-yl-1H-imidazol-2-yl)-benzamide hydrate, 4-[4-(1,3-Benzodioxol-5-yl)-5-(2-pyridinyl)-1H-imidazol-2-yl]-benzamide hydrate, left-right determination factor (Lefty), 3-(6-Methyl-2-pyridinyl)-N-phenyl-4-(4-quinolinyl)-1H-pyrazole-1-carbothioamide (A 83-01), 4-[4-(2,3-Dihydro-1,4-benzodioxin-6-yl)-5-(2-pyridinyl)-1H-imidazol-2-yl]benzamide (D 4476), 4-[4-[3-(2-Pyridinyl)-1H-pyrazol-4-yl]-2-pyridinyl]-N-(tetrahydro-2H-pyran-4-yl)-benzamide (GW 788388), 4-[3-(2-Pyridinyl)-1H-pyrazol-4-yl]-quinoline (LY 364847), 4-[2-Fluoro-5-[3-(6-methyl-2-pyridinyl)-1H-pyrazol-4-yl]phenyl]-1H-pyrazole-1-ethanol (R 268712) or 2-(3-(6-Methylpyridine-2-yl)-1H-pyrazol-4-yl)-1,5-naphthyridine (RepSox).

c. MEK Inhibitors

A MEK inhibitor is a chemical or drug that inhibits the mitogen-activated protein kinase enzymes MEK1 or MEK2. They can be used to affect the MAPK/ERK pathway. For example, MEK inhibitors include N-[(2R)-2,3-Dihydroxypropoxy]-3,4-difluoro-2-[(2-fluoro-4-iodophenyl)amino]-benzamide (PD0325901), N-[3-[3-cyclopropyl-5-(2-fluoro-4-iodoanilino)-6,8-dimethyl-2,4,7-trioxopyrido[4,3-d]pyrimidin-1-yl]phenyl]acetamide (GSK1120212), 6-(4-bromo-2-fluoroanilino)-7-fluoro-N-(2-hydroxyethoxy)-3-methylbenzimidazole-5-carboxamide (MEK162), N-[3,4-difluoro-2-(2-fluoro-4-iodoanilino)-6-methoxyphenyl]-1-(2,3-dihydroxypropyl)cyclopropane-1-sulfonamide (RDEA119), and 6-(4-bromo-2-chloroanilino)-7-fluoro-N-(2-hydroxyethoxy)-3-methylbenzimidazole-5-carboxamide (AZD6244).

d. Src Kinase Inhibitors

The Src family of non-receptor protein tyrosine kinases play an important role in a variety of cellular signal transduction pathways, regulating such diverse processes as cell division, motility, adhesion, angiogenesis, and survival. PP1, a potent, reversible, ATP-competitive, is a selective inhibitor of the Src family of protein tyrosine kinases. It inhibits p56lck (IC50=5 nM), p59fynT (IC50=6 nM), Hck (IC50=20 nM), and Src (IC50=170 nM) without significantly affecting the activity of EGFR kinase (IC50=250 nM), JAK2 (IC50=50 µM), or ZAP-70 (IC50≥0.6 µM). PP1 also blocks TGF-β-mediated cellular responses by directly inhibiting type I TGF-β receptors (IC50=50 nM) in a manner unrelated to Src signaling. In some aspects, the Stage 3 maturation media may be supplemented with one or more Src kinase inhibitors including, PP2, KB SRC 4, 1-Naphthyl PP1, MNS, PD 180970 and Bosutinib, such as at 5 uM.

e. Gamma-Secretase Inhibitors

Gamma secretase is a multi-subunit protease complex, itself an integral membrane protein, that cleaves single-pass transmembrane proteins at residues within the transmembrane domain. Proteases of this type are known as intramembrane proteases. The most well-known substrate of gamma secretase is amyloid precursor protein, a large integral membrane protein that, when cleaved by both gamma and beta secretase, produces a short amino acid peptide called amyloid beta whose abnormally folded fibrillar form is the primary component of amyloid plaques found in the brains of Alzheimer's disease patients.

Gamma secretase inhibitors herein refer to γ-secretase inhibitors in general. For example, γ-secretase inhibitors include, but are not limited to N-[(3,5-Difluorophenyl)

acetyl]-L-alanyl-2-phenyl]glycine-1,1-dimethylethyl ester (DAPT), 5-Chloro-N-[(1S)-3,3,3-trifluoro-1-(hydroxymethyl)-2-(trifluoromethyl)propyl]-2-thiophenesulfonamide (Begacestat), MDL-28170,3,5-Bis(4-nitrophenoxy)benzoic acid (Compound W), 7-Amino-4-chloro-3-methoxy-1H-2-benzopyran (JLK6), (5S)-(tert-Butoxycarbonylamino)-6-phenyl-(4R)-hydroxy-(2R)-benzylhexanoyl)-L-leucy-L-phenylalaninamide (L-685,485), (R)-2-Fluoro-α-methyl[1,1'-biphenyl]-4-acetic acid ((R)-Flurbiprofen; Flurizan), N-[(1S)-2-[[(7S)-6,7-Dihydro-5-methyl-6-oxo-5H-dibenz[b,d]azepin-7-yl]amino]-1-methyl-2-oxoethyl]-3,5-difluorobenzeneacetamide (Dibenzazepine; DBZ), N-[cis-4-[(4-Chlorophenyl)sulfonyl]-4-(2,5-difluorophenyl)cyclohexyl]-1,1,1-trifluoromethanesulfonamide (MRK560), (2S)-2-[[(2S)-6,8-Difluoro-1,2,3,4-tetrahydro-2-naphthalenyl]amino]-N-[1-[2-[(2,2-dimethylpropyl)amino]-1,1-dimethylethyl]-1H-imidazol-4-yl]pentanamide dihydrobromide (PF3084014 hydrobromide) and 2-[(1R)-1-[[(4-Chlorophenyl)sulfonyl](2,5-difluorophenyl)amino]ethyl-5-fluorobenzenebutanoic acid (BMS299897).

C. Cryopreservation

The hepatoblasts or hepatocytes produced by the methods disclosed herein can be cryopreserved, see for example, PCT Publication No. 2012/149484 A2, which is incorporated by reference herein, at any Stage of the process, such as Stage 1, Stage 2, or Stage 3. The cells can be cryopreserved with or without a substrate. In several embodiments, the storage temperature ranges from about −50° C. to about −60° C., about −60° C. to about −70° C., about −70° C. to about −80° C., about −80° C. to about −90° C., about −90° C. to about −100° C., and overlapping ranges thereof. In some embodiments, lower temperatures are used for the storage (e.g., maintenance) of the cryopreserved cells. In several embodiments, liquid nitrogen (or other similar liquid coolant) is used to store the cells. In further embodiments, the cells are stored for greater than about 6 hours. In additional embodiments, the cells are stored about 72 hours. In several embodiments, the cells are stored 48 hours to about one week. In yet other embodiments, the cells are stored for about 1, 2, 3, 4, 5, 6, 7, or 8 weeks. In further embodiments, the cells are stored for 1, 2, 3, 4, 5, 6, 7, 8, 9, 10, 11 or 12 months. The cells can also be stored for longer times. The cells can be cryopreserved separately or on a substrate, such as any of the substrates disclosed herein.

In some embodiments, additional cryoprotectants can be used. For example, the cells can be cryopreserved in a cryopreservation solution comprising one or more cryoprotectants, such as DMSO, serum albumin, such as human or bovine serum albumin. In certain embodiments, the solution comprises about 1%, about 1.5%, about 2%, about 2.5%, about 3%, about 4%, about 5%, about 6%, about 7%, about 8%, about 9%, or about 10% DMSO. In other embodiments, the solution comprises about 1% to about 3%, about 2% to about 4%, about 3% to about 5%, about 4% to about 6%, about 5% to about 7%, about 6% to about 8%, about 7% to about 9%, or about 8%• to about 10% dimethylsulfoxide (DMSO) or albumin. In a specific embodiment, the solution comprises 2.5% DMSO. In another specific embodiment, the solution comprises 10% DMSO.

Cells may be cooled, for example, at about 1° C./minute during cryopreservation. In some embodiments, the cryopreservation temperature is about −80° C. to about −180° C., or about −125° C. to about −140° C. In some embodiments, the cells are cooled to about 4° C. prior to cooling at about 1° C./minute. Cryopreserved cells can be transferred to vapor phase of liquid nitrogen prior to thawing for use. In some embodiments, for example, once the cells have reached about −80° C., they are transferred to a liquid nitrogen storage area. Cryopreservation can also be done using a controlled-rate freezer. Cryopreserved cells may be thawed, e.g., at a temperature of about 25° C. to about 40° C., and typically at a temperature of about 37° C.

D. Hepatocyte Purification and Characterization

The hepatocytes produced by the present methods may be purified for an enriched population of hepatocytes, such as by selection of hepatocyte cell markers. The cells may be sorted for positive expression of CD133. Thus, the present disclosure provides enriched populations of hepatocytes. Exemplary populations of cells comprise at least about 50%; preferably at least about 60%; 70%; 80%; 90%; 95%; 98% and most preferably 99% or 100% of hepatocytes.

Hepatocytes can be characterized by the liver marker alpha-anti-trypsin (AAT) and/or albumin. The cells may also be positive for late Stage markers of hepatocytes, such as HNF-1σ, cytokeratin (CK)18 and albumin; the absence of early hepatocyte markers, e.g., HNF-30, GATA4, CK19, σ-fetoprotein; express cytochrome P450 genes, e.g., CYP1A1, CYP2B1, CYP2C6, CYP2C11, CYP2C13, CYP3A2 and CYP4A1; and acquire a polarized structure. Hepatocyte progenitor cells may be detected by the presence of early hepatocyte markers. Other markers of interest for liver cells include al-antitrypsin, glucose-6-phosphatase, transferrin, asialoglycoprotein receptor (ASGR or ASGPR or ASGPR1), CK7, -glutamyl transferase; HNF 10, HNF 3a, HNF-4σ, transthyretin, CFTR, apoE, glucokinase, insulin growth factors (IGF) 1 and 2, IGF-1 receptor, insulin receptor, leptin, apoAII, apoB, apoCIII, apoCII, aldolase B, phenylalanine hydroxylase, L-type fatty acid binding protein, transferrin, retinol binding protein, and erythropoietin (EPO).

It has been reported that hepatocyte differentiation requires the transcription factor HNF-4α (Li et al., Genes Dev. 14:464, 2000). Markers independent of HNF-4α expression include α1-antitrypsin, α-fetoprotein, apoE, glucokinase, insulin growth factors 1 and 2, IGF-1 receptor, insulin receptor, and leptin. Markers dependent on HNF-4α expression include albumin, apoAI, apoAII, apoB, apoCIII, apoCII, aldolase B, phenylalanine hydroxylase, L-type fatty acid binding protein, transferrin, retinol binding protein, and erythropoietin (EPO).

Assessment of the level of expression of such markers can be determined in comparison with other cells. Positive controls for the markers of mature hepatocytes include adult hepatocytes of the species of interest, and established hepatocyte cell lines, such as the HepG2 line derived from a hepatoblastoma reported in U.S. Pat. No. 5,290,684. Negative controls include cells of a separate lineage, such as an adult fibroblast cell line, or retinal pigment epithelial (RPE) cells.

Tissue-specific protein and oligosaccharide determinants listed in this disclosure can be detected using any suitable immunological technique-such as flow immunocytochemistry for cell-surface markers, immunohistochemistry (for example, of fixed cells or tissue sections) for intracellular or cell-surface markers, Western blot analysis of cellular extracts, and enzyme-linked immunoassay, for cellular extracts or products secreted into the medium. Expression of an antigen by a cell is said to be "antibody-detectable" if a significantly detectable amount of antibody will bind to the antigen in a standard immunocytochemistry or flow cytometry assay, optionally after fixation of the cells, and optionally using a labeled secondary antibody or other conjugate (such as a biotin-avidin conjugate) to amplify labeling.

The expression of tissue-specific markers can also be detected at the mRNA level by Northern blot analysis, dot-blot hybridization analysis, or by reverse transcriptase initiated polymerase chain reaction (RT-PCR) using sequence-specific primers in standard amplification methods. See U.S. Pat. No. 5,843,780 for further details. Sequence data for the particular markers listed in this disclosure can be obtained from public databases such as GenBank. Expression at the mRNA level is said to be "detectable" according to one of the assays described in this disclosure if the performance of the assay on cell samples according to standard procedures in a typical controlled experiment results in clearly discernable hybridization or amplification product. Expression of tissue-specific markers as detected at the protein or mRNA level is considered positive if the level is at least 2-fold, and preferably more than 10- or 50-fold above that of a control cell, such as an undifferentiated iPS cell, a fibroblast, or other unrelated cell type.

Cells can also be characterized according to whether they display enzymatic activity that is characteristic of cells of the hepatocyte lineage. For example, assays for glucose-6-phosphatase activity are described by Bublitz (Mol Cell Biochem. 108:141, 1991); Yasmineh et al. (Clin. Biochem. 25:109, 1992); and Ockerman (Clin. Chim. Acta 17:201, 1968). Assays for alkaline phosphatase (ALP) and 5-nucleotidase (5'-Nase) in liver cells are described by Shiojiri (J. Embryol. Exp. Morph. 62:139, 1981). A number of laboratories that serve the research and health care sectors provide assays for liver enzymes as a commercial service.

Cytochrome p450 is a key catalytic component of the mono-oxygenase system. It constitutes a family of hemoproteins responsible for the oxidative metabolism of xenobiotics (administered drugs), and many endogenous compounds. Different cytochromes present characteristic and overlapping substrate specificity. Most of the biotransforming ability is attributable by the cytochromes designated 1A2, 2A6, 2B6, 3A4, 2C9-11, 2D6, and 2E1 (Gomes-Lechon et al., pp 129-153 in "In vitro Methods in Pharmaceutical Research," Academic Press, 1997).

A number of assays are known in the art for measuring cytochrome p450 enzyme activity. For example, cells can be contacted with a non-fluorescent substrate that is convertible to a fluorescent product by p450 activity, and then analyzed by fluorescence-activated cell counting (U.S. Pat. No. 5,869,243). Specifically, the cells are washed, and then incubated with a solution of 10 µM/L 5,6-methoxycarbonylfluorescein (Molecular Probes, Eugene Oreg.) for 15 min at 37° C. in the dark. The cells are then washed, trypsinized from the culture plate, and analyzed for fluorescence emission at ~520-560 nm. Evidence of activity for any of the enzymes in this disclosure is determined if the level of activity in a test cell is more than 2-fold, and preferably more than 10- or 100-fold above that of a control cell, such as a fibroblast.

The expression of cytochrome p450 can also be measured at the protein level, for example, using specific antibody in Western blots, or at the mRNA level, using specific probes and primers in Northern blots or RT-PCR. See Borlakoglu et al., Int. J. Biochem. 25:1659, 1993. Particular activities of the p450 system can also be measured: 7-ethoxycoumarin O-de-ethylase activity, aloxyresorufin O-de-alkylase activity, coumarin 7-hydroxylase activity, p-nitrophenol hydroxylase activity, testosterone hydroxylation, UDP-glucuronyltransferase activity, glutathione S-transferase activity, and others (reviewed in Gomes-Lechon et al., pp 411-431 in "In vitro Methods in Pharmaceutical Research," Academic Press, 1997). The activity level can then be compared with the level in primary hepatocytes.

Assays are also available for enzymes involved in the conjugation, metabolism, or detoxification of small molecule drugs. For example, cells can be characterized by an ability to conjugate bilirubin, bile acids, and small molecule drugs, for excretion through the urinary or biliary tract. Cells are contacted with a suitable substrate, incubated for a suitable period, and then the medium is analyzed (by GCMS or other suitable technique) to determine whether conjugation product has been formed. Drug metabolizing enzyme activities include de-ethylation, dealkylation, hydroxylation, demethylation, oxidation, glucuroconjugation, sulfoconjugation, glutathione conjugation, and N-acetyl transferase activity (A. Guillouzo, pp 411-431 in "In vitro Methods in Pharmaceutical Research," Academic Press, 1997). Assays include peenacetin de-ethylation, procainamide N-acetylation, paracetamol sulfoconjugation, and paracetamol glucuronidation (Chesne et al., pp 343-350 in "Liver Cells and Drugs", A. Guillouzo ed. John Libbey Eurotext, London, 1988).

Cells of the hepatocyte lineage can also be evaluated on their ability to store glycogen. A suitable assay uses Periodic Acid Schiff (PAS) stain, which does not react with mono- and disaccharides, but stains long-chain polymers such as glycogen and dextran. PAS reaction provides quantitative estimations of complex carbohydrates as well as soluble and membrane-bound carbohydrate compounds. Kirkeby et al. (Biochem. Biophys. Meth. 24:225, 1992) describe a quantitative PAS assay of carbohydrate compounds and detergents. van der Laarse et al. (Biotech Histochem. 67:303, 1992) describe a microdensitometric histochemical assay for glycogen using the PAS reaction. Evidence of glycogen storage is determined if the cells are PAS-positive at a level that is at least 2-fold, and preferably more than 10-fold above that of a control cell, such as a fibroblast. The cells can also be characterized by karyotyping according to standard methods.

III. Methods of Use

The present disclosure provides a method by which large numbers of cells of the hepatocyte lineage can be produced. These cell populations can be used for a number of important research, development, and commercial purposes. These include, but are not limited to, transplantation or implantation of the cells in vivo; screening anti-virals, cytotoxic compounds, carcinogens, mutagens, growth/regulatory factors, pharmaceutical compounds, etc., in vitro; elucidating the mechanism of liver diseases and infections; studying the mechanism by which drugs and/or growth factors operate; diagnosing and monitoring cancer in a patient; gene therapy; and the production of biologically active products, to name but a few.

Hepatocytes can also be used for metabolic profiling. In one embodiment, cells or a fraction thereof, e.g., a microsome fraction, are contacted with a test agent, potentially at different concentrations and for different times, the media is collected and analyzed to detect metabolized forms of the test agent. Optionally, a control molecule, such as bufuralol is also used. Metabolic profiling can be used, e.g., to determine whether a subject metabolizes a particular drug and if so, how the drug is metabolized. For such assays, it is preferable that the hepatocytes used derive from the subject.

This present disclosure also provides for the use of hepatocytes to restore a degree of liver function to a subject needing such therapy, perhaps due to an acute, chronic, or inherited impairment of liver function.

The present disclosure includes hepatocytes that are encapsulated, or part of a bioartificial liver device. Various forms of encapsulation are described in "Cell Encapsulation Technology and Therapeutics", Kuhtreiber et al. eds., Birkhauser, Boston Mass., 1999. The present cells can be encapsulated according to such methods for use either in vitro or in vivo.

Bioartificial organs for clinical use are designed to support an individual with impaired liver function-either as a part of long-term therapy, or to bridge the time between a fulminant hepatic failure and hepatic reconstitution or liver transplant. Suspension-type bioartificial livers comprise cells suspended in plate dialysers, or microencapsulated in a suitable substrate, or attached to microcarrier beads coated with extracellular matrix. Alternatively, hepatocytes can be placed on a solid support in a packed bed, in a multiplate flat bed, on a microchannel screen, or surrounding hollow fiber capillaries. The device has inlet and outlet through which the subject's blood is passed, and sometimes a separate set of ports for supplying nutrients to the cells.

The present hepatocytes may also be used to screen candidate compounds or environmental conditions that, e.g., affect differentiation or metabolism of the cells. The hepatocytes may further be used to obtain cell specific antibody preparations and cell-specific cDNA libraries, e.g., to study patterns of gene expression, or as an active ingredient in a pharmaceutical preparation. In another embodiment, hepatocytes are administered to a subject in need thereof. The cells can be administered to the liver of the subject, e.g., for tissue reconstitution or regeneration. The cells may be administered in a manner that permits them to graft to the intended tissue site and reconstitute or regenerate the functionally deficient area. Prior to administration, the cells may be modified to suppress an immune reaction from the subject to the cells or vice-versa (graft versus host disease), according to methods known in the art.

Hepatocytes may be administered to a subject having a complete or partial liver failure, such as resulting from a hepatitis C infection. Hepatocytes can be assessed in animal models for ability to repair liver damage. One such example is damage caused by intraperitoneal injection of D-galactosamine. Efficacy of treatment can be determined by immunocytochemical staining for liver cell markers, microscopic determination of whether canalicular structures form in growing tissue, and the ability of the treatment to restore synthesis of liver-specific proteins.

A. Pharmaceutical Compositions

Also provided herein are pharmaceutical compositions and formulations comprising hepatocytes and a pharmaceutically acceptable carrier.

Cell compositions for administration to a subject in accordance with the present invention thus may be formulated in any conventional manner using one or more physiologically acceptable carriers comprising excipients and auxiliaries which facilitate processing of the compounds into preparations which can be used pharmaceutically. Proper formulation is dependent upon the route of administration chosen. Hepatocytes can be used in therapy by direct administration, or as part of a bioassist device that provides temporary liver function while the subject's liver tissue regenerates itself following fulminant hepatic failure. For general principles in medicinal formulation, the reader is referred to Cell Therapy: Stem Cell Transplantation, Gene Therapy, and Cellular Immunotherapy, by G. Morstyn ii W. Sheridan eds, Cambridge University Press, 1996; and Hematopoietic Stem Cell Therapy, E. D. Ball, J. Lister & P. Law, Churchill Livingstone, 2000. The compositions may be packaged with written instructions for use of the cells in tissue regeneration, or restoring a therapeutically important metabolic function.

Pharmaceutical compositions and formulations as described herein can be prepared by mixing the active ingredients (such as cells) having the desired degree of purity with one or more optional pharmaceutically acceptable carriers (Remington's Pharmaceutical Sciences $22^{nd}$ edition, 2012), in the form of lyophilized formulations or aqueous solutions. Pharmaceutically acceptable carriers are generally nontoxic to recipients at the dosages and concentrations employed, and include, but are not limited to: buffers such as phosphate, citrate, and other organic acids; antioxidants including ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as polyethylene glycol (PEG). Exemplary pharmaceutically acceptable carriers herein further include insterstitial drug dispersion agents such as soluble neutral-active hyaluronidase glycoproteins (sHASEGP), for example, human soluble PH-20 hyaluronidase glycoproteins, such as rHuPH20 (HYL-ENEX®, Baxter International, Inc.). Certain exemplary sHASEGPs and methods of use, including rHuPH20, are described in U.S. Patent Publication Nos. 2005/0260186 and 2006/0104968. In one aspect, a sHASEGP is combined with one or more additional glycosaminoglycanases such as chondroitinases.

B. Test Compound Screening

Cells of this present disclosure can be used to screen for factors (such as solvents, small molecule drugs, peptides, and polynucleotides) or environmental conditions (such as culture conditions or manipulation) that affect the characteristics of the cells provided herein.

Particular screening applications of the present disclosure relate to the testing of pharmaceutical compounds in drug research. The reader is referred generally to the standard textbook *In vitro Methods in Pharmaceutical Research*, Academic Press, 1997). In certain aspects of the present disclosure, agent-treated hepatocytes play the role of test cells for standard drug screening and toxicity assays, as have been previously performed on hepatocyte cell lines or primary hepatocytes in short-term culture. Assessment of the activity of candidate pharmaceutical compounds generally involves combining the cells provided in certain aspects of the present disclosure with the candidate compound, determining any change in the morphology, marker phenotype, or metabolic activity of the cells that is attributable to the compound (compared with untreated cells or cells treated with an inert compound), and then correlating the effect of the compound with the observed change. The screening may be done either because the compound is designed to have a pharmacological effect on liver cells, or because a compound designed to have effects elsewhere may have unintended hepatic side effects. Two or more drugs can be tested in combination (by combining with the cells either simultaneously or sequentially), to detect possible drug-drug interaction effects.

In some applications, compounds are screened initially for potential hepatotoxicity (Castell et al., 1997). Cytotoxicity can be determined in the first instance by the effect on cell viability, survival, morphology, and leakage of enzymes into the culture medium. More detailed analysis is conducted to determine whether compounds affect cell function (such as gluconeogenesis, ureagenesis, and plasma protein synthesis) without causing toxicity. Lactate dehydrogenase (LDH) is a good marker because the hepatic isoenzyme (type V) is stable in culture conditions, allowing reproducible measurements in culture supernatants after 12-24 h incubation. Leakage of enzymes such as mitochondrial glutamate oxaloacetate transaminase and glutamate pyruvate transaminase can also be used. Gomez-Lechon et al. (1996) describes a microassay for measuring glycogen, which can be used to measure the effect of pharmaceutical compounds on hepatocyte gluconeogenesis.

Other current methods to evaluate hepatotoxicity include determination of the synthesis and secretion of albumin, cholesterol, and lipoproteins; transport of conjugated bile acids and bilirubin; ureagenesis; cytochrome P450 levels and activities; glutathione levels; release of α-glutathione s-transferase; ATP, ADP, and AMP metabolism; intracellular K+ and Ca2+ concentrations; the release of nuclear matrix proteins or oligonucleosomes; and induction of apoptosis (indicated by cell rounding, condensation of chromatin, and nuclear fragmentation). DNA synthesis can be measured as [$^3$H]-thymidine or BrdU incorporation. Effects of a drug on DNA synthesis or structure can be determined by measuring DNA synthesis or repair. [$^3$H]-thymidine or BrdU incorporation, especially at unscheduled times in the cell cycle, or above the level required for cell replication, is consistent with a drug effect. Unwanted effects can also include unusual rates of sister chromatid exchange, determined by metaphase spread. The reader is referred to Vickers (1997) for further elaboration.

C. Liver Therapy and Transplantation

The present disclosure also provides for the use of hepatocytes provided herein to restore a degree of liver function to a subject needing such therapy, perhaps due to an acute, chronic, or inherited impairment of liver function.

To determine the suitability of cells provided herein for therapeutic applications, the cells can first be tested in a suitable animal model. At one level, cells are assessed for their ability to survive and maintain their phenotype in vivo. Cells provided herein are administered to immunodeficient animals (such as SCID mice, or animals rendered immunodeficient chemically or by irradiation) at a site amenable for further observation, such as under the kidney capsule, into the spleen, or into a liver lobule. Tissues are harvested after a period of a few days to several weeks or more, and assessed as to whether starting cell types such as pluripotent stem cells are still present. This can be performed by providing the administered cells with a detectable label (such as green fluorescent protein, or 0-galactosidase); or by measuring a constitutive marker specific for the administered cells. Where cells provided herein are being tested in a rodent model, the presence and phenotype of the administered cells can be assessed by immunohistochemistry or ELISA using human-specific antibody, or by RT-PCR analysis using primers and hybridization conditions that cause amplification to be specific for human polynucleotide sequences. Suitable markers for assessing gene expression at the mRNA or protein level are provided in elsewhere in this disclosure. General descriptions for determining the fate of hepatocytes in animal models is provided in Grompe et al. (1999); Peeters et al. (1997); and Ohashi et al. (2000).

At another level, cells provided herein are assessed for its ability to restore liver function in an animal lacking full liver function. Braun et al. (2000) outline a model for toxin-induced liver disease in mice transgenic for the HSV-tk gene. Rhim et al. (1995) and Lieber et al. (1995) outline models for liver disease by expression of urokinase. Mignon et al. (1998) outline liver disease induced by antibody to the cell-surface marker Fas. Overturf et al. (1998) have developed a model for Hereditary Tyrosinemia Type I in mice by targeted disruption of the Fah gene. The animals can be rescued from the deficiency by providing a supply of 2-(2-nitro-4-fluoro-methyl-benzyol)-1,3-cyclohexanedione (NTBC), but they develop liver disease when NTBC is withdrawn. Acute liver disease can be modeled by 90% hepatectomy (Kobayashi et al., 2000). Acute liver disease can also be modeled by treating animals with a hepatotoxin such as galactosamine, CCl4, or thioacetamide.

Chronic liver diseases, such as cirrhosis, can be modeled by treating animals with a sub-lethal dose of a hepatotoxin long enough to induce fibrosis (Rudolph et al., 2000). Assessing the ability of cells provided herein to reconstitute liver function involves administering the cells to such animals, and then determining survival over a 1 to 8 week period or more, while monitoring the animals for progress of the condition. Effects on hepatic function can be determined by evaluating markers expressed in liver tissue, cytochrome P450 activity, and blood indicators, such as alkaline phosphatase activity, bilirubin conjugation, and prothrombin time, and survival of the host. Any improvement in survival, disease progression, or maintenance of hepatic function according to any of these criteria relates to effectiveness of the therapy, and can lead to further optimization.

Cells provided in certain aspects of the present disclosure that demonstrate desirable functional characteristics according to their profile of metabolic enzymes, or efficacy in animal models, may also be suitable for direct administration to human subjects with impaired liver function. For purposes of hemostasis, the cells can be administered at any site that has adequate access to the circulation, typically within the abdominal cavity. For some metabolic and detoxification functions, it is advantageous for the cells to have access to the biliary tract. Accordingly, the cells are administered near the liver (e.g., in the treatment of chronic liver disease) or the spleen (e.g., in the treatment of fulminant hepatic failure). In one method, the cells are administered into the hepatic circulation either through the hepatic artery, or through the portal vein, by infusion through an in-dwelling catheter. A catheter in the portal vein can be manipulated so that the cells flow principally into the spleen, or the liver, or a combination of both. In another method, the cells are administered by placing a bolus in a cavity near the target organ, typically in an excipient or matrix that will keep the bolus in place. In another method, the cells are injected directly into a lobe of the liver or the spleen.

The cells provided in certain aspects of the present disclosure can be used for therapy of any subject in need of having hepatic function restored or supplemented. Human conditions that may be appropriate for such therapy include fulminant hepatic failure due to any cause, viral hepatitis, drug-induced liver injury, cirrhosis, inherited hepatic insufficiency (such as Wilson's disease, Gilbert's syndrome, or al-antitrypsin deficiency), hepatobiliary carcinoma, autoimmune liver disease (such as autoimmune chronic hepatitis or primary biliary cirrhosis), and any other condition that results in impaired hepatic function. For human therapy, the dose is generally between about $10^9$ and $10^{12}$ cells, and typically between about $5\times10^9$ and $5\times10^{10}$ cells, making adjustments for the body weight of the subject, nature and severity of the affliction, and the replicative capacity of the administered cells. The ultimate responsibility for determining the mode of treatment and the appropriate dose lies with the managing clinician.

D. Use in a Liver Assist Device

Certain aspects of the present disclosure include cells provided herein that are encapsulated or part of a bioartificial liver device. Various forms of encapsulation are described in *Cell Encapsulation Technology and Therapeutics*, 1999. Hepatocytes provided in certain aspects of the present disclosure can be encapsulated according to such methods for use either in vitro or in vivo.

Bioartificial organs for clinical use are designed to support an individual with impaired liver function—either as a part of long-term therapy, or to bridge the time between a fulminant hepatic failure and hepatic reconstitution or liver transplant. Bioartificial liver devices are reviewed by Macdonald et al. (1999) and exemplified in U.S. Pat. Nos. 5,290,684, 5,624,840, 5,837,234, 5,853,717, and 5,935,849. Suspension-type bioartificial livers comprise cells suspended in plate dialysers, microencapsulated in a suitable substrate, or attached to microcarrier beads coated with extracellular matrix. Alternatively, hepatocytes can be placed on a solid support in a packed bed, in a multiplate flat bed, on a microchannel screen, or surrounding hollow fiber capillaries. The device has an inlet and outlet through which the subject's blood is passed, and sometimes a separate set of ports for supplying nutrients to the cells.

Cells are prepared according to the methods described earlier, and then plated into the device on a suitable substrate, such as a matrix of MATRIGEL® or collagen. The efficacy of the device can be assessed by comparing the composition of blood in the afferent channel with that in the efferent channel—in terms of metabolites removed from the afferent flow, and newly synthesized proteins in the efferent flow.

Devices of this kind can be used to detoxify a fluid such as blood, wherein the fluid comes into contact with the hepatocytes provided in certain aspects of the present disclosure under conditions that permit the cell to remove or modify a toxin in the fluid. The detoxification will involve removing or altering at least one ligand, metabolite, or other compound (either natural or synthetic) that is usually processed by the liver. Such compounds include but are not limited to bilirubin, bile acids, urea, heme, lipoprotein, carbohydrates, transferrin, hemopexin, asialoglycoproteins, hormones like insulin and glucagon, and a variety of small molecule drugs. The device can also be used to enrich the efferent fluid with synthesized proteins such as albumin, acute phase reactants, and unloaded carrier proteins. The device can be optimized so that a variety of these functions is performed, thereby restoring as many hepatic functions as are needed. In the context of therapeutic care, the device processes blood flowing from a patient in hepatocyte failure, and then the blood is returned to the patient.

E. Distribution for Commercial, Therapeutic, and Research Purposes

In some embodiments, a reagent system is provided that includes cells that exists at any time during manufacture, distribution or use. The kits may comprise any combination of the cells described in the present disclosure in combination with undifferentiated pluripotent stem cells or other differentiated cell types, often sharing the same genome. Each cell type may be packaged together, or in separate containers in the same facility, or at different locations, at the same or different times, under control of the same entity or different entities sharing a business relationship. Pharmaceutical compositions may optionally be packaged in a suitable container with written instructions for a desired purpose, such as the mechanistic toxicology.

In some embodiments, a kit that can include, for example, one or more media and components for the production of cells is provided. The reagent system may be packaged either in aqueous media or in lyophilized form, where appropriate. The container means of the kits will generally include at least one vial, test tube, flask, bottle, syringe or other container means, into which a component may be placed, and preferably, suitably aliquoted. Where there is more than one component in the kit, the kit also will generally contain a second, third or other additional container into which the additional components may be separately placed. However, various combinations of components may be comprised in a vial. The components of the kit may be provided as dried powder(s). When reagents and/or components are provided as a dry powder, the powder can be reconstituted by the addition of a suitable solvent. It is envisioned that the solvent may also be provided in another container means. The kits of the present disclosure also will typically include a means for containing the kit component(s) in close confinement for commercial sale. Such containers may include injection or blow molded plastic containers into which the desired vials are retained. The kit can also include instructions for use, such as in printed or electronic format, such as digital format.

IV. Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Development and Characterization of Hepatocyte Differentiation Process Several steps in the process of hepatocyte differentiation were tested and optimized for the production of hepatocytes which are mature as assessed by cell markers and cell morphology.

The differentiation process for the production of the hepatocytes comprises differentiation of the iPSCs to DE cells which are then induced to form hepatoblasts and then differentiated to hepatocytes.

iPS cells were maintained on MATRIGEL® in E8 Medium under hypoxic conditions (5% O2), using 0.5 mM EDTA for splitting approximately every 4-5 days. The iPSC cultures were acclimatized to hypoxia for around 10 passages before the onset of hepatocyte differentiation. Starting iPS cell cultures were seeded at 15-20 k/cm² on MATRIGEL®-coated 6-well plates or T150 flasks. Two days after seeding, media was changed to preconditioning medium (PCM) and fed daily for two-three days. Endoderm induction was performed by placing the cells in media containing activin (DE Day 0 Medium, also referred to as T0 medium). On days 1-2, media was changed to DE Day 1-2 Medium (also referred to as T1-T2 medium) containing activin, along with low concentrations of BMP4, VEGF and FGF2 for the next two days. From day 3-9, media was changed to DE Day 3-9 (also referred to as T3-T6 medium) with the base medium SFD, supplemented with Activin, BMP4 and VEGF. On day 10, a sampling of the culture was performed for staining the percentage of definitive endoderm cells. The cells were individualized using warm TrypLE for 5-7 minutes at 37° C. and quenched. Surface staining was performed to quantify the levels of Tra181, CXCR4, CD117 by flow cytometry. The cultures were transitioned to hepatocyte induction Stage 1 Medium containing the mesoendoderm inducing factors BMP4, VEGF, FGF along with Dexamethasone, DMSO, Hepatocyte growth factor and FGF to foster the conversion of definitive endodermal to hepatoblasts over a 6 day period. The cells were fed fresh hepatocyte induction media every 48 hours through day 16. On day 17, the entire culture was harvested using TrypLE. The harvested cells were then cryopreserved. The cryopreservation was performed by aspirating the supernatant media post spin and the cell pellet was resuspended in Bambanker solution at 5-10 million cells/mL and chilled constantly in a Control Rate Freezer followed by liquid nitrogen storage.

Alternately, the cell individualized cell suspension was placed in media for aggregate formation. The cells were placed in Stage 2 hepatocyte differentiation medium+Blebbistatin. Aggregate formation was initiated at a density of $0.25 \times 10^6$ cells/mL. The cells were placed into T75 ULA flasks under static conditions or spinner flasks under hypoxic conditions. On day 18, media was changed to Stage 2+CHIR99021 Medium and fed every other day until day 24. On day 20, cultures were transitioned from hypoxic to normoxic conditions. On day 23, a sampling of the culture was performed for staining analysis. Aggregates were digested using warm TrypLE for 5-7 minutes at 37° C. and quenched. Single cells were treated with Live/Dead Red for 15 minutes at room temperature before fixing with 4% PFA solution for 15 minutes at room temperature. Intracellular staining to quantify the levels of AAT, ASGPR, Albumin, and matched isotypes was performed via flow cytometry. On day 25, cultures were harvested and cryopreserved at the end of Stage 2 of differentiation process. This offers the cryopreservation of AAT positive hepatocytes. The intracellular expression of AAT correlates to the surface expression of CD133. This feature allows an option for magnetic sorting of CD133 positive cells at the end of Stage 2 of hepatocyte differentiation to cryopreserve a pure population of AAT positive hepatocytes. The cryopreservation of end of Stage 2 hepatocytes was performed by resuspending the cell pellet post digestion in Bambanker solution at 5-20 million cells/mL and chilled constantly in a Control Rate Freezer followed by liquid nitrogen storage. The addition of protease inhibitors and ECM like MATRIGEL® can be included in the cryopreservation of Stage 2 hepatocytes.

End of Stage 1 cryopreserved cells can be thawed on Collagen I coated plates. Stage 1 cells were matured to Stage 2 and then to Stage 3 over 16-18 days of culture to generate mature hepatocytes. End of Stage 2 cells are placed in Stage 3 maturation on a collagen I coated plate and the presence of mature AAT/Albumin positive expressing mature hepatocytes with a classic cobble stone polygonal morphology can be visualized 8-10 post plating.

Several experiments were performed to derive this optimized hepatocyte differentiation process. First, the effect of the GSK3 inhibitor, CHIR99021, was assessed on the different Stages of the present hepatocyte differentiation method. The CHIR preconditioning was performed in the absence of growth factors and in a basal non iPSC media.

Figure 6:
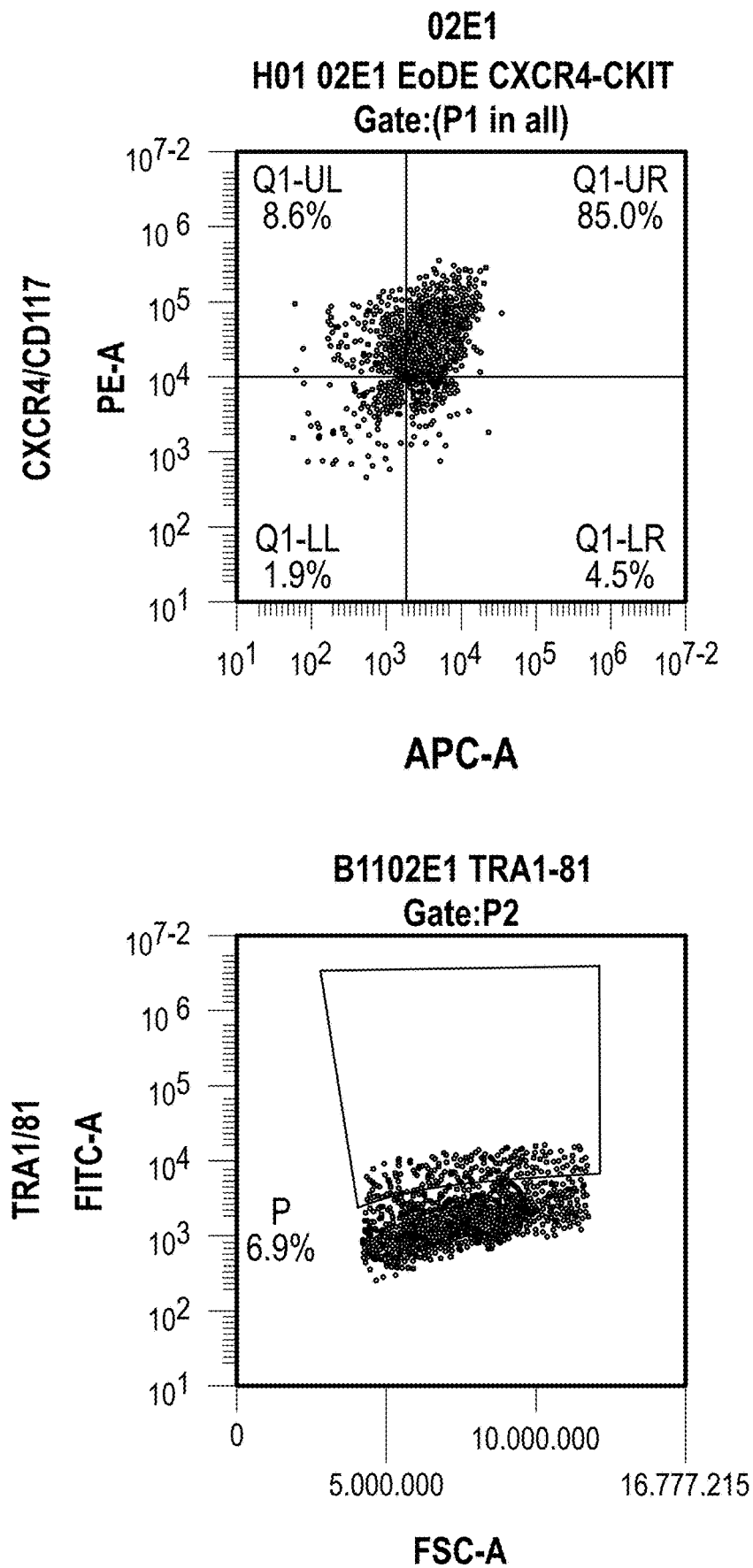
FIG. 6: Exit from pluripotency and Definitive Endoderm (DE) induction following CHIR preconditioning for two days in 02E1 and 01D1 Nonalcoholic steatohepatitis (NASH) iPSCs described in Table 1: (left) FACS analysis for DE markers CXCR4 (y-axis) and CD117 (x-axis) and pluripotency marker TRA1-81 at the end of DE induction phase; (right) qPCR for pluripotency genes POU5F1 and NANOG throughout the process with two different probes used for each gene.
Figure 6:
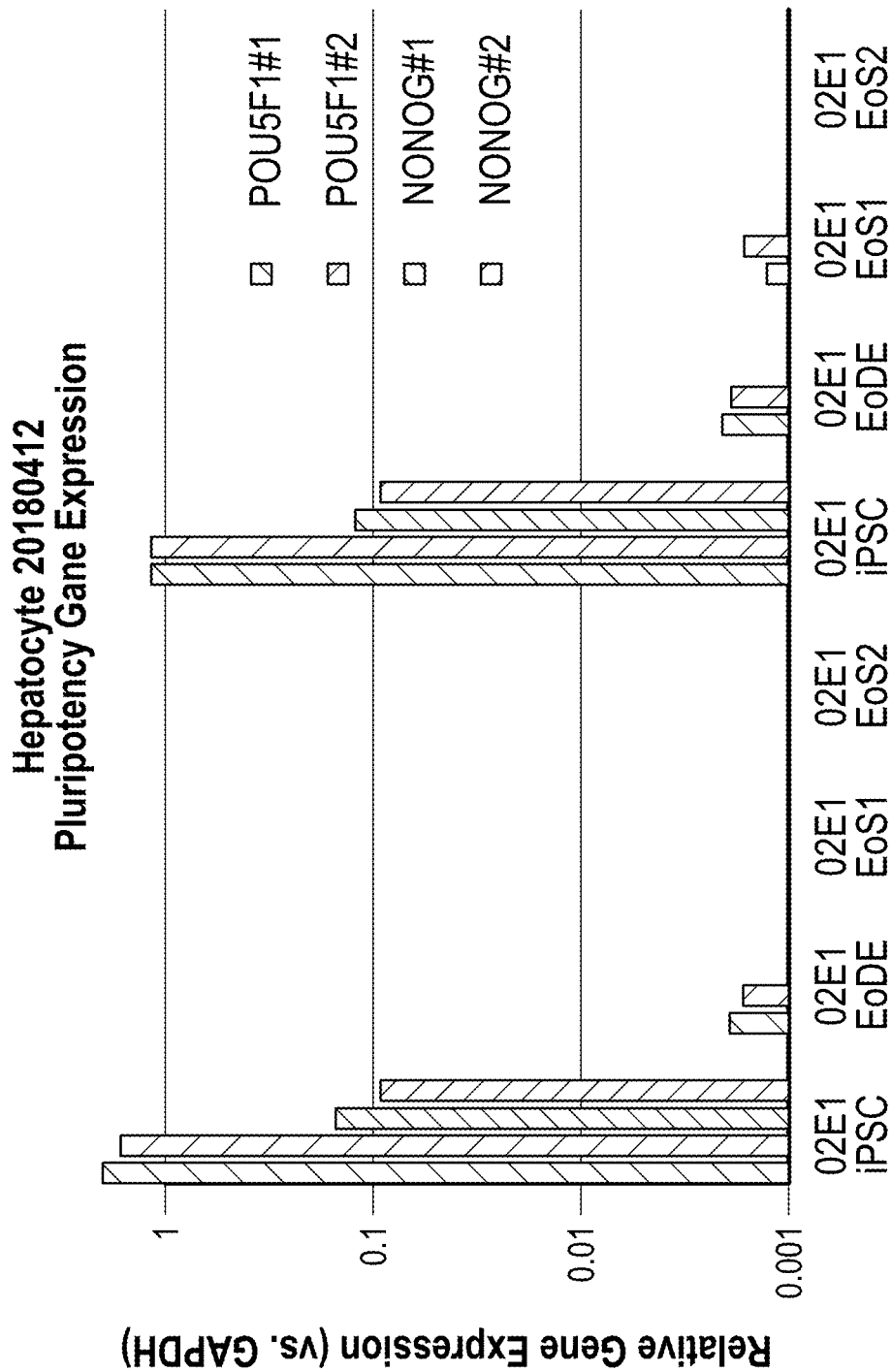
Figure 7A:
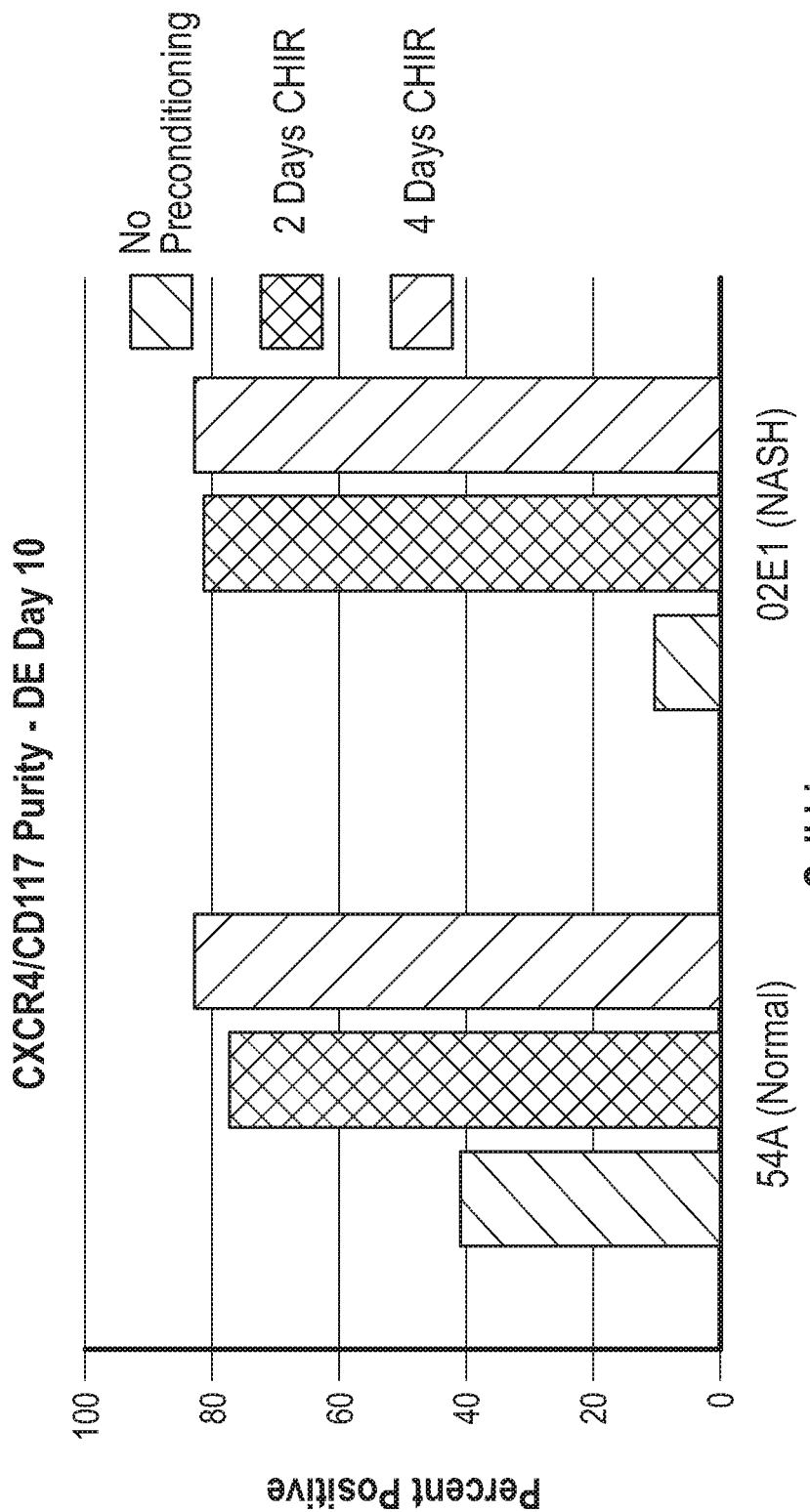
FIGS. 7A-7C: Characterization of cells during hepatocyte differentiation process by expression of CXCR4/CD117, AAT, or TRA181 with or without CHIR99021 pre-conditioning. Assessing the effect of 2 or 4 days of CHIR99021 preconditioning in Normal (54A) and NASH specific iPSC lines (02E1) at the end of definitive endoderm and end of Stage 2 of the hepatocyte differentiation process. Quantification of CXCR4/CD117 (FIG. 7A) and TRA-181 (FIG. 7B) purity at the end of definitive endoderm in Normal and NASH iPSC lines. Quantification of AAT purity at the end of Stage 2 hepatocyte differentiation in Normal and NASH iPSC lines (FIG. 7C).
Figure 7B:
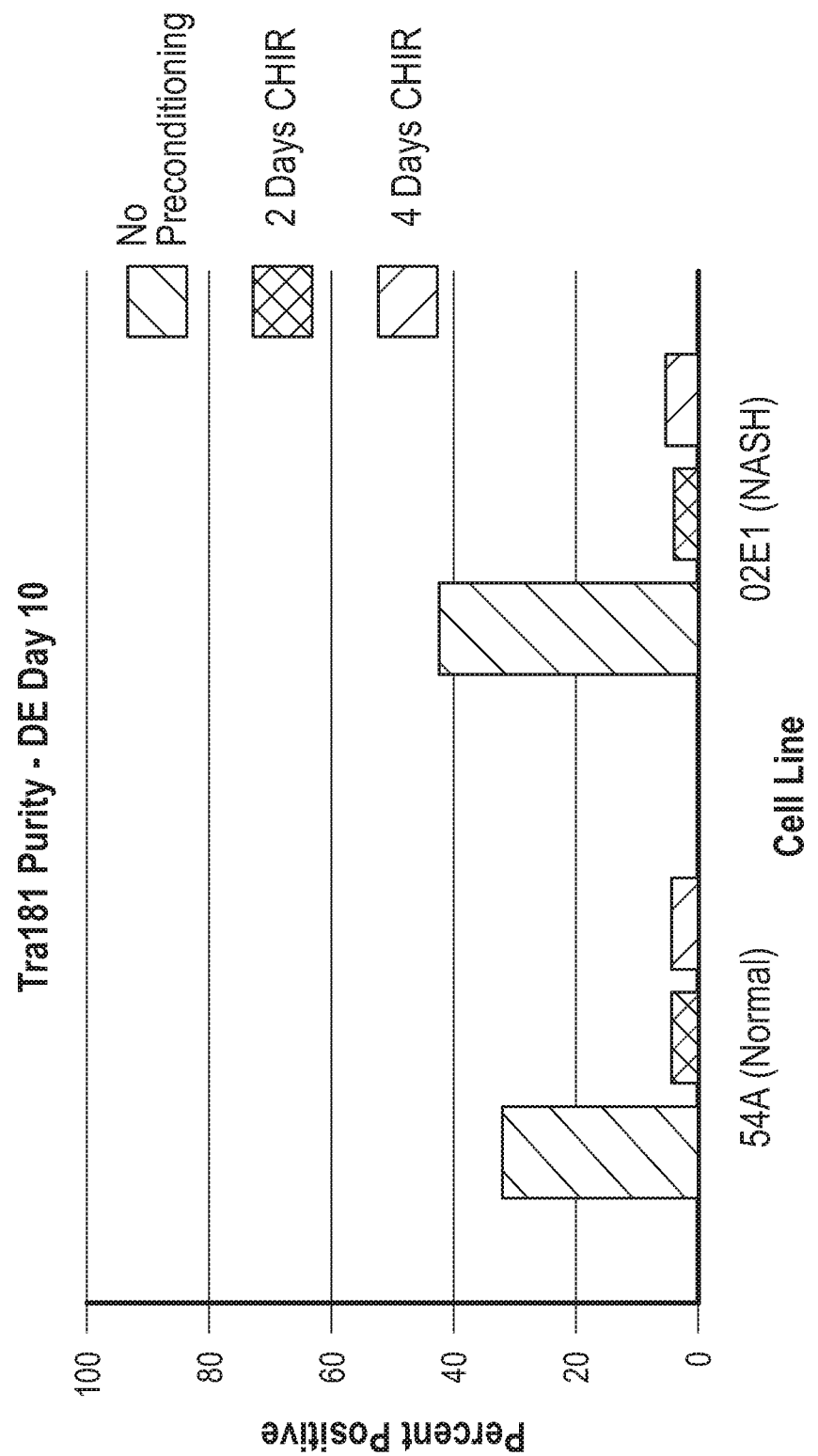
Figure 7C:
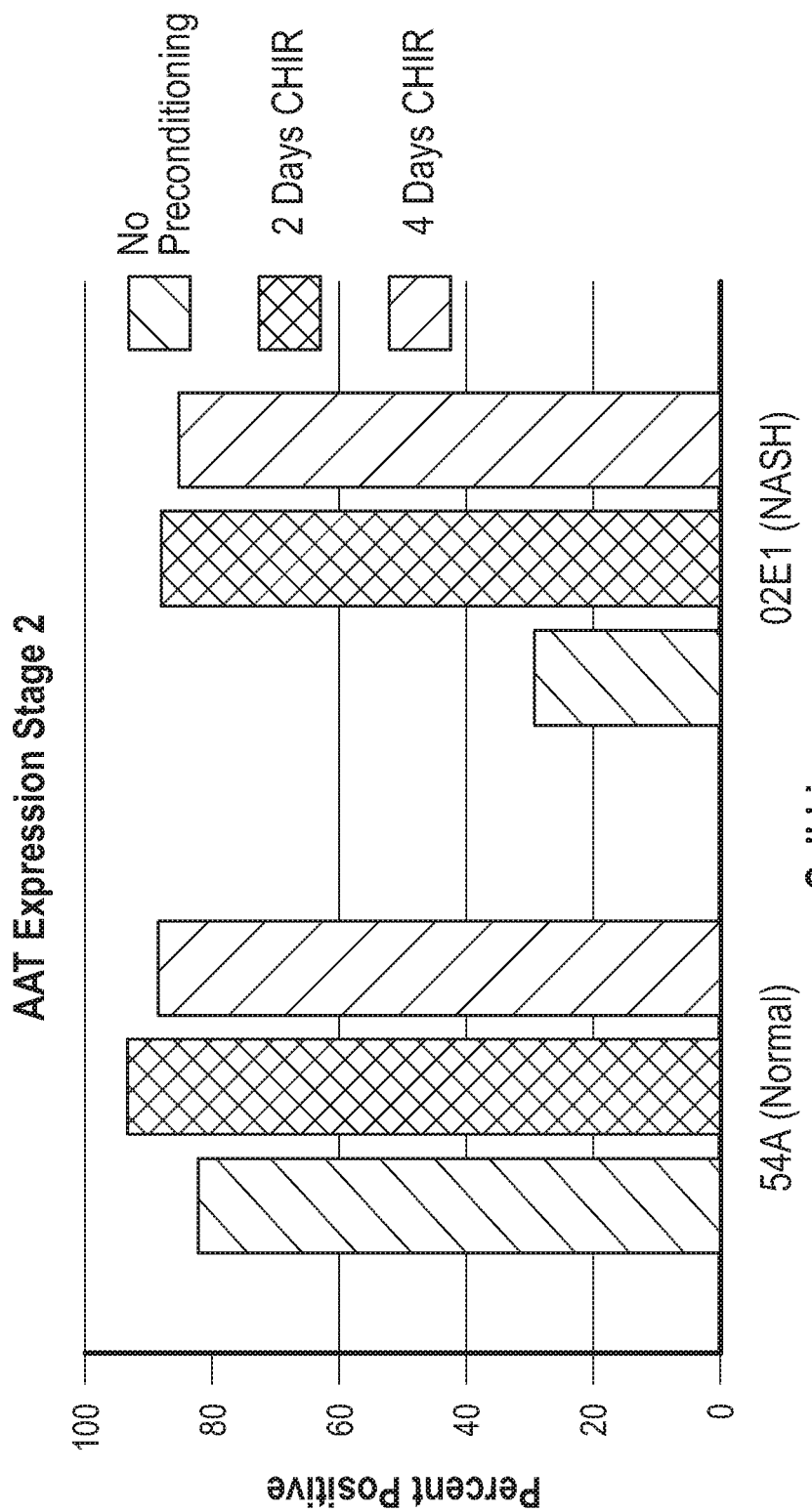
Figure 8A:
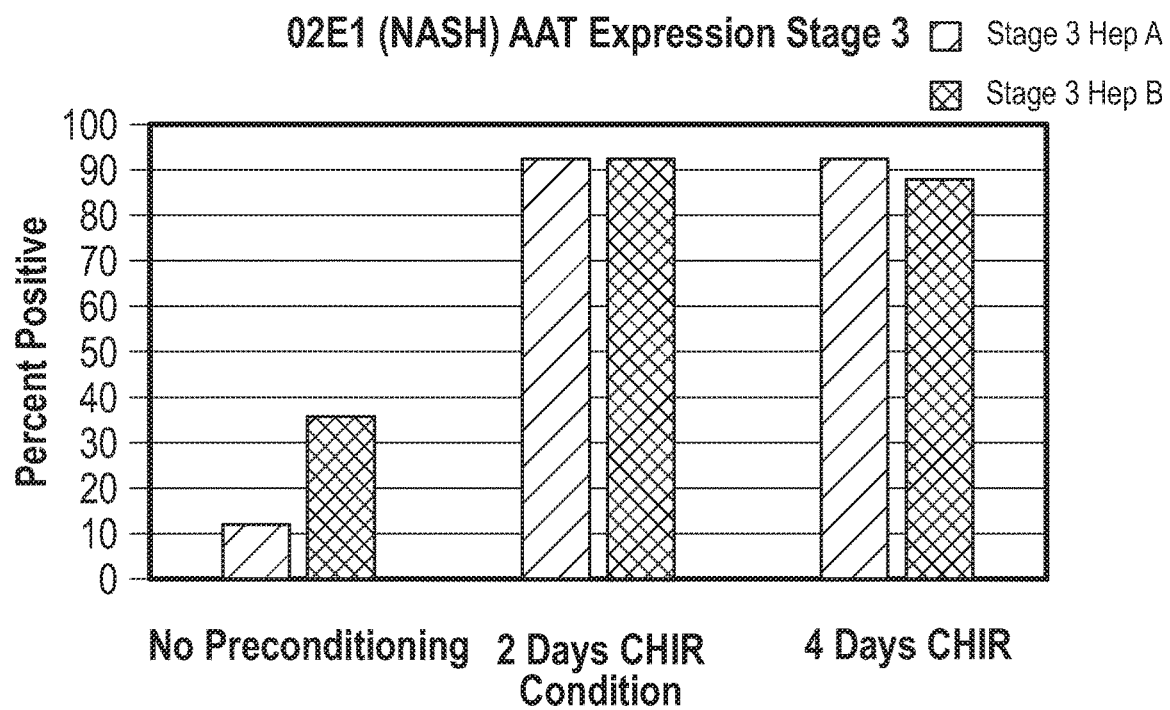
FIGS. 8A-8D: Percent of cells positive for AAT or albumin expression during Stage 3 of differentiation with or without CHIR99021 pre-conditioning. Assessing the effect of duration of CHIR preconditioning in Normal (54A) and NASH specific iPSC line (02E1) at the end of live Stage 3 (as described in FIG. 17) of the hepatocyte differentiation process. Quantification of AAT (FIG. 8A) and albumin purity (FIG. 8D) at the end of Stage 3 in normal iPSC lines. Quantification of AAT (FIGS. 8A, 8B) and albumin purity (FIGS. 8C, 8D) at the end of Stage 3 in normal (54A) and NASH specific (02E1) iPSCs.
Figure 8B:
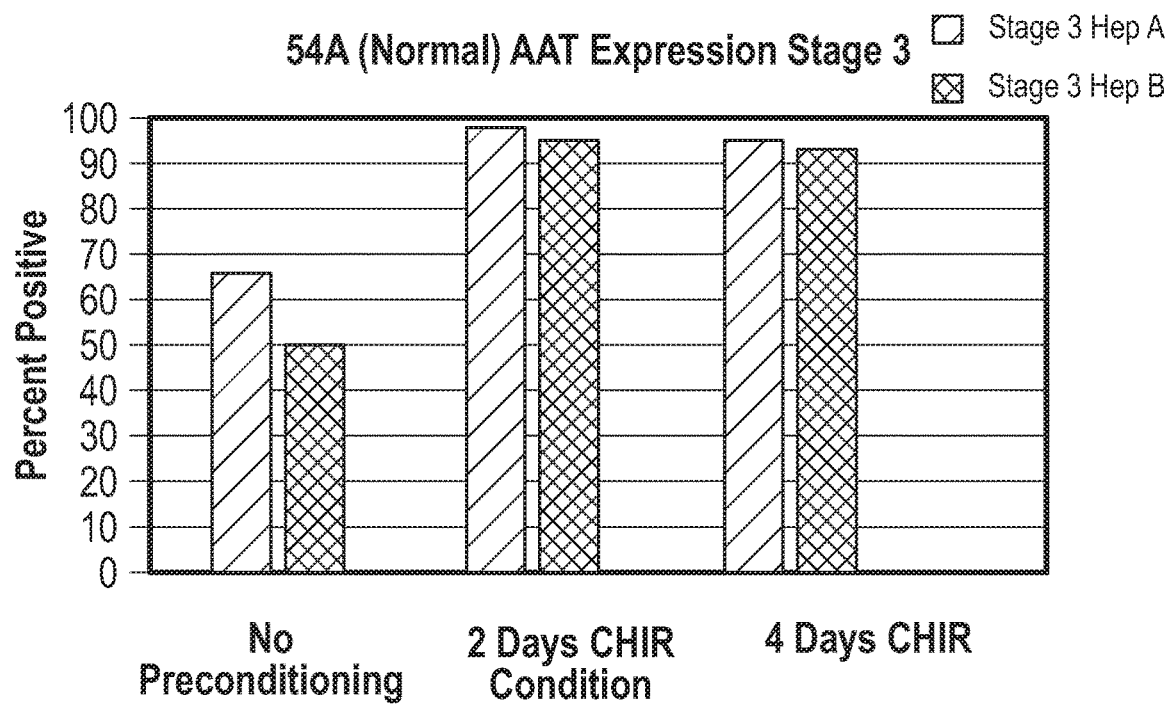
Figure 8C:
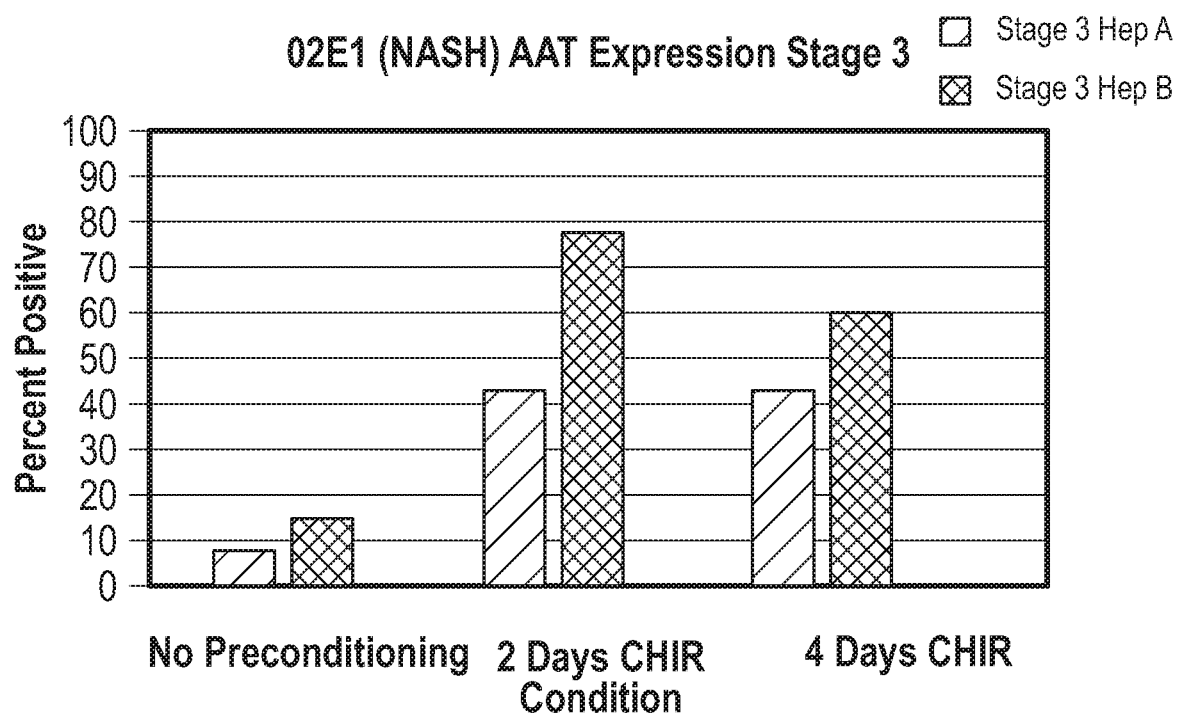
Figure 8D:
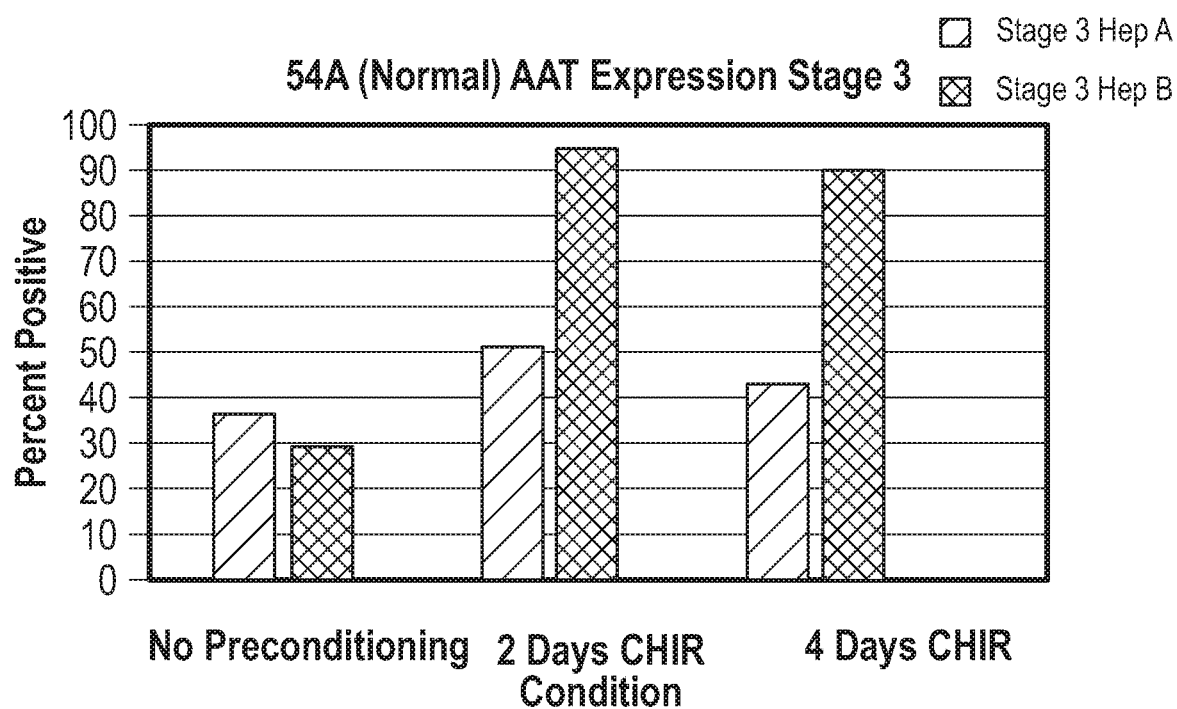

This preconditioning was observed to be particularly valuable in promoting the cells' exit from pluripotency as evidenced by a dramatic decline in TRA1-81 staining and expression of pluripotency genes POU5F1 (the gene encoding for the transcription factor OCT4) and NANOG. This decline was accompanied by good levels of DE induction shown by flow cytometry staining for DE markers CXCR4 and CD117 (FIG. 6).

The next step was to determine the optimal timing of CHIR preconditioning of iPSCs and check the impact of preconditioning on the emergence of DE, hepatoblasts and hepatocytes in Stage 2 and Stage 3 of differentiation. CHIR99021 addition prior to DE induction was observed to promote hepatocyte proliferation and differentiation efficiency. The introduction of CHIR99021 during Stage 1 was found to have no positive effect, while its introduction during Stage 2 showed a beneficial effect on cell proliferation and no negative impact on cell morphology.

Figure 9:
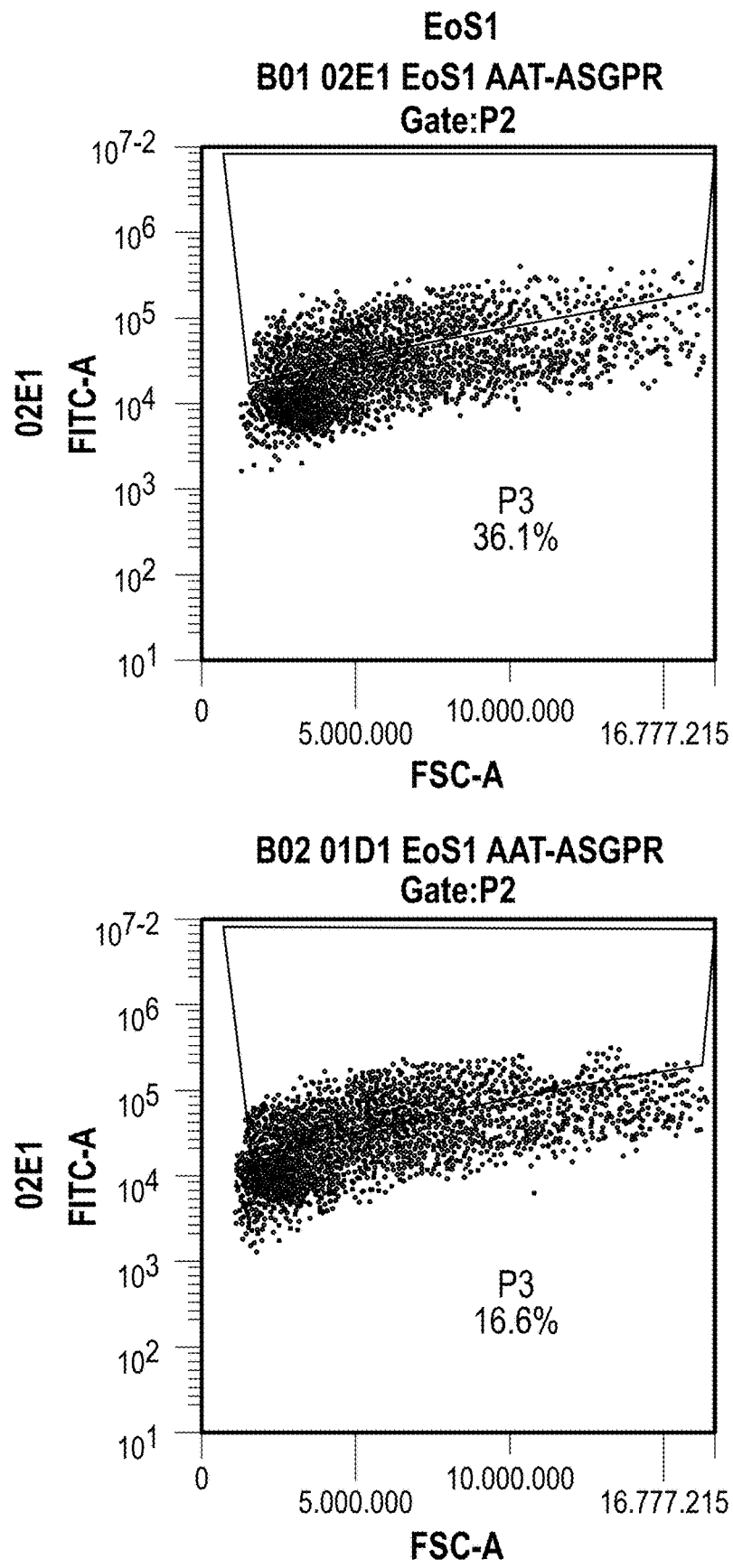
FIG. 9: The effects of CHIR99021 supplementation during various times and for various durations during the hepatocyte differentiation protocol on AAT purity. Kinetics of emergence of AAT positive hepatocytes following CHIR99021 treatment at Stage 2 of the hepatic differentiation process. Increase in AAT purity with CHIR99021 supplementation at Stage 2 of hepatocyte differentiation in NASH (01D1 and 02E1) specific iPSCs: The FACS plots quantify the purity of AAT expression cultures at end of Stage 1 (EoS1) and at indicated points (Day 2, Day 4, Day 6 and Day 8) during Stage 2 of hepatocyte differentiation.
Figure 9:
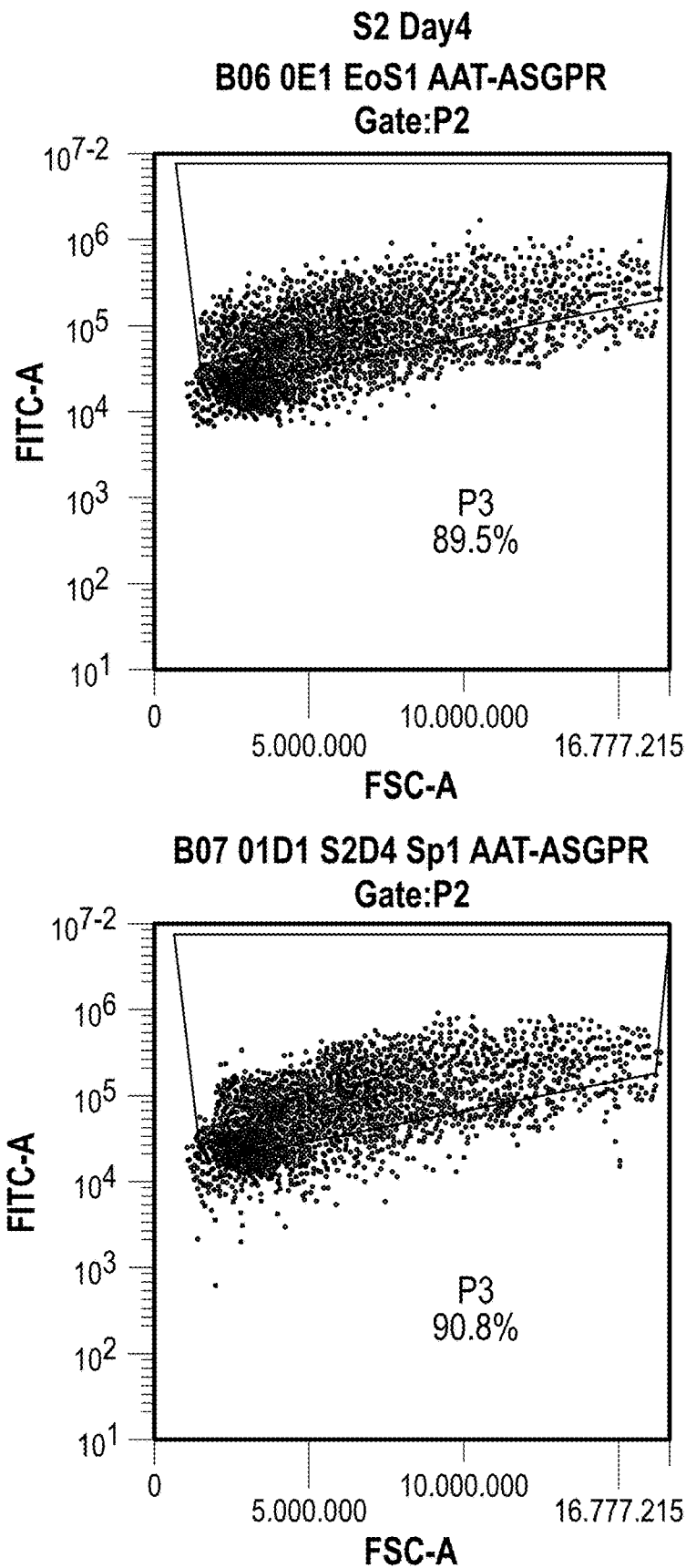
Figure 9:
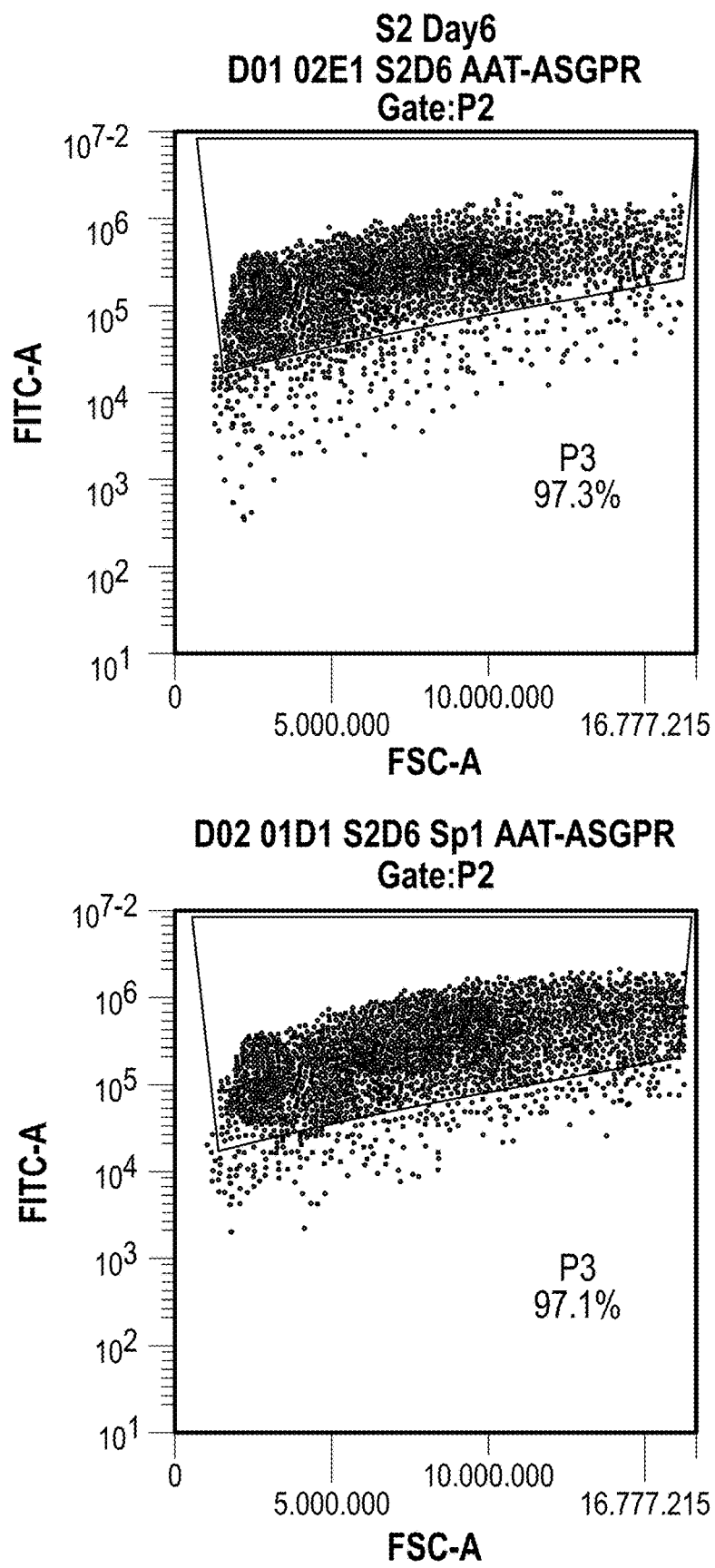
Figure 9:
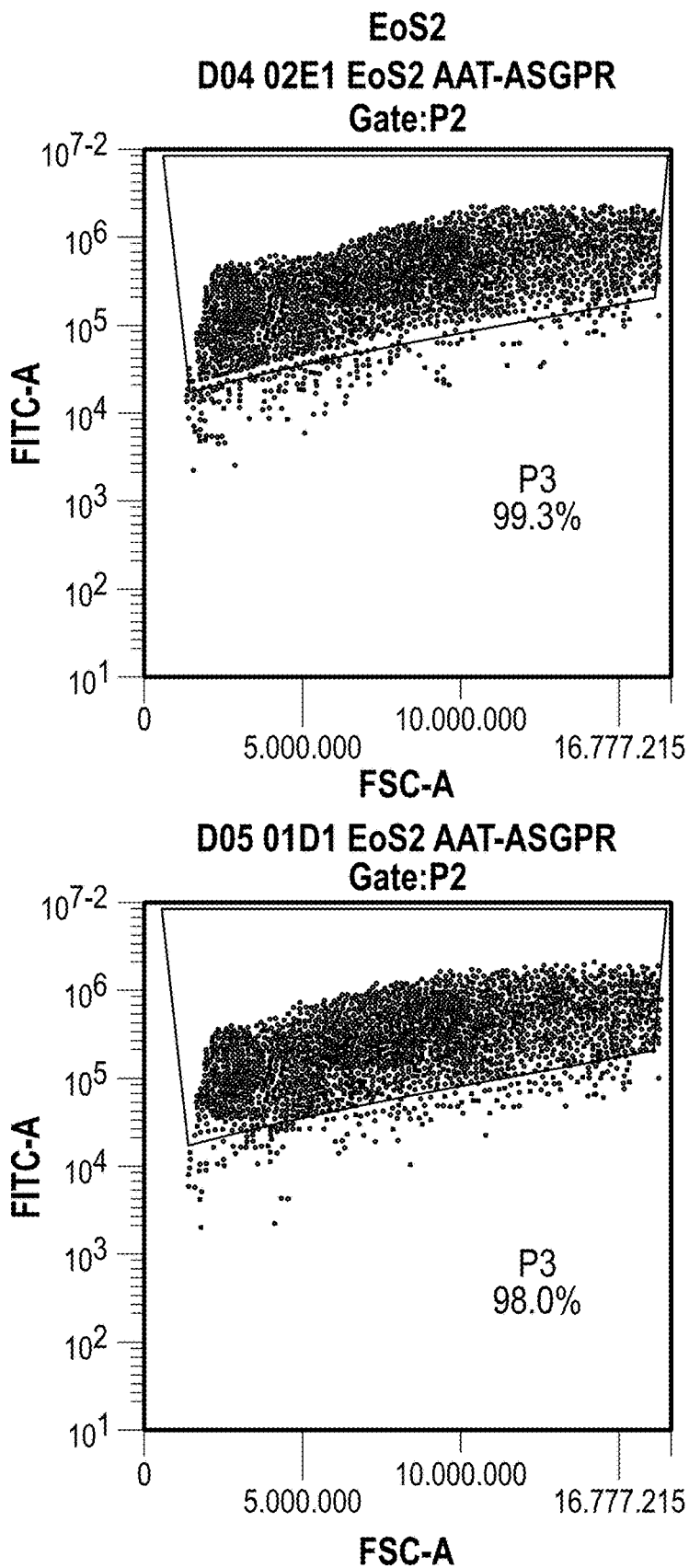
Figure 10:
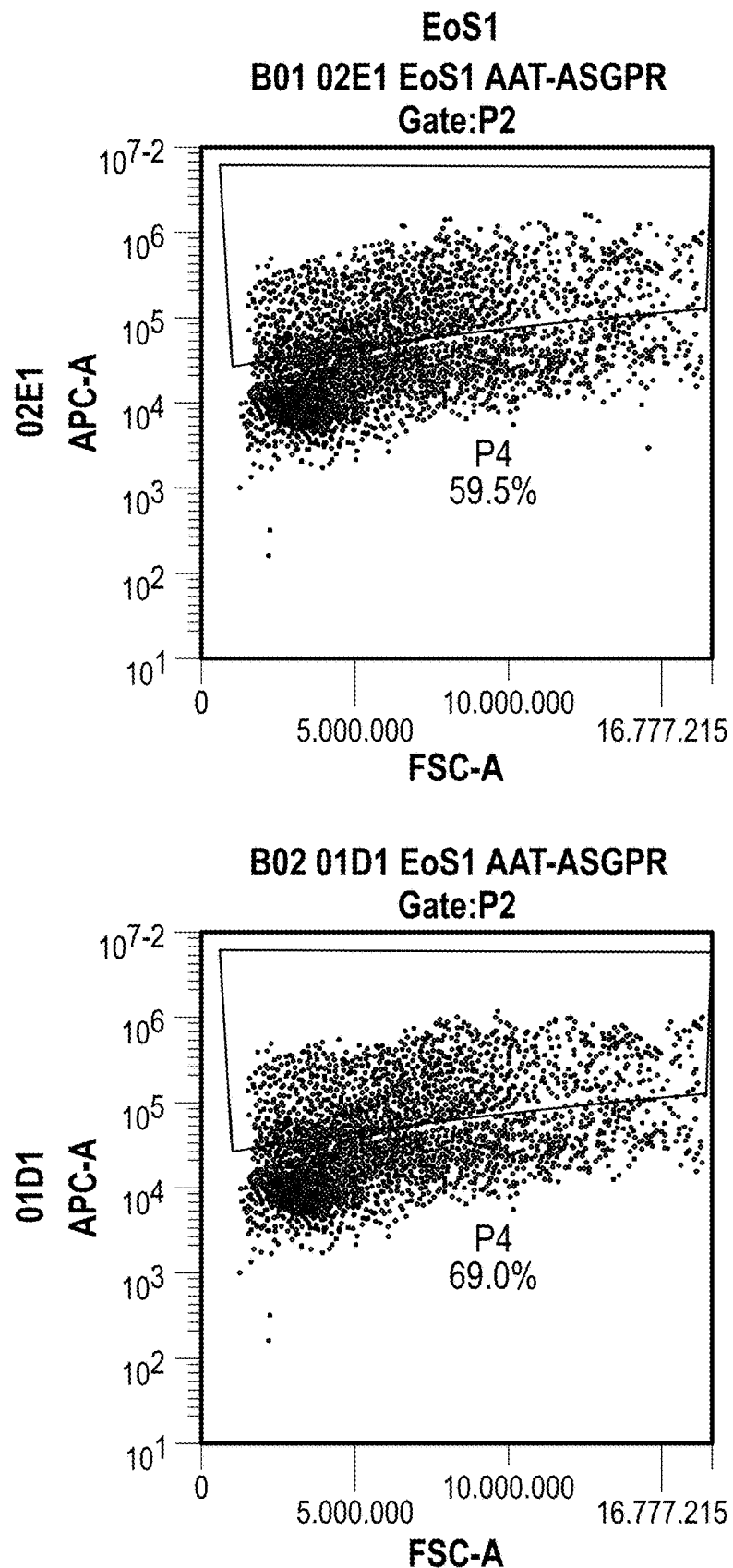
FIG. 10: The effects of CHIR99021 supplementation during various times and for various durations during the hepatocyte differentiation protocol on asiaglycoprotein receptor 1 (ASGPR) purity. Kinetics of emergence of ASGPR positive hepatocytes following CHIR99021 treatment at Stage 2 of the hepatic differentiation process. Increase in ASGPR purity with CHIR99021 supplementation at Stage 2 of hepatocyte differentiation in NASH specific (01D1 and 02E1) iPSC quantified. The FACs plots depict purity of ASGPR expression harvested at end of Stage 1 (EoS1) and at indicated points (Day 2, Day 4, Day 6 and Day 8) during Stage 2 of hepatocyte differentiation.
Figure 10:
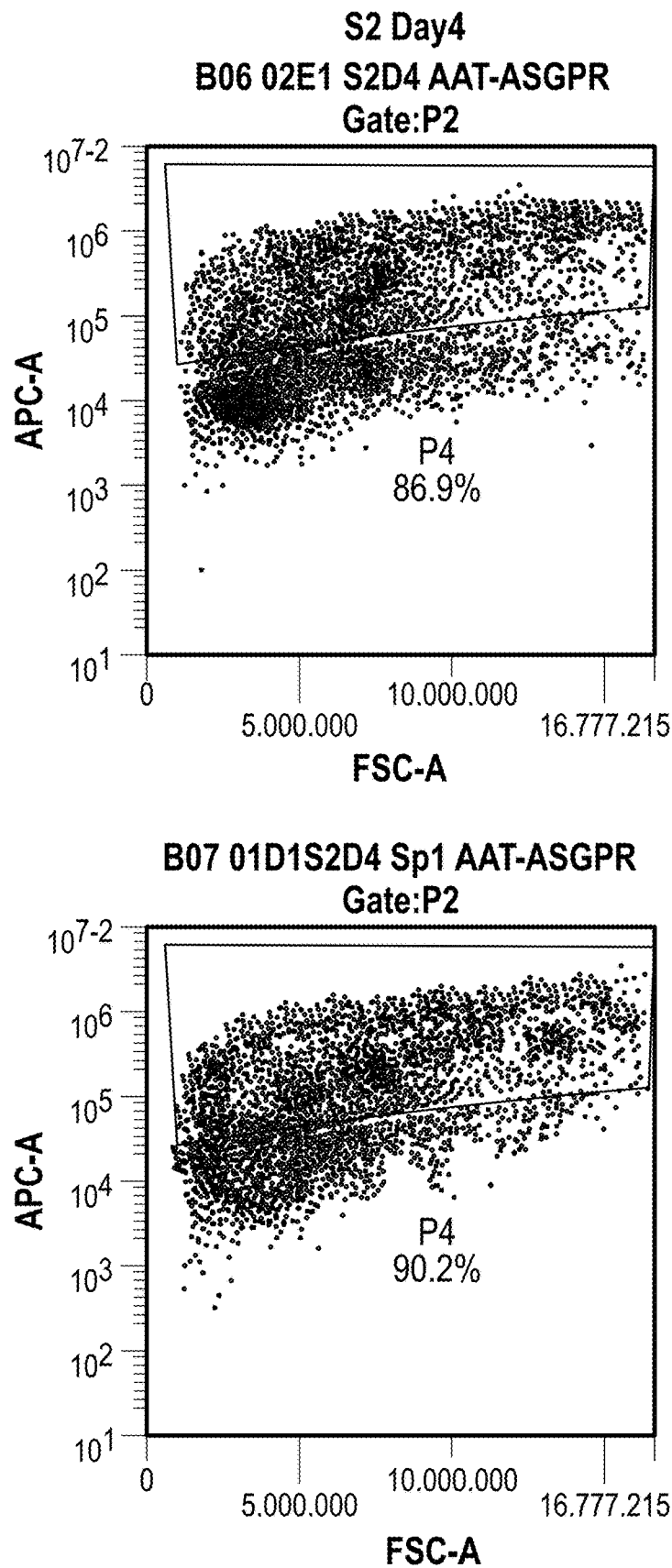
Figure 11A:
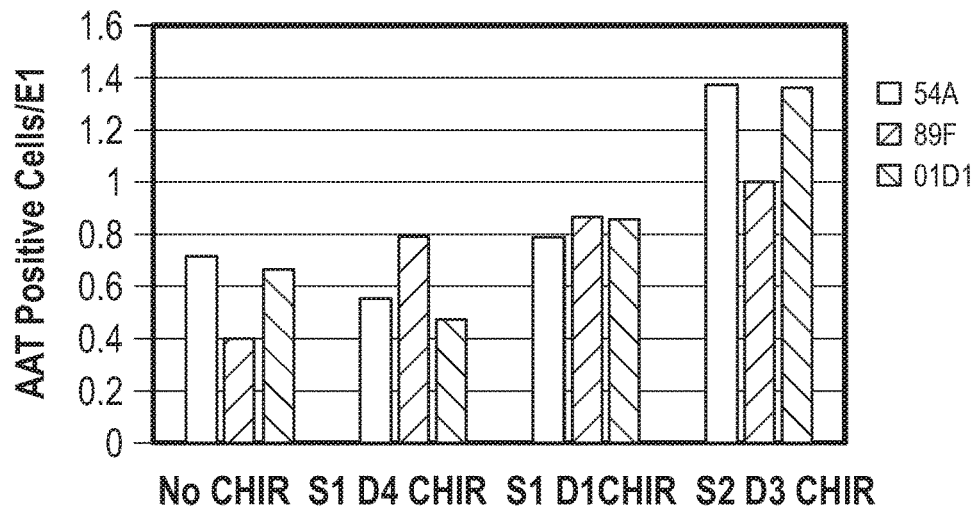
FIGS. 11A-11E: CHIR99021 supplementation during the hepatocyte differentiation protocol is beneficial across different cell lines. Addition of CHIR99021 during Stage 2 of differentiation increases cell proliferation and AAT-positive cell yields without impacting AAT purity. Normal (54A) and 2 NASH specific iPSC lines (89F and 01D1) were differentiated in the presence or absence of 3 µM CHIR99021. The duration of CHIR99021 treatment began at day 4 of Stage 1 (S1 D4 CHIR), beginning of Stage 2 (S2 D1 CHIR), or day 3 of Stage 2 (S2 D3 CHIR). The total viable cell number and purity of AAT was quantified. The efficiency of conversion of end of Stage 1 hepatoblasts to AAT positive hepatocytes at the end of Stage 2 (EOS2) (FIG. 11A), the cell number at the end of Stage 2 (EoS2) (FIG. 11B) and the number of AAT positive cells (yield) at the end of Stage 2 (FIG. 11C) along with the morphological appearance of emerging hepatocyte cultures in NASH (01D1) (FIG. 11D) and Normal (54A) (FIG. 11E) iPSCs is captured.
Figure 11B:
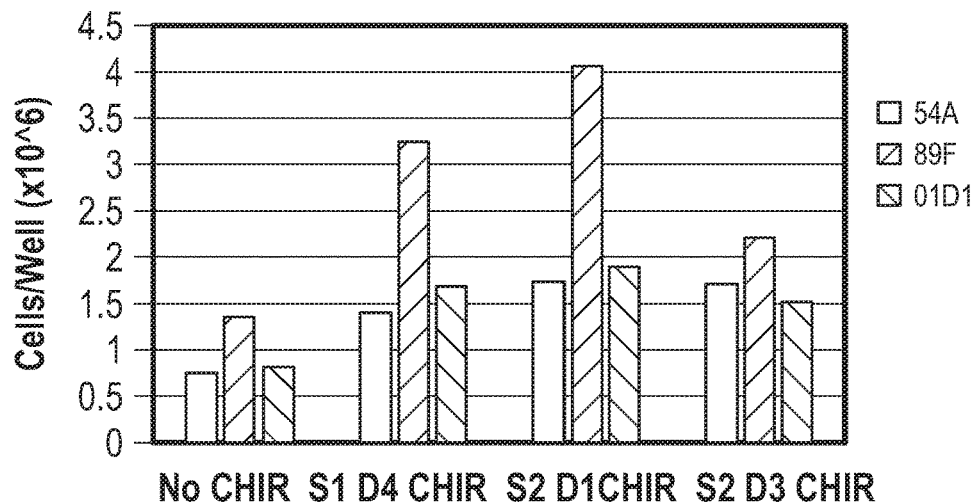
Figure 11C:
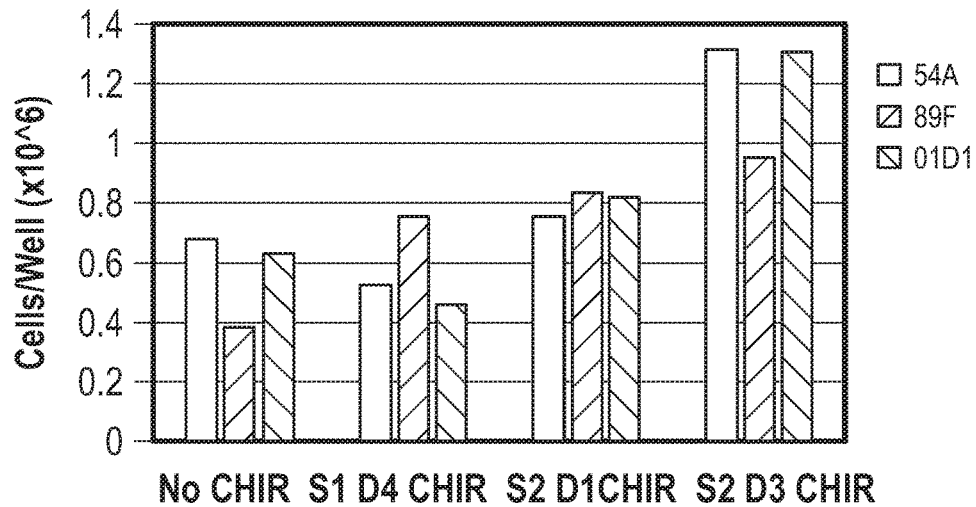
Figure 11D:
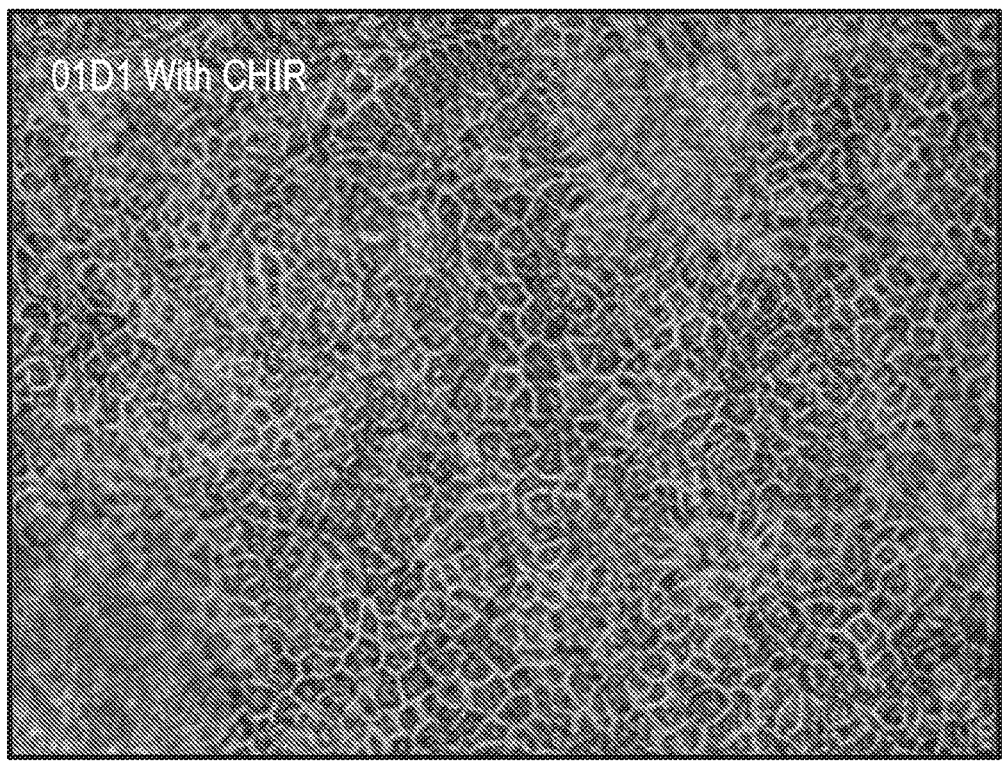
Figure 11E:
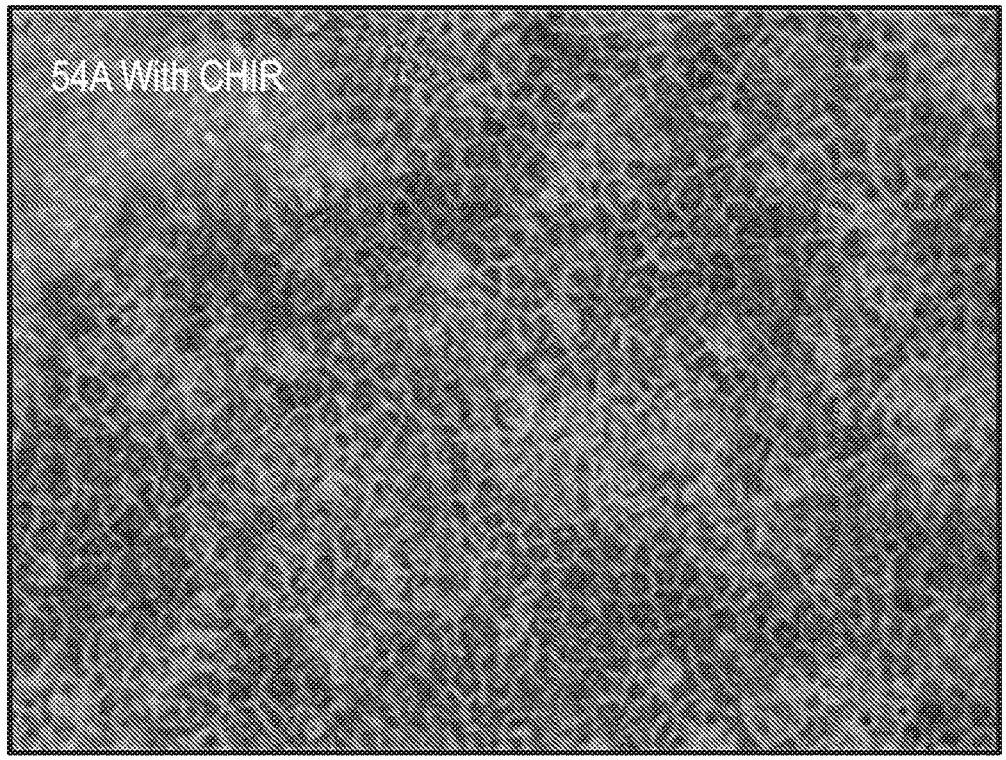

Supplementation of CHIR99021 midway through the hepatocyte differentiation was explored to increase the yield and efficiency of the differentiation process. The supplementation of CHIR proved effective in promoting the expansion of cells during hepatoblast to hepatocyte transition. Moreover, the expansion in cell number did not hamper the hepatic phenotype of the cells as characterized by the emergence of AAT-positive cells. Cells that underwent preconditioning with CHIR revealed a smooth transition from DE to hepatic lineage and by end of Stage 2 (EoS2) exhibited high purity of hepatic markers alpha 1 antitrypsin (AAT) (FIG. 9) and asiaglycoprotein receptor (ASGPR1) (FIG. 10).

Table 1. Panel of NASH patient and non-disease control lines used to test protocol modifications. CHIR pre-conditioning downregulates pluripotency markers during DE induction, such as TRA181, POU5F1, NANOG.

| Cell Line | Name | Source | Gender | Status |
|---|---|---|---|---|
| CW10020DD1 | 20D | CIRM | Male | NASH |
| CW10024DD1 | 24D | CIRM | Female | Normal |
| CW10042FF1 | 42F | CIRM | Female | NASH |
| CW10045BB1 | 45B | CIRM | Female | NASH |
| CW10054AA1 | 54A | CIRM | Female | Normal |
| 01503.102 | 1503 | CDI Internal | Female | Normal |
| 01505.103 | 1505 | CDI Internal | Female | Normal |
| CW10201DD1 | 01D1 | CIRM | Male | NASH |
| CW10202EE1 | 02E1 | CIRM | Male | NASH |
| CW10131AA1 | 31A1 | CIRM | Male | NASH |
| CW10152EE1 | 52E1 | CIRM | Male | NASH |
| CW10166DD1 | 66D1 | CIRM | Male | NASH |
| CW10167BB1 | 67B1 | CIRM | Male | NASH |
| CW10189FF1 | 89F1 | CIRM | Male | NASH |

NASH = Non-alcoholic steatohepatitis

To determine the optimal point for aggregate formation, the effects of differentiation outcome were assessed. It was found that mid-process aggregate timing by aggregate formation at the end of Stage 1 produces a cell population with the highest AAT purity.

Next, the effects of growth factor concentration were assessed. A decrease in HGF concentration used during the differentiation together with removing EGF and modifying VEGF timing has no adverse effects on differentiation outcome.

Finally, the addition of TGFβ and NOTCH inhibitors to the Stage 3 maturation media was found to promote albumin expression and reveal hepatocyte morphology.

Figure 12:
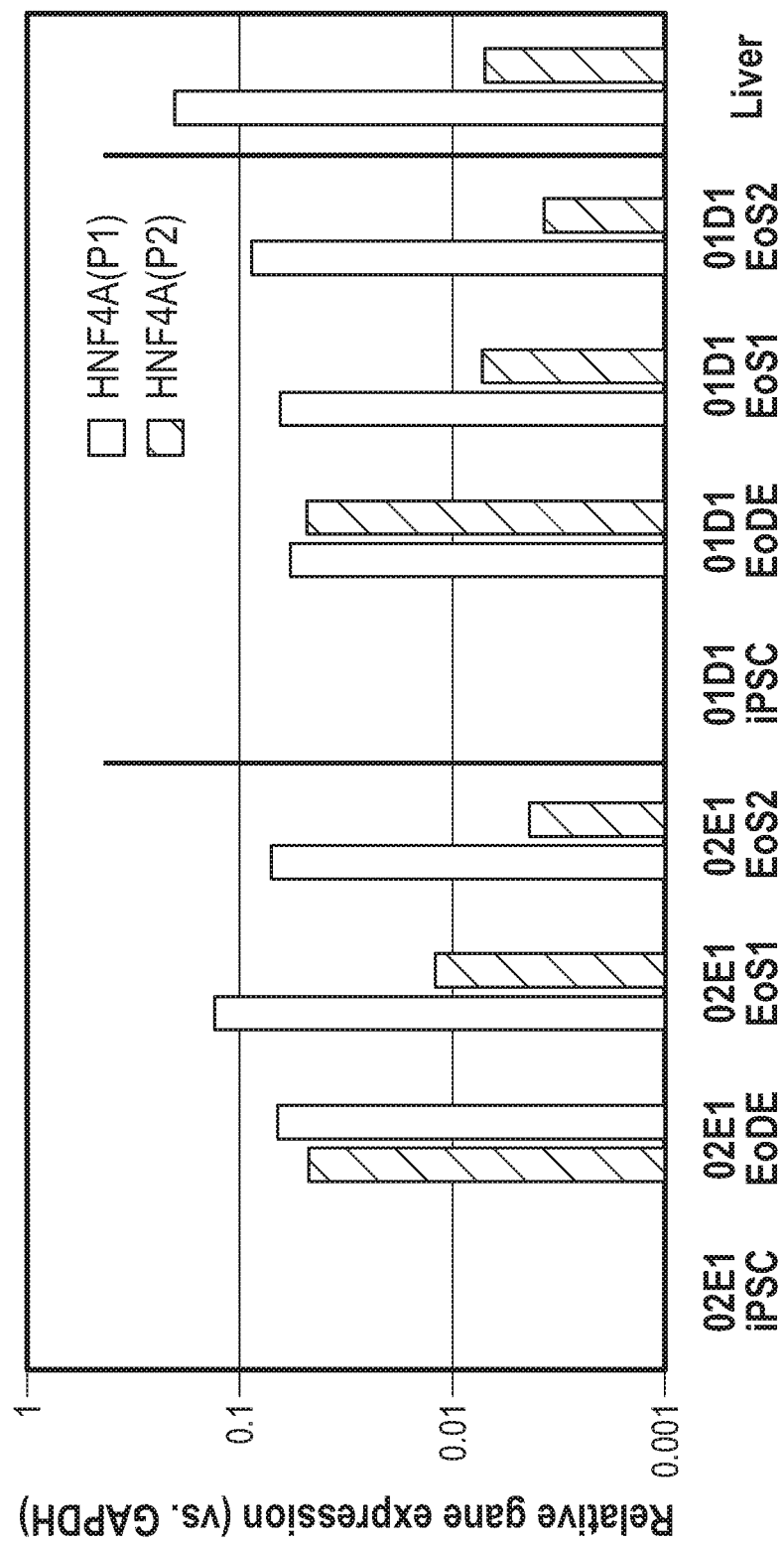
FIG. 12: Analysis of HNF4a during the hepatocyte differentiation process by qPCR analysis using RNA extracted from the cells at indicated time points during differentiation. Taqman probes detecting transcripts from promoter 1 (P1) or promoter 2 (P2) were used. The HNF4A transcription profile from NASH specific iPSC (02E1 and 01D1) derived hepatocytes is compared with total RNA from adult human liver (Invitrogen).

Quantification of HNF4A levels: Gene expression of nuclear receptor HNF4A was examined during hepatocyte differentiation. This receptor is a key regulator of numerous hepatic processes and its expression is necessary for liver development. The gene encoding HNF4A is under transcriptional control of two distinct promoters termed P1 and P2. P1 transcripts are characteristic of more mature hepatocytes while P2 transcripts are characteristic of fetal hepatocytes. In hepatocytes produced by this protocol, P1 transcripts predominate by end of Stage 1 (EoS1). Notably, the HNF4A transcriptional profile—mRNA levels and P1/P2 transcript ratio—was similar to that in adult human liver (FIG. 12).

Figure 13:
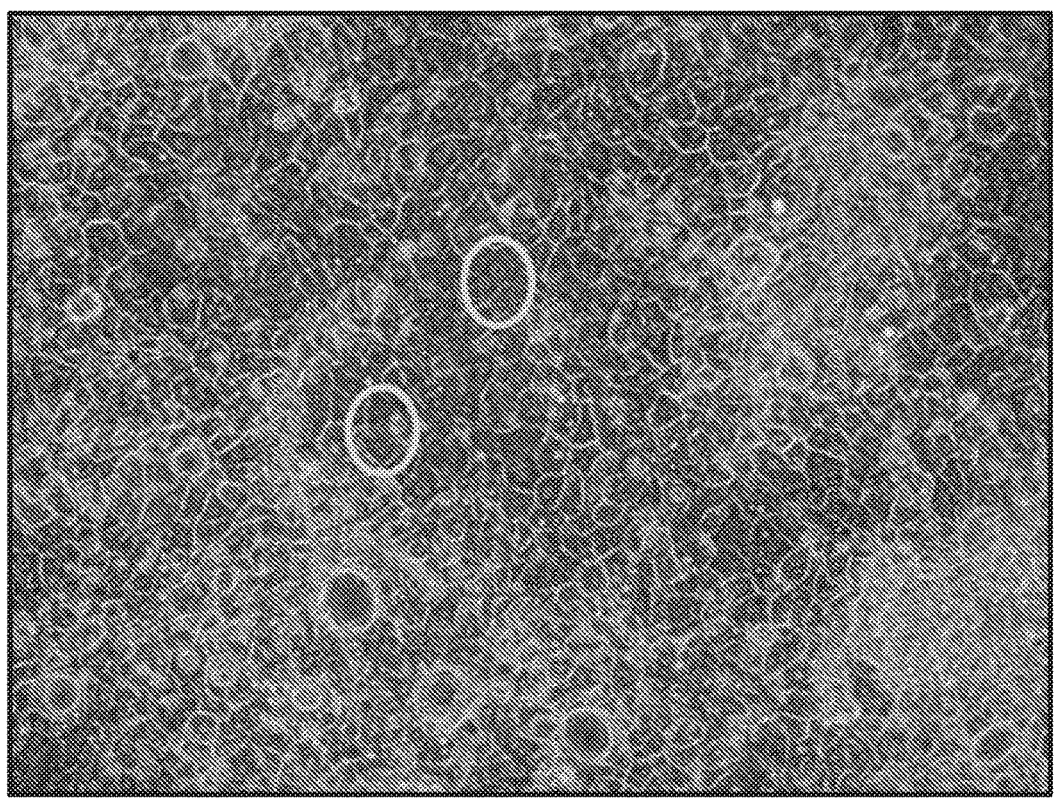
FIG. 13: Image of cell morphology during Stage 3 of differentiation. Representative image of NASH specific (01D1) hepatocytes taken on day 7 after plating onto Collagen I plates at the end of Stage 2 taken under 20× objective. Binucleated cells, a key hepatocyte feature, are circled.
Figure 14:
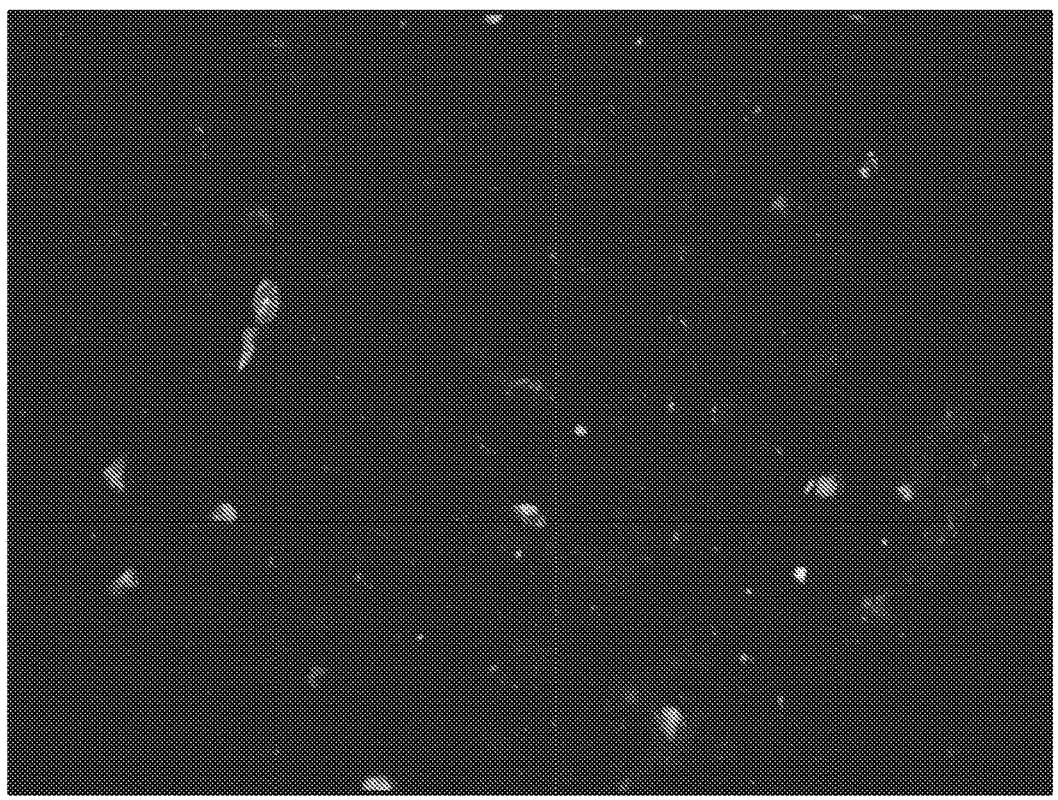
FIG. 14: Image of carboxy dichlorofluorescein diacetate (CDFDA) uptake of hepatocytes during Stage 3 of differentiation. Representative image of NASH specific (01D1) hepatocytes stained with the dye CDFDA 7 days after plating onto Collagen I plates at the end of Stage 2 taken under 10× objective. CDFDA is colorless but its cleavage in hepatocytes produces green fluorescent metabolite carboxy dichlorofluorescein (CDF), which is then transported into bile canaliculi. Bile canaliculi are visualized by CDF.
Figure 15:
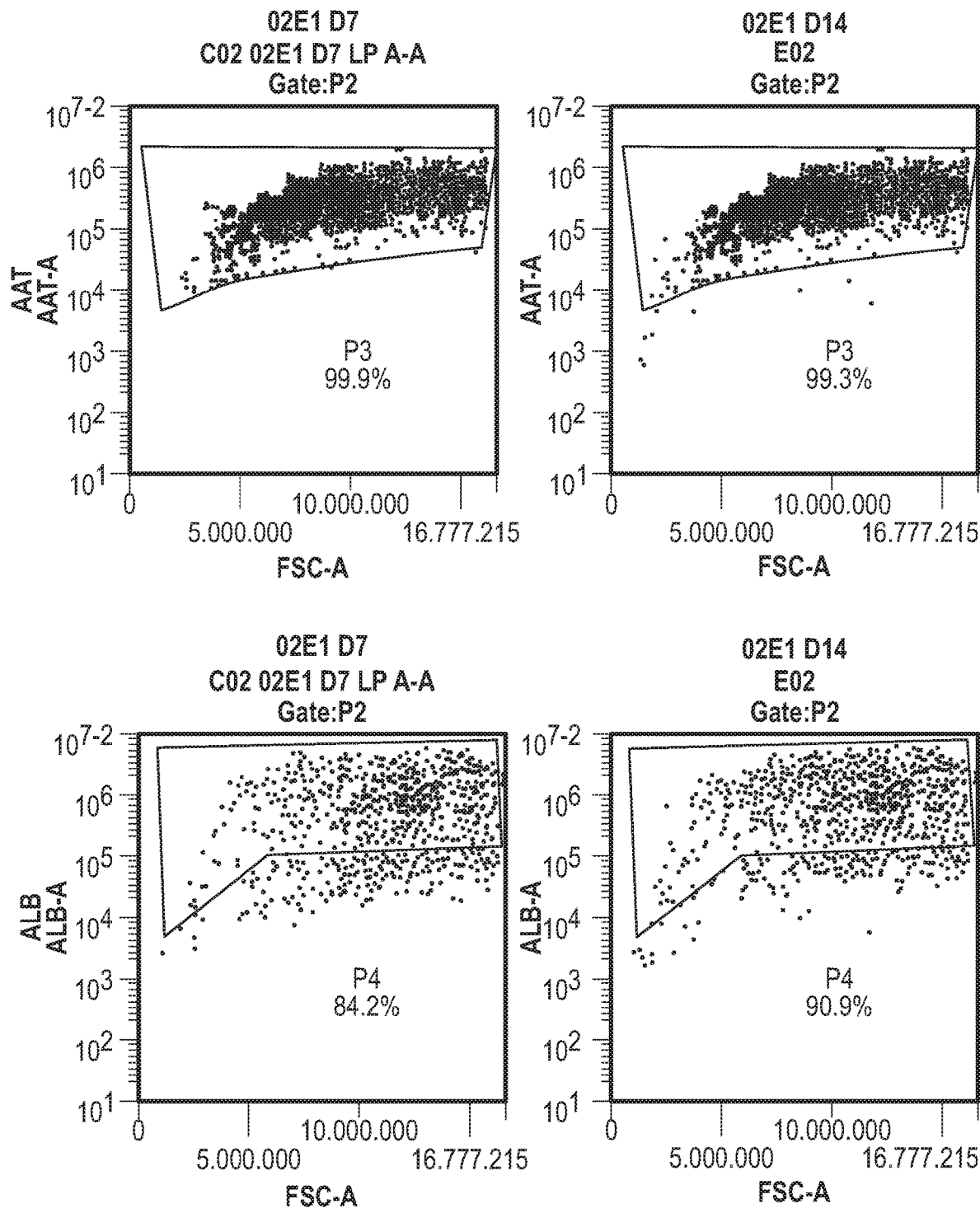
FIG. 15: Assessment of Stage 3 hepatocytes by flow cytometry indicating Albumin purity. FACS analysis for AAT (top) and albumin (ALB, bottom) expression in NASH specific (02E1) hepatocytes harvested at indicated points during Stage 3 of differentiation with percentage of positive cells (purity) shown in red on each scatter plot.
Figure 15:
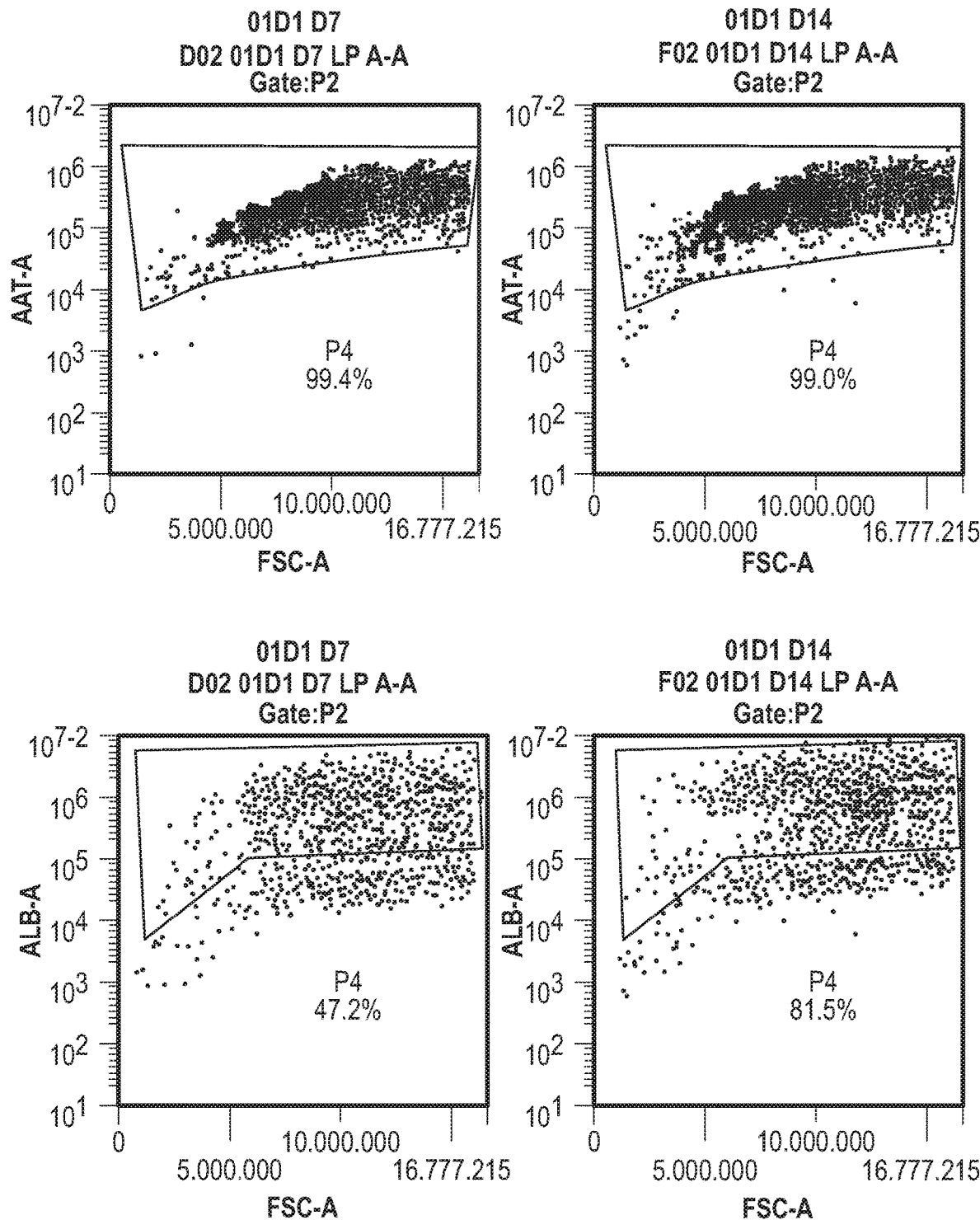
Figure 16:
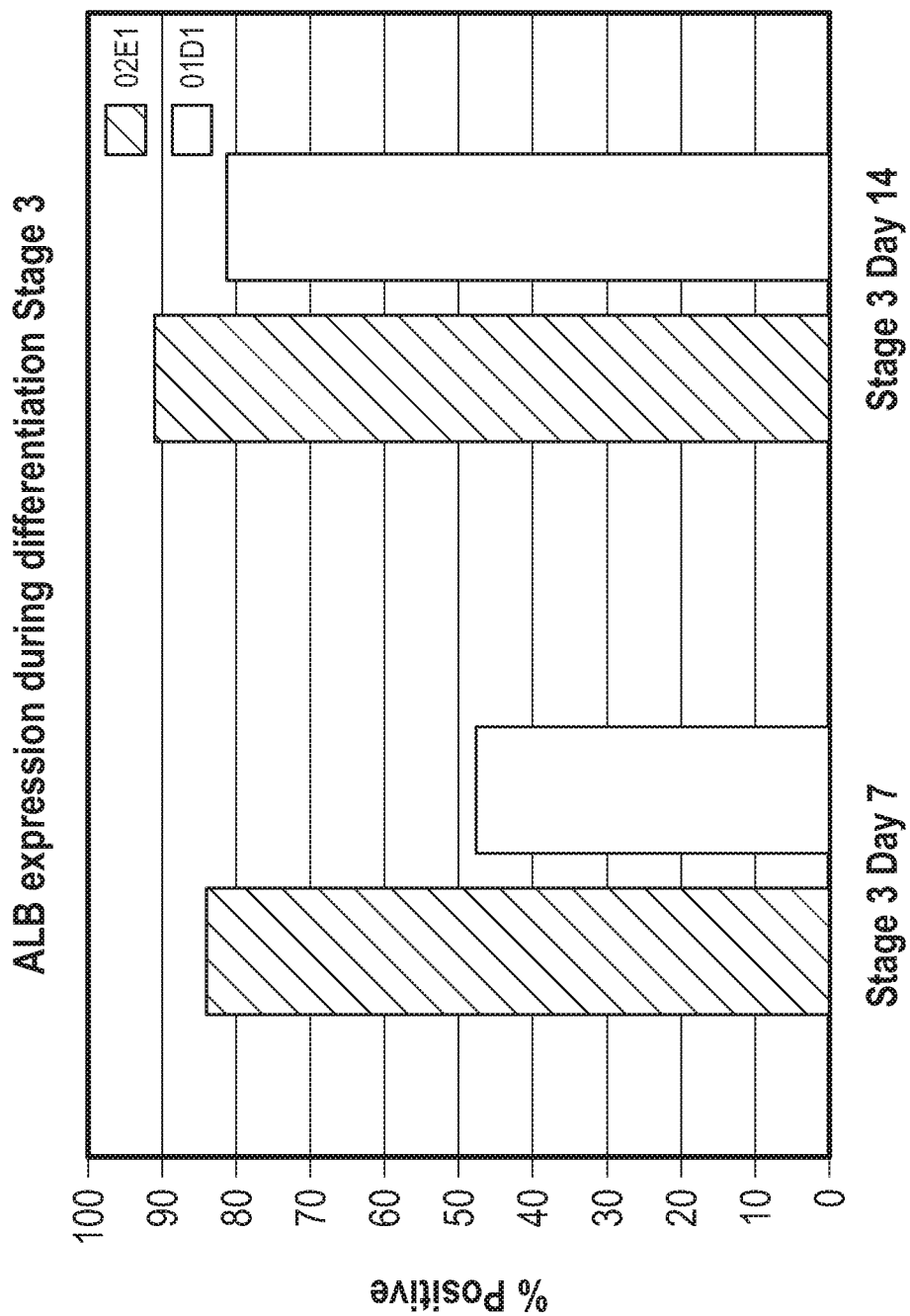
FIG. 16: Albumin expression indicative of maturation. Increase in albumin (ALB) purity in NASH specific (02E1 and 01D1) hepatocytes during the maturation phase—Stage 3—of the process.
Figure 18:
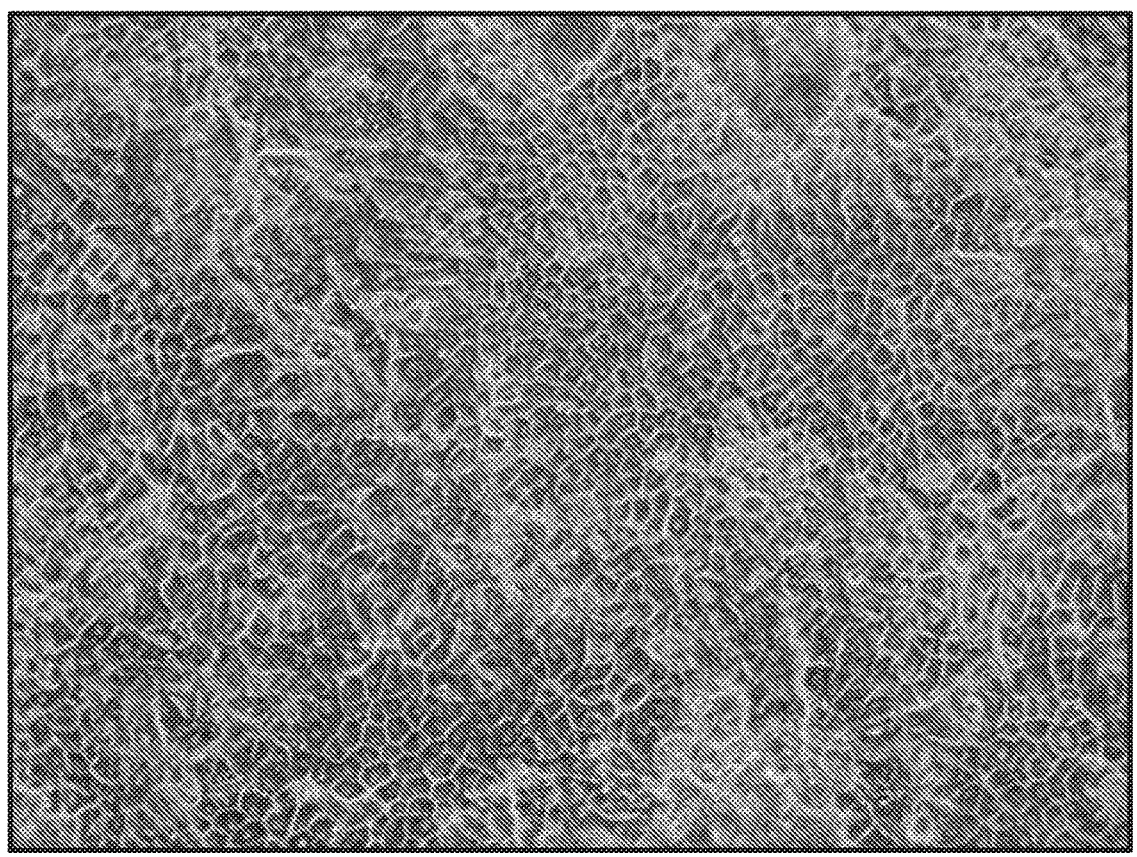
FIG. 18: AAT and Albumin expression and morphology of Stage 3 hepatocytes. Hepatocytes from NASH specific iPSC line 01D1 were thawed onto Collagen I coated plates and placed in Stage 2 differentiation media in the presence of CHIR99021 and transitioned to Stage 3 Hepatocyte media containing SB431542 and DAPT for 8 days. The cells were harvested at the end of Stage 3 of differentiation and stained for the presence of AAT and albumin. The scatter plots reflect the quantification of AAT (left top) and albumin (left bottom) and the morphology of the cells at the end of Stage 3 is reflected on the right.
Figure 19:
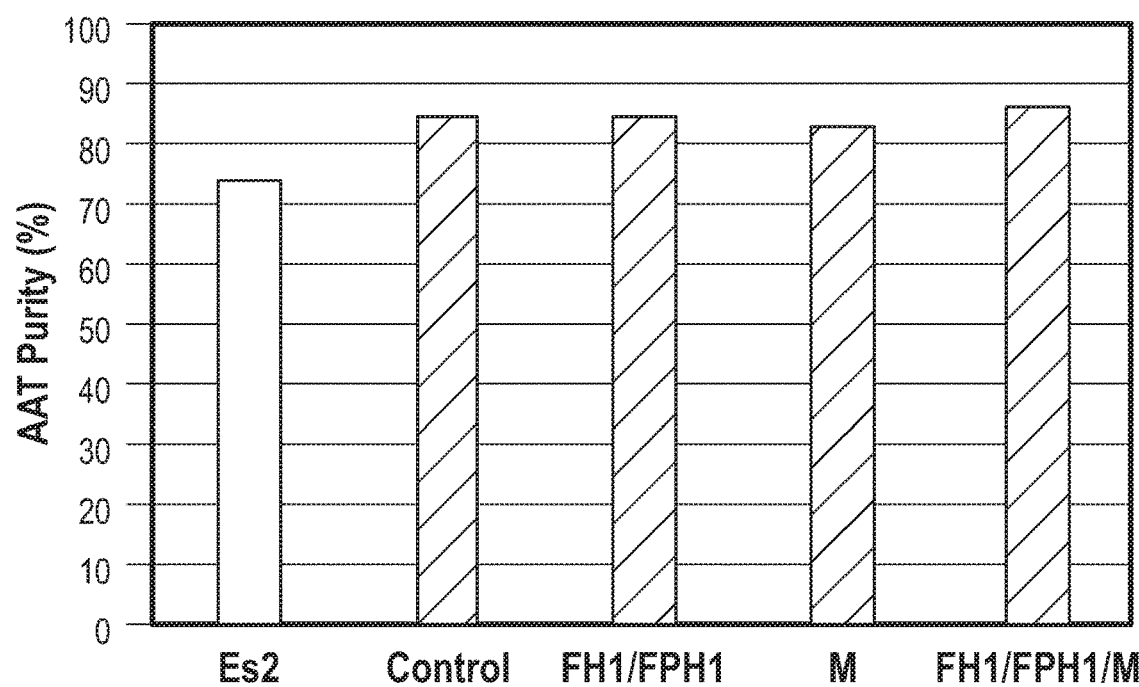
FIG. 19: Recovery of hepatocytes post-cryopreservation at Stage 1 of differentiation. Hepatocytes derived from NASH specific iPSC 01D1 were thawed onto collagen I coated plates and placed in Stage 2 Hepatocyte differentiation media for 8 days. The cells were transferred to different formulations of Stage 3 media. The control media contained a combination of SB431542 and DAPT (control) (Hep Stage 3B media), or combination of maturation compounds and the hepatocyte function and differentiation enhancers FH1 and FPH1 (FH1/FPH1, each at 15 µM), al-adrenergic receptor agonist methoxamine (M, 1 µM) or FH1, FPH1, and methoxamine (FH1/FPH1/M). End of Stage 2 purity (ES2, open bar) is shown as comparison. The cells were harvested at the end of Stage 3 hepatocyte differentiation and stained for AAT expression.
Figure 20A:
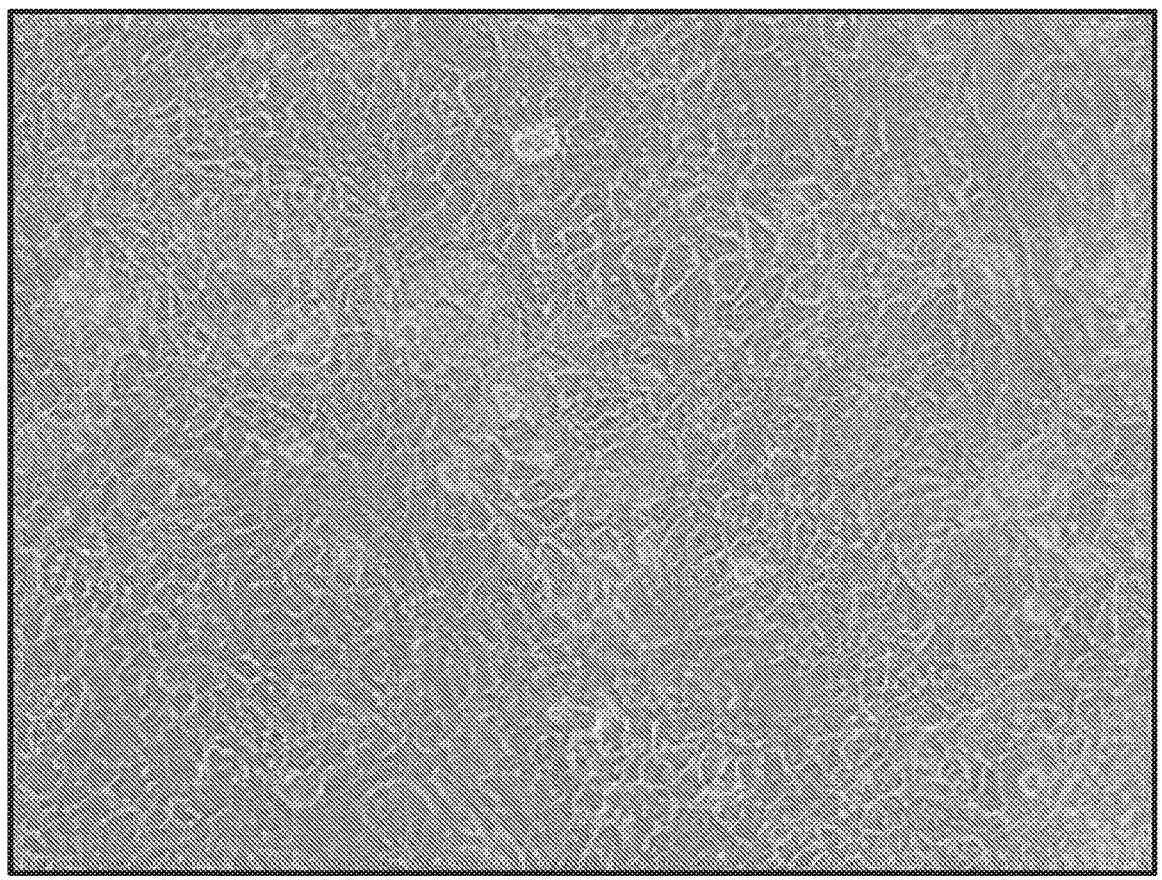
FIGS. 20A-20F: Recovery of hepatocytes post-cryopreservation at Stage 2 of differentiation. Hepatocytes from NASH specific iPSC line 01D1 were thawed onto Collagen I coated plates and placed in (FIGS. 20A-C) Stage 3 Hepatocyte A media containing SB431542 and DAPT (see FIG. 17 for media composition), or (FIGS. 20D-F) in Stage 3 Hepatocyte E media containing 5 µM Src kinase inhibitors (see FIG. 17 for media composition) for 10 days. The cells were harvested at the end of Stage 3 of differentiation and stained for the presence of AAT and albumin. The scatter plots reflect the quantification of AAT (FIG. 20A) and albumin (FIG. 20B) in Stage 3 Hep A media. The scatter plots reflect the quantification of AAT (FIG. 20E) and albumin (FIG. 20F) in Stage 3 Hep E media. The morphology of the cells at the end of Stage 3 in Stage 3 Hep A media (FIG. 20A) and Stage 3 Hep E media (FIG. 20D).
Figure 20B:
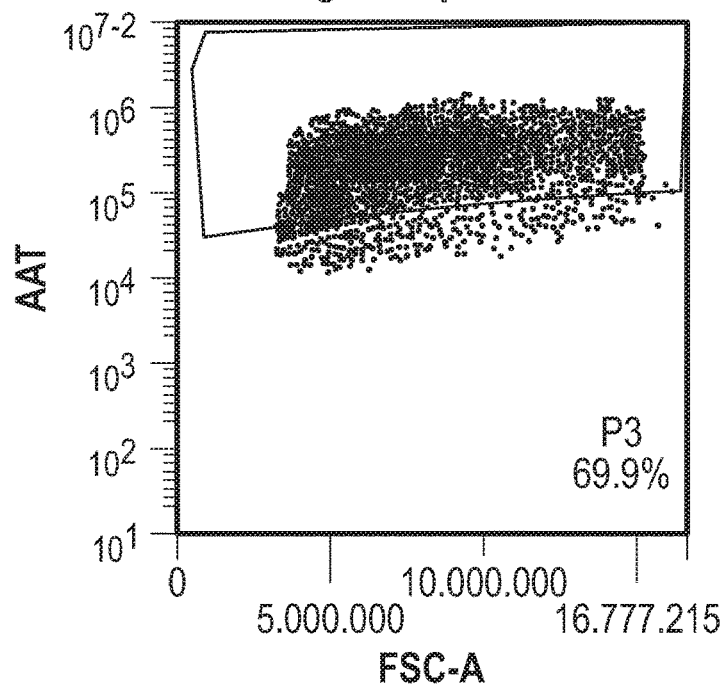
Figure 20C:
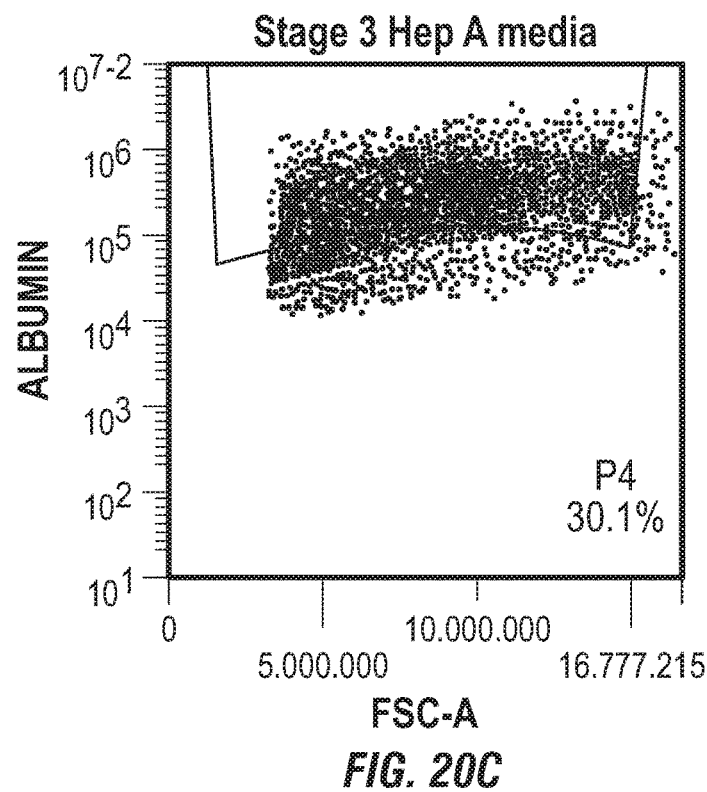
Figure 20D:
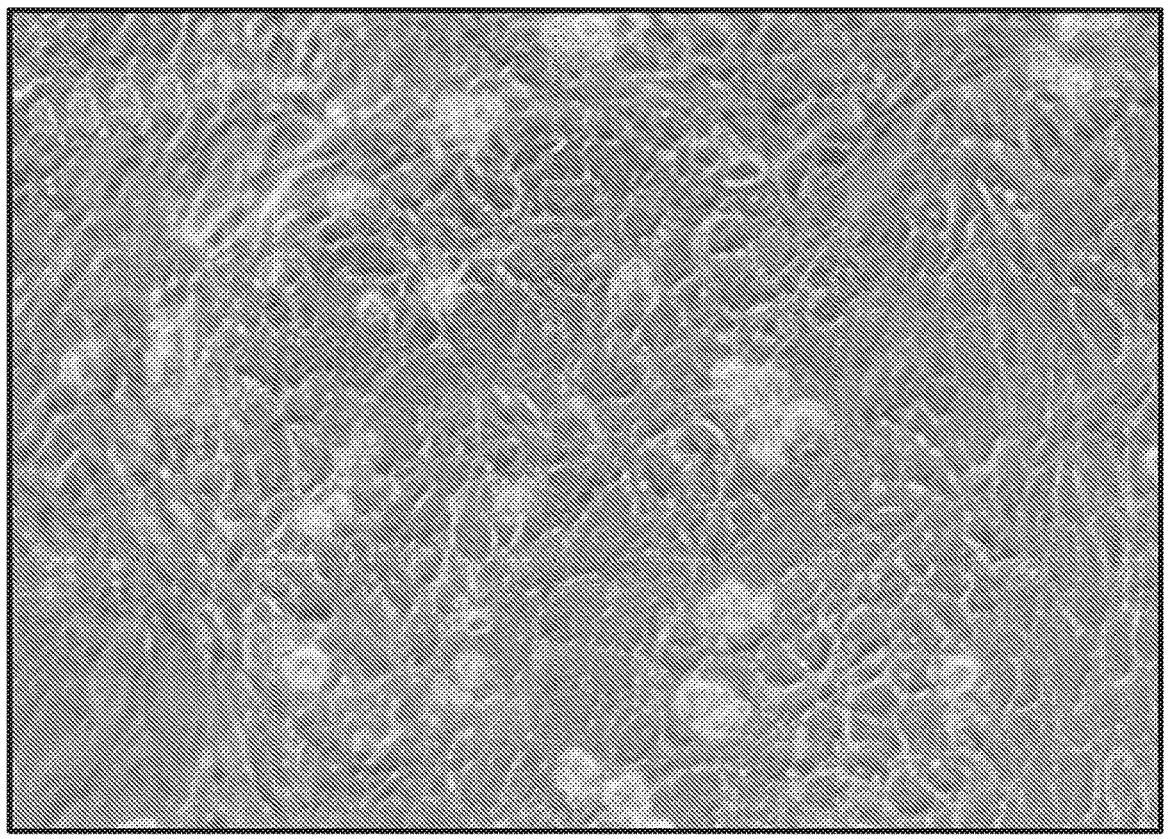
Figure 20E:
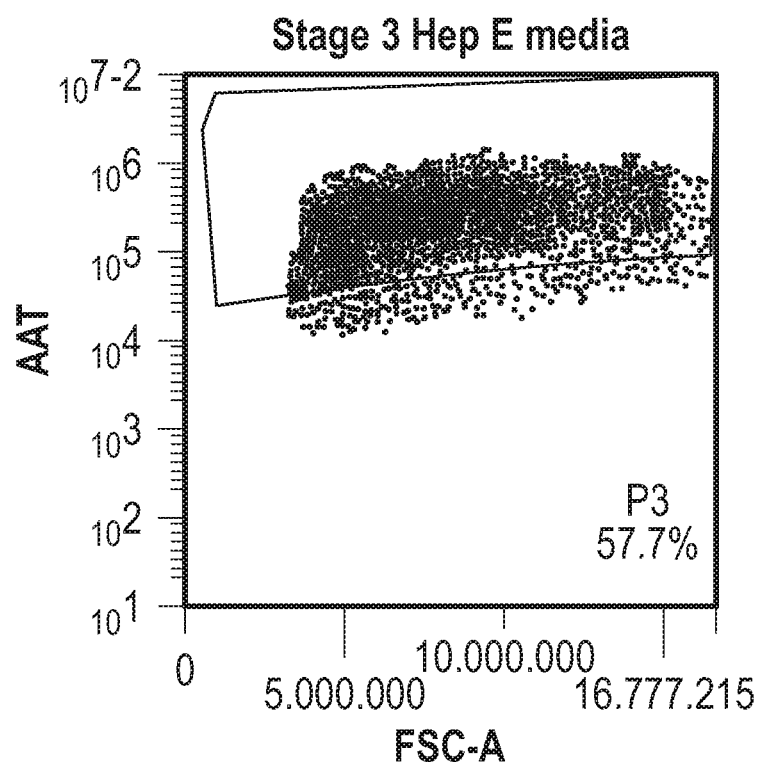
Figure 20F:
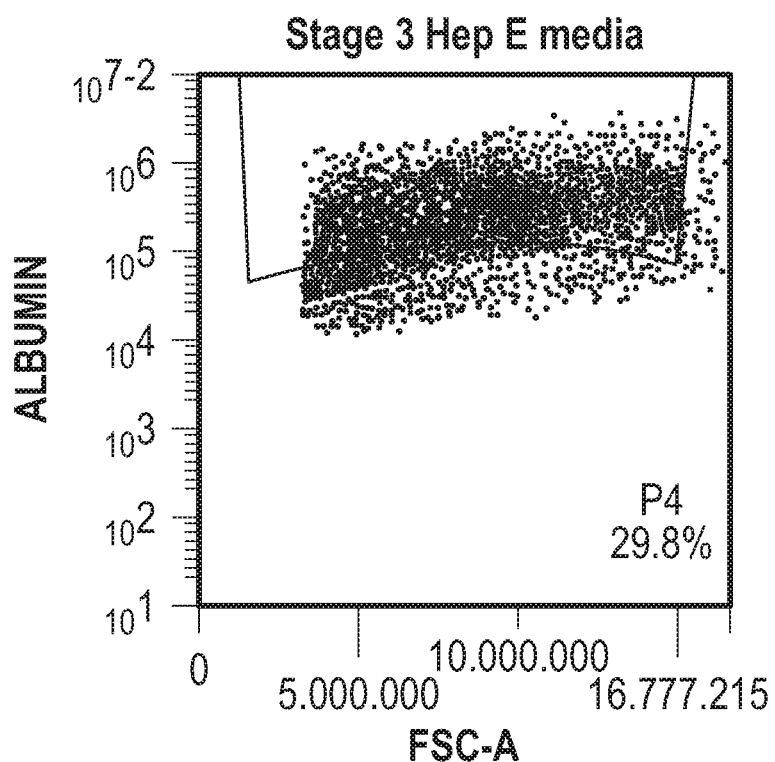

Morphological and functional analysis of live end stage hepatocytes: When seeded onto collagen coated plates at the end of Stage 2, the hepatocytes produced by this protocol exhibited proper hepatocyte morphology characterized by cobblestone shape with prominent nuclei and phase bright borders. Binucleate cells, another important morphologic characteristic of hepatocytes, were also observed (FIG. 13). Further, staining the cells with the dye CDFDA (FIG. 14) showed that they formed functional bile canaliculi, another key feature of hepatocytes.

Analysis of end Stage 3 Hepatocytes Live culture: Finally, the differentiated hepatocytes reached high levels of albumin purity (>65%) while maintaining their AAT purity. The percentage of AAT and Albumin was quantified at day 7 and 14 of Stage 3 differentiation

TABLE 2

Media formulations for all steps of the hepatocyte differentiation protocol.

Precondition Medium (PCM)

| Component | Final Concentration |
| --- | --- |
| RPMI 1640 | 88% |
| SFD | 10% |
| GlutaMAX | 1% |
| Pen/Strep | 1% |
| 1-Thioglycerol (MTG) | 405 μM |
| CHIR99021 | 3 μM |

DE Day 0 Medium (EIM T0)

| Component | Final Concentration |
| --- | --- |
| RPMI 1640 | 88% |
| SFD | 10% |
| GlutaMAX | 1% |
| Pen/Strep | 1% |
| 1-Thioglycerol (MTG) | 405 μM |
| Activin A | 20 ng/mL |

DE Day 1-2 Medium (EIM T1-2)

| Component | Final Concentration |
| --- | --- |
| RPMI 1640 | 88% |
| SFD | 10% |
| GlutaMAX | 1% |
| Pen/Strep | 1% |
| 1-Thioglycerol (MTG) | 405 μM |
| Activin A | 20 ng/mL |
| BMP4 | 2.5 ng/mL |
| bFGF | 5 ng/mL |
| VEGF | 10 ng/mL |
| Ascorbic Acid | 50 ug/mL |

TABLE 2-continued

Media formulations for all steps of the hepatocyte differentiation protocol.

DE Day 3-9 Medium (EIM T3-6)

| Component | Final Concentration |
| --- | --- |
| SFD | 100% |
| Activin A | 20 ng/mL |
| BMP4 | 2.5 ng/mL |
| bFGF | 5 ng/mL |
| VEGF | 10 ng/mL |

Stage 1 Medium

| Component | Final Concentration |
| --- | --- |
| SFD | 99% |
| BMP4 | 50 ng/mL |
| bFGF | 5 ng/mL |
| VEGF | 10 ng/mL |
| HGF | 25 ng/mL |
| Dexamethasone | 0.1 μM |
| FGF-10 | 60 ng/mL |
| DMSO | 1% |

Stage 2 + Blebbistatin Medium

| Component | Final Concentration |
| --- | --- |
| SFD | 99% |
| bFGF | 5 ng/mL |
| HGF | 25 ng/mL |
| OSM | 20 ng/mL |
| Dexamethasone | 0.1 μM |
| DMSO | 1% |
| Blebbistatin | 10 μM |

Stage 2 + CHIR99021 Medium

| Component | Final Concentration |
| --- | --- |
| SFD | 99% |
| bFGF | 5 ng/mL |
| HGF | 25 ng/mL |
| OSM | 20 ng/mL |
| Dexamethasone | 0.1 μM |
| DMSO | 1% |
| CHIR99021 | 3 μM |

Stage 3 Medium

| Component | Final Concentration |
| --- | --- |
| William's E | 92% |
| BIT9500 | 5% |
| B27 + Vitamin A | 2% |
| Pen/Strep | 1% |
| OSM | 20 ng/mL |
| Dexamethasone | 0.1 μM |
| SB431542 | 10 μM |
| DAPT | 2 μM |

Figure 21A:
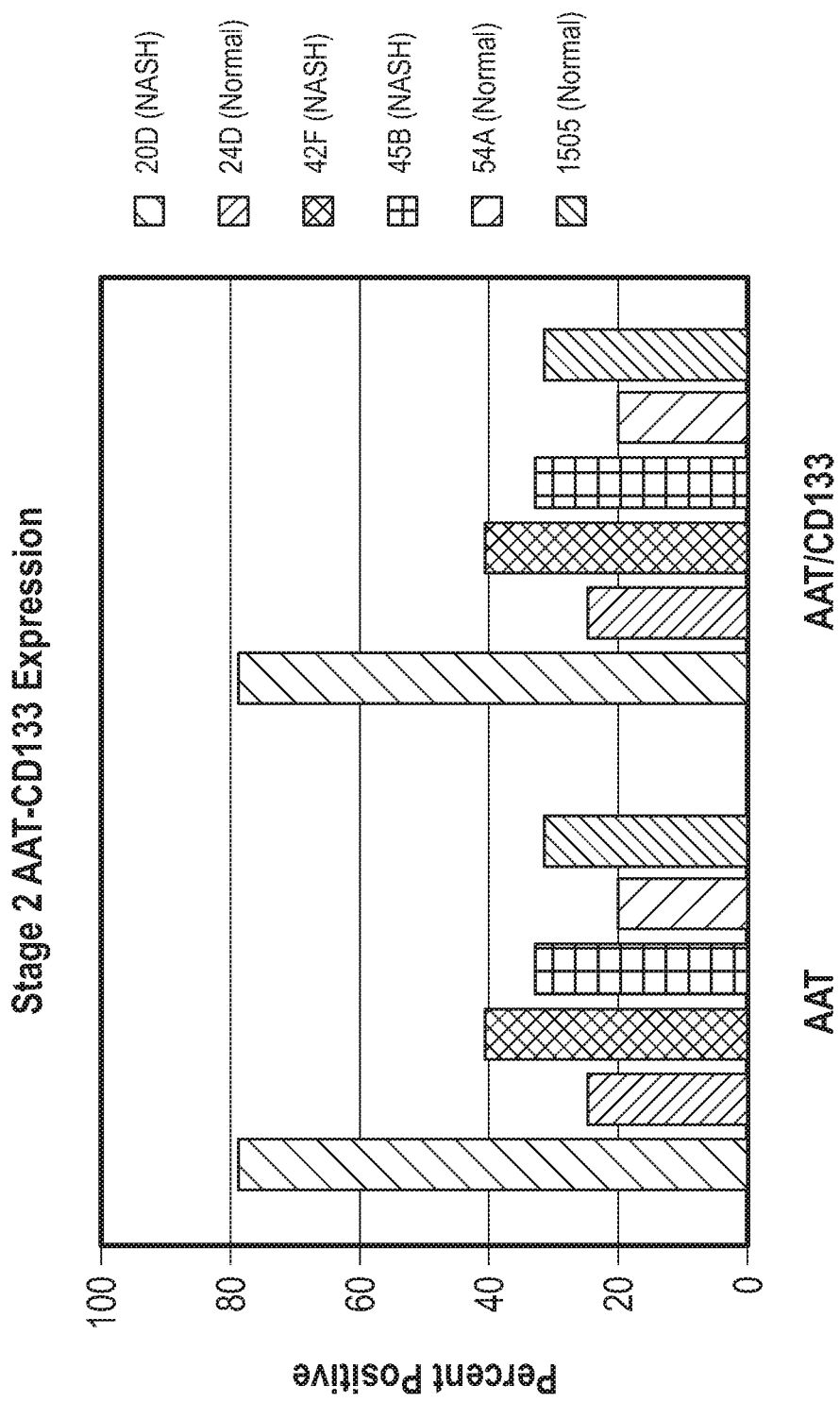
FIGS. 21A-21B: Surrogate marker for AAT to facilitate purification of hepatocytes in instances of poor hepatocyte differentiation (for example, due to disease background), a purification step may be necessary. Since AAT and ASGPR are intracellular proteins, a surface protein co-expressed with AAT was sought. CD133 was identified as partially co-expressing with AAT, and therefore could be a suitable candidate for cell separation strategies.
Figure 21B:
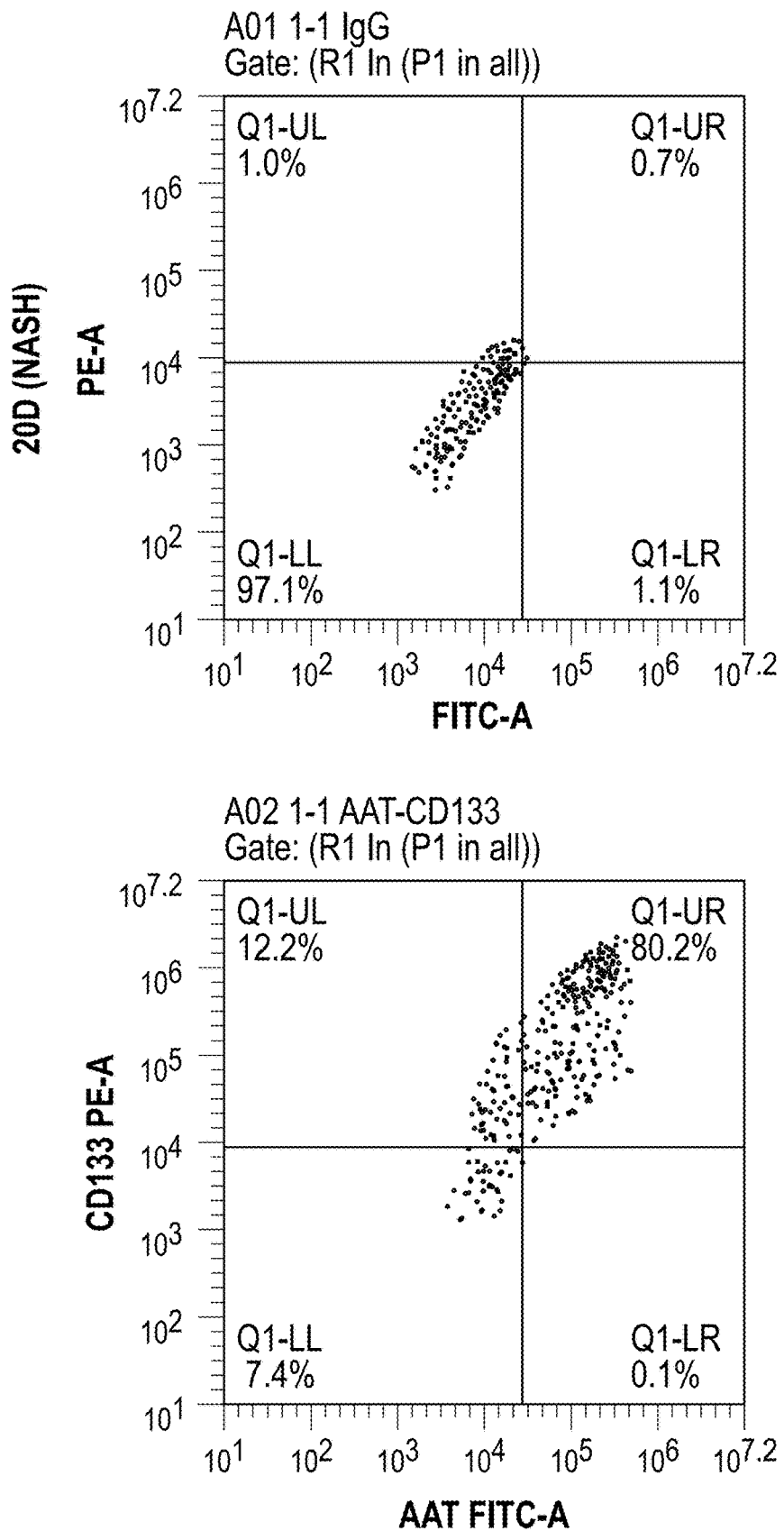
Figure 21B:
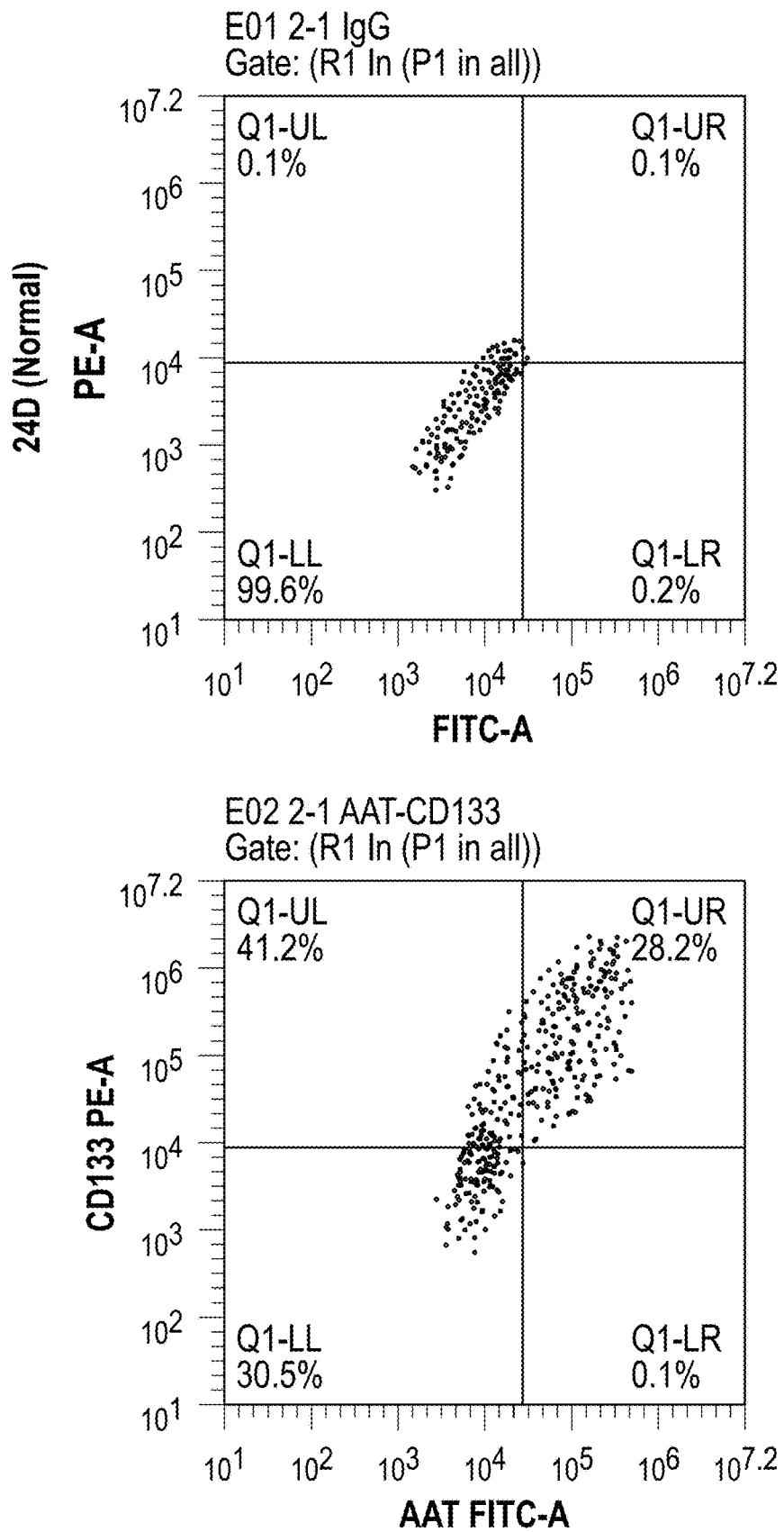
Figure 21B:
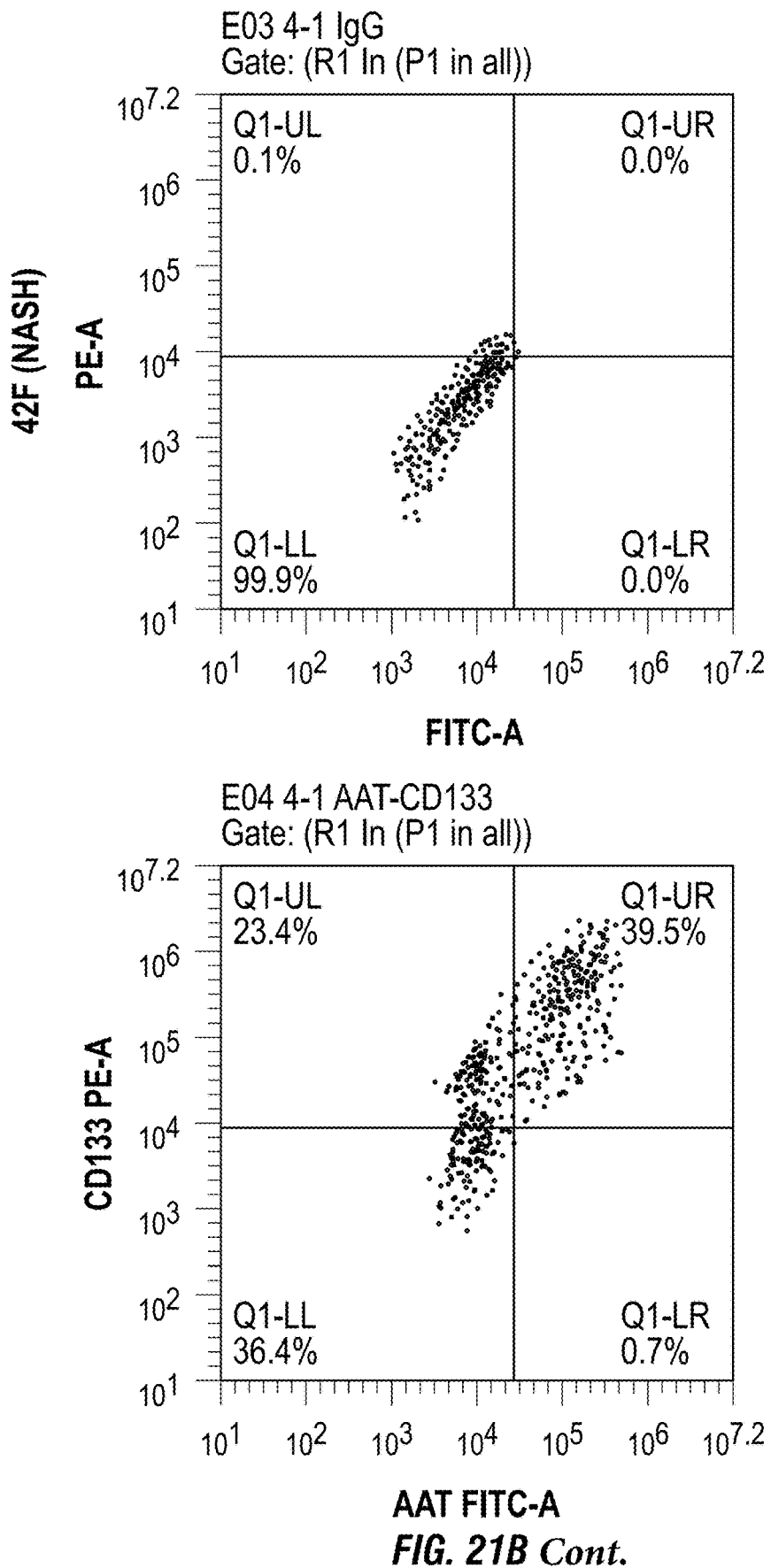
Figure 21B:
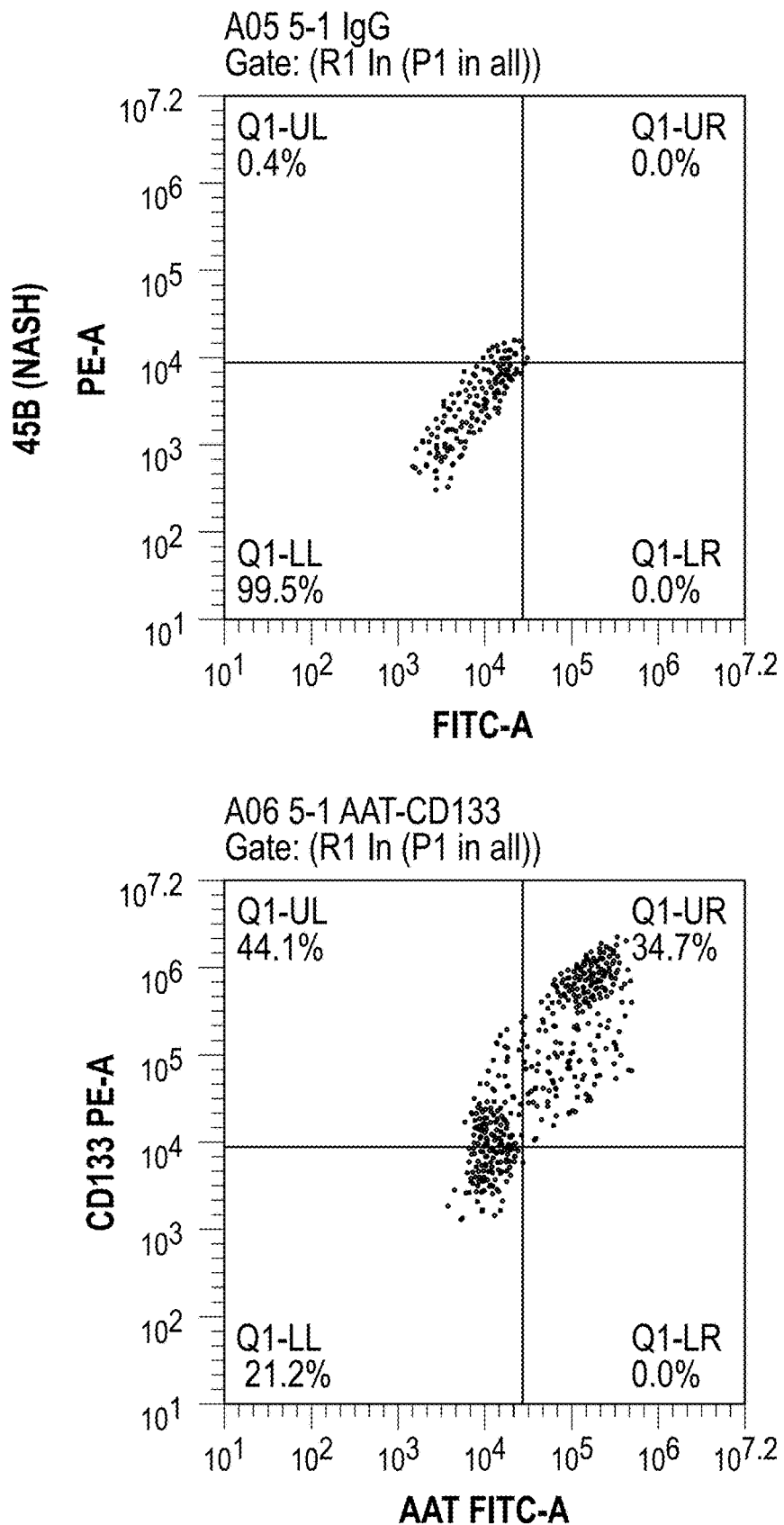
Figure 21B:
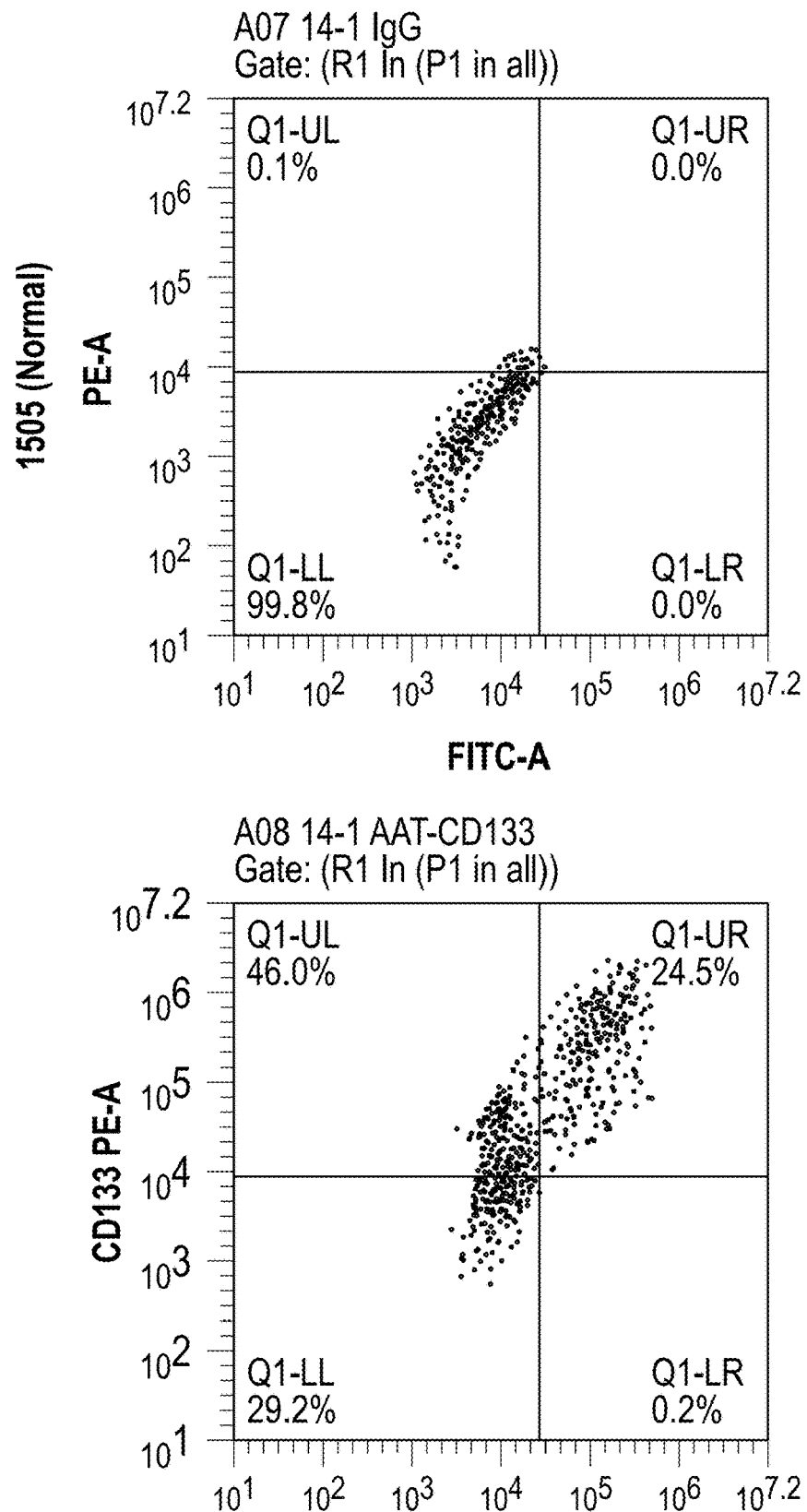
Figure 22:
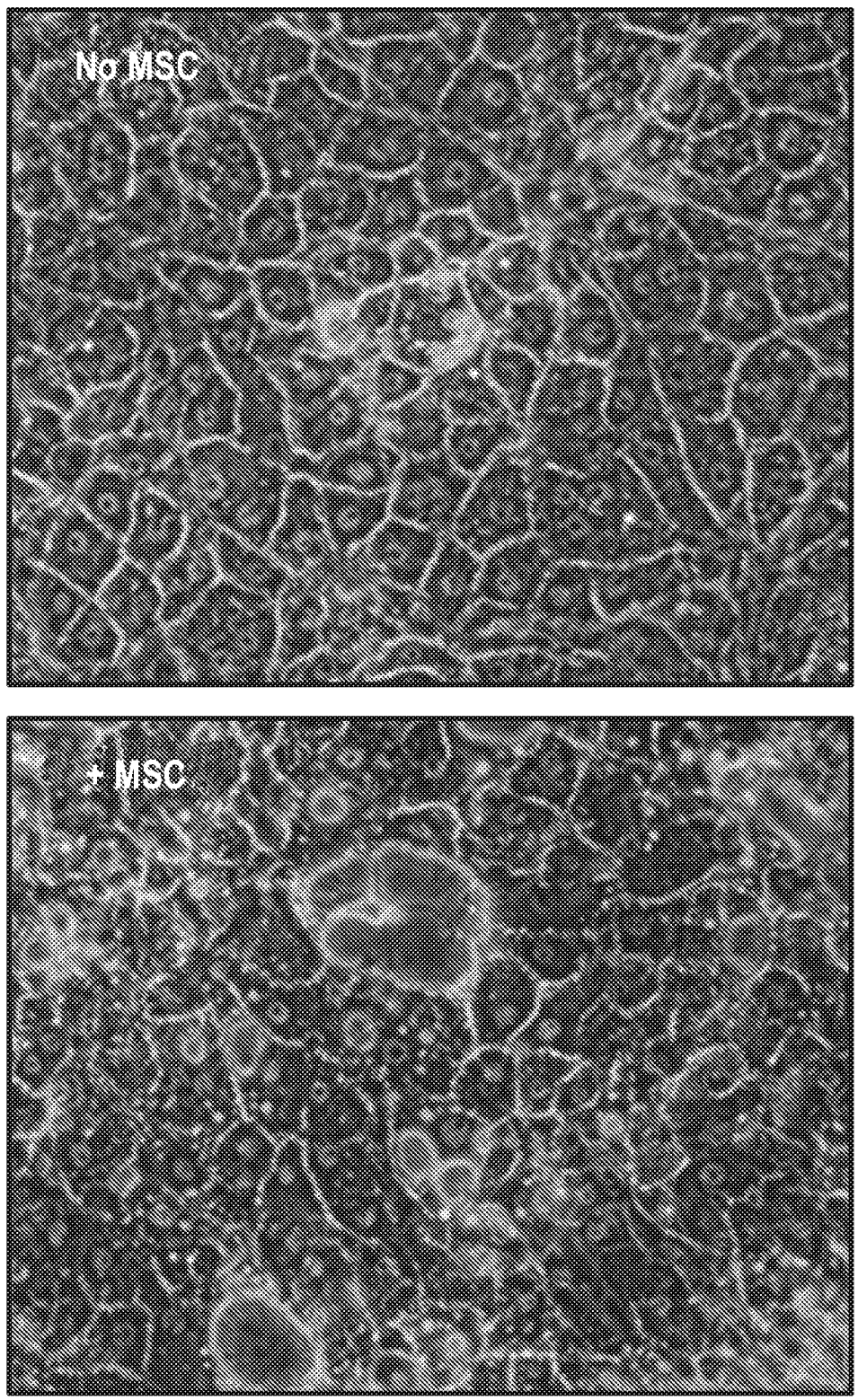
FIG. 22: End of Stage 3 morphology of NASH specific 01D1 hepatocytes cultured without mesenchymal stem cells (MSC), i.e., alone (left, No MSC) or together with 01D1 MSCs adapted to hepatocyte media (right, +MSC): Hepatocytes cryopreserved at the end of Stage 1 of the process were thawed and cultured through Stage 2 under standard protocol prior to initiation of co-culture; SB431542/DAPT (Table 2) was included in the media for both conditions.

CD133 (also known as prominin-1 or AC133) was the first identified member of the prominin family of pentaspan membrane proteins. CD133 is expressed in hematopoietic progenitor cells as well epithelial and non-epithelial progenitor cells in murine or human tissues including brain, kidney, prostate, pancreas, skin and hepatocellular carcinomas. Since AAT is an intracellular marker for purification of hepatocytes, studies were performed to screen for a surrogate cell surface marker that would be helpful in enriching and subsequently purifying the hepatocyte cultures. The CD133 surface marker co-stains with AAT+ cells at the end of Stage 2 of Hepatocyte differentiation in several different cell lines (FIGS. 21A, B). All AAT+ cells were CD133+, therefore CD133 could be used to purify lines with poor AAT expression and eliminate most contaminating cells.

Thus, it was found that the iPSCs may be pre-conditioned towards hepatocyte differentiation by culturing the cells in the presence of a GSK3 inhibitor to pre-condition the cells for differentiation to definitive endoderm (DE) cells by facilitating their exit from pluripotency and improving downstream differentiation. Initially, the iPSCs can be differentiated to DE cells in endoderm induction media. The iPSCs may be cultured in two-dimensional culture, such as on MATRIGEL®, and then the DE cells may be transferred to three-dimensional aggregate culture at the end of Stage 1. The cells may be cultured in the presence of a GSK3 inhibitor during Stage 2 of the process comprising induction of hepatoblasts and differentiation to hepatocytes. In Stage 3, the hepatocytes may be matured in the presence of a TGFβ inhibitor and γ-secretase inhibitor to improve cell morphology.

Hepatocyte/MSC co-culture studies: A pilot experiment was conducted to examine the effects of co-culture of hepatocytes and MSCs. A bank of MSCs was generated from the NASH line 01D1 (Table 1). The MSCs were successfully adapted to hepatocyte media and then plated at various densities onto hepatocytes from the 01D1 line. The experiment was carried out with cells cultured in Stage 3 media+/− SB431542/DAPT. We found that in the absence of SB431542/DAPT all cultures—hepatocytes alone or hepatocyte/MSC co-cultures—deteriorated morphologically and had a decreased purity of AAT and ALB compared to controls. In agreement with this, ALB secretion in the supernatants measured by ELISA also declined. However, it was observed that in the presence of SB431542/DAPT, the hepatocyte/MSC co-cultures not only maintained proper morphology (FIG. 6) but also maintained their high AAT purity and had modest but noticeable increases in ALB purity and secretion. This suggests that co-culture with MSCs may facilitate hepatocyte maturation. This line of investigation may be extended to using line-matched MSC conditioned media supplemented with SB431542/DAPT to mature hepatocytes.

Thawing Cryopreserved hepatocytes at Stage 2 of differentiation and maturation to Stage 3 hepatocytes post thaw: Cryopreserved hepatocytes at the end of stage 2 were thawed in Stage 3 media. The cells were plated on Collagen I coated plates without spinning in the presence of a rock inhibitor. The media was gently changed at the end of 24 hours post plating. The maturation media contained SB/DAPT or Src kinase inhibitors and the cells were allowed to differentiate to additional 8-10 days with media exchanges every 48 hrs. The end stage cells were analyzed for hepatocyte morphology and the presence of AAT and albumin expression quantified by flow cytometry.

Figure 24:
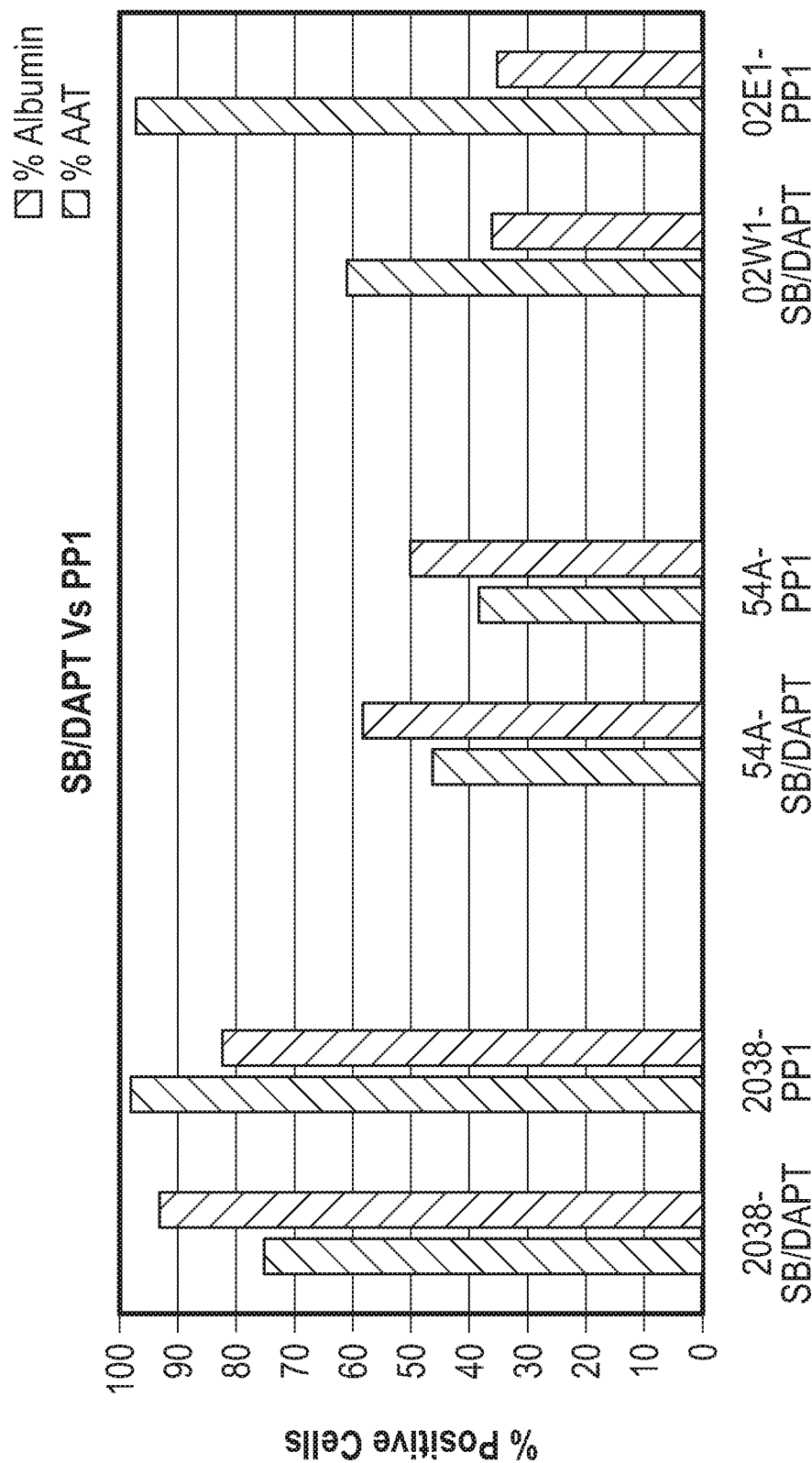
FIG. 24: End of Stage 3 purity quantification of hepatocytes matured in the presence of SB431542/DAPT or PP1 (Src Kinase Inhibitors): Hepatocytes cryopreserved at the end of Stage 2 of the differentiation process from normal (2.038, 54A) and NASH specific iPSC (02E1) were thawed and cultured through Stage 3 of the differentiation process and purity of AAT and Albumin were quantified in the presence of 10 M SB431542/2 M DAPT (SB/DAPT) or the Src kinase inhibitor PP1 (PP1) in the maturation media.
Figure 25:
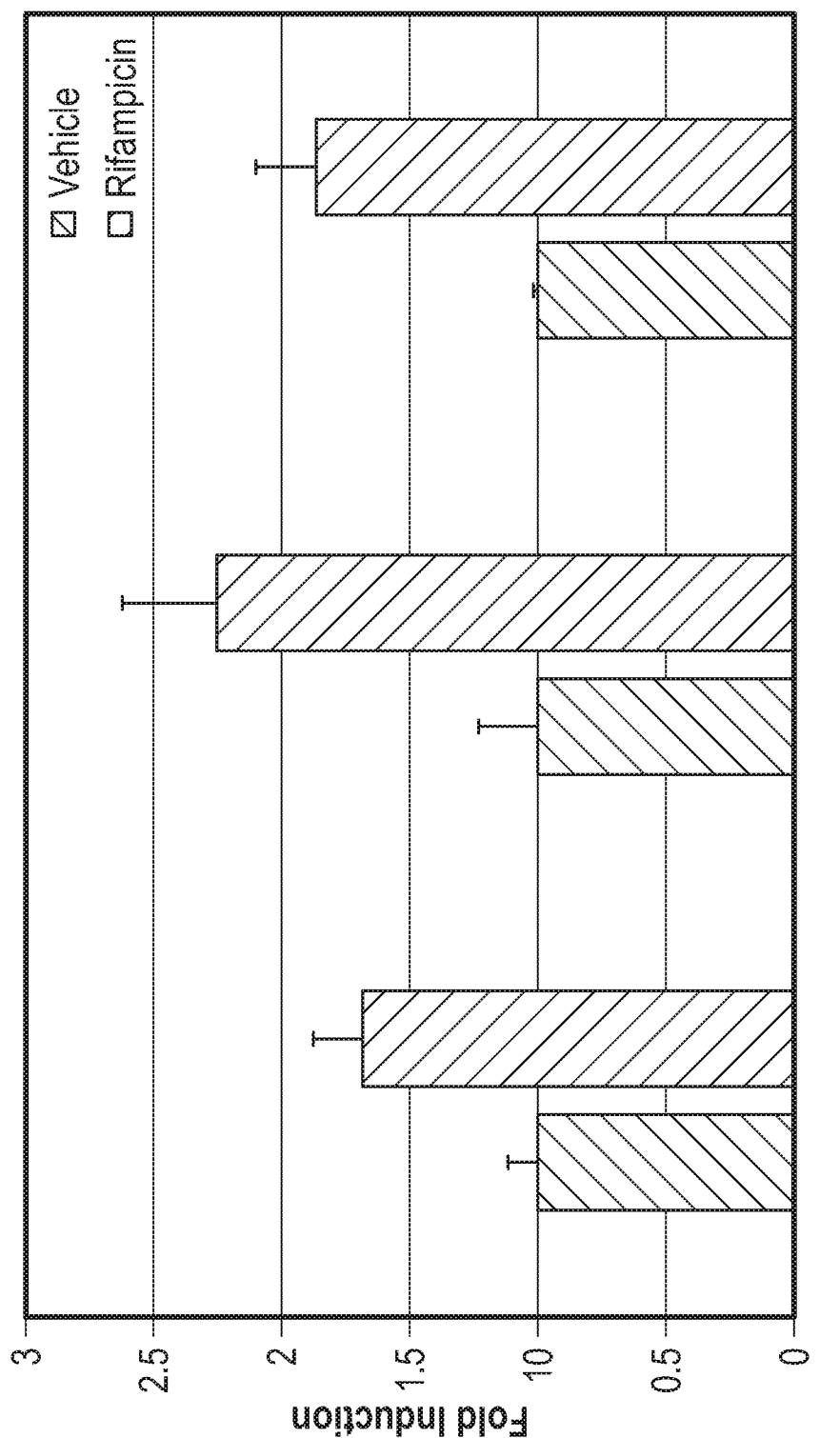
FIG. 25: Functional cytochrome P450 (CYP) 3A4 activity for end of Stage 3 hepatocytes: End of Stage 3 hepatocytes differentiated from apparently healthy normal iPSC (2.038) and two NASH iPSCs (01D1 and 02E1) were incubated in Williams E media with Hepatocyte Maintenance Supplement Cocktail B and either vehicle (0.1% DMSO) or 50 µM rifampicin (CYP3A4 inducer) for 3 days with daily media exchanges. At the end of 3 days, the cells were dissociated and distributed into 96 well plates (25,000 cells/well, 4-6 wells per condition) and subjected to CYP3A4 activity measurement using a luminescent P450-Glo CYP3A4 Assay System (Promega) according to the manufacturer's recommendations.
Figure 26A:
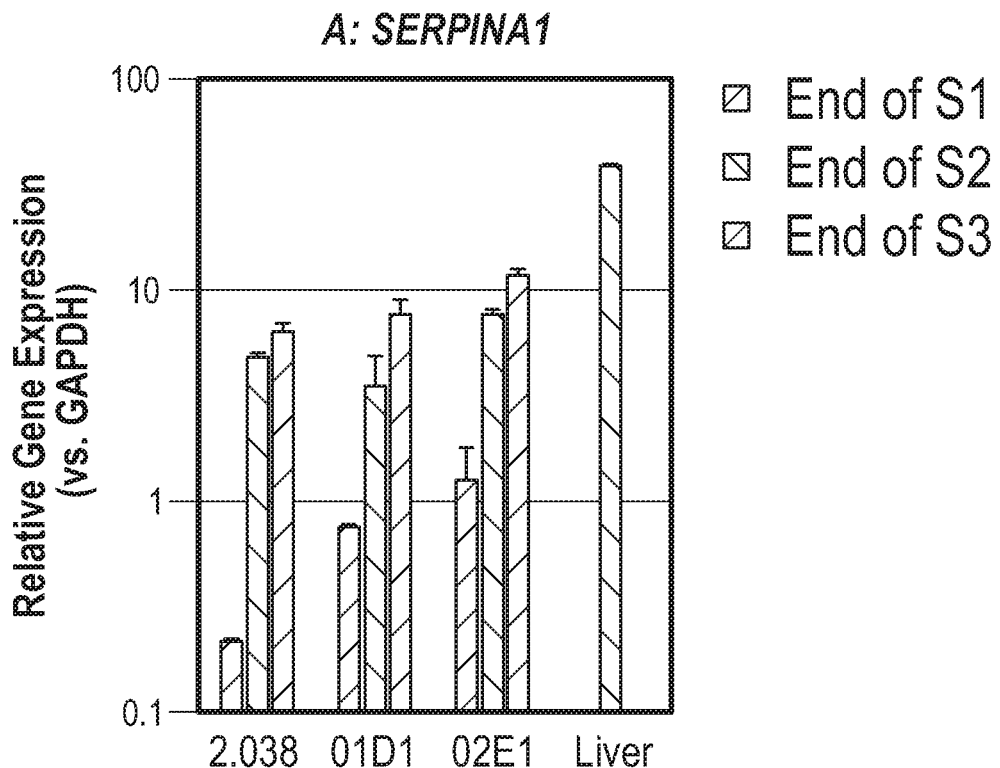
FIGS. 26A-26D: Analysis of expression of hepatic genes during differentiation stages by qPCR. Cell pellets from hepatocyte differentiation cultures were collected from apparently healthy normal iPSC (2.038) and two NASH iPSCs (01D1 and 02E1) at indicated stages. RNA was extracted and used for qPCR analysis to quantify the expression of SERPINA1, the gene encoding protein (AAT) (FIG. 26A), ASGR1, the gene encoding asiaglycoprotein receptor 1 (FIG. 26B), ALB (FIG. 26C), and CYP3A4 (FIG. 26D).
Figure 26B:
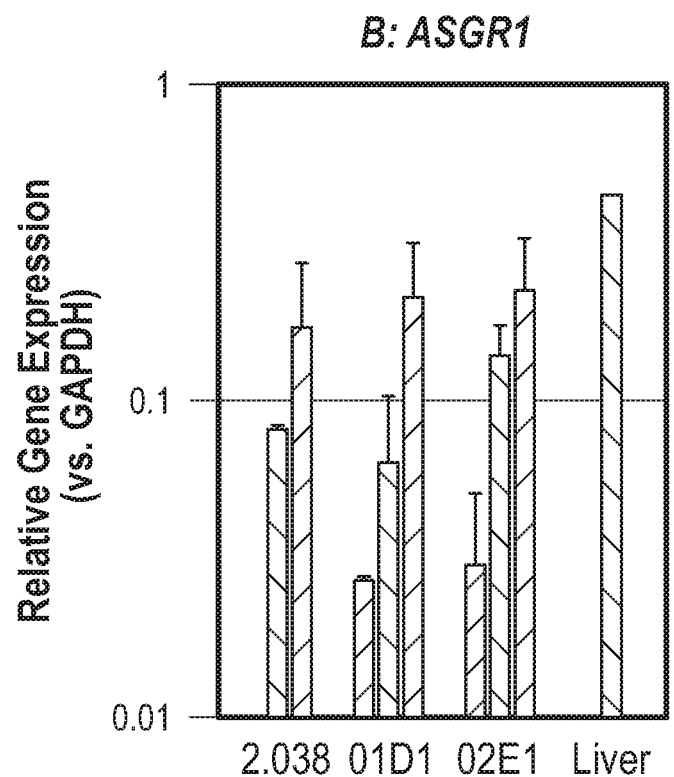
Figure 26C:
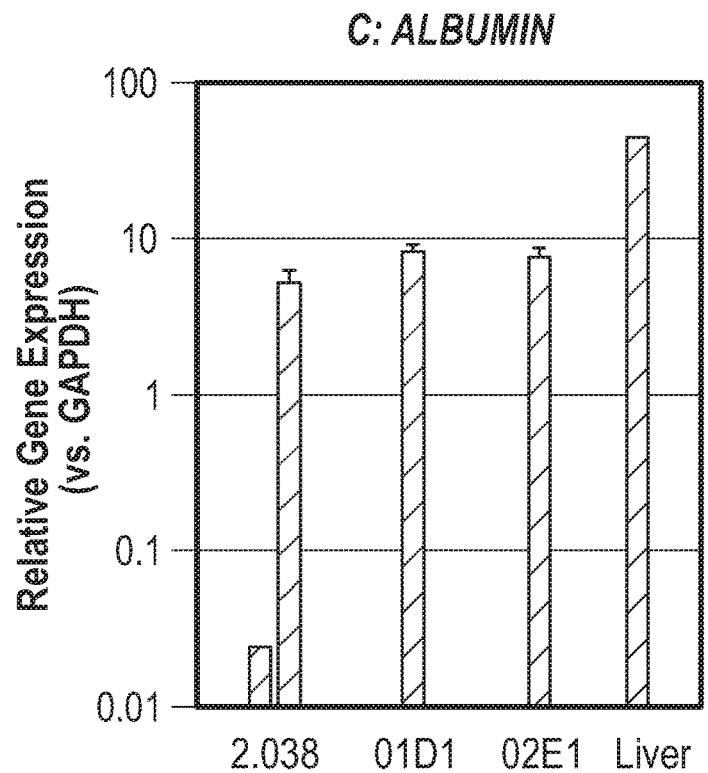
Figure 26D:
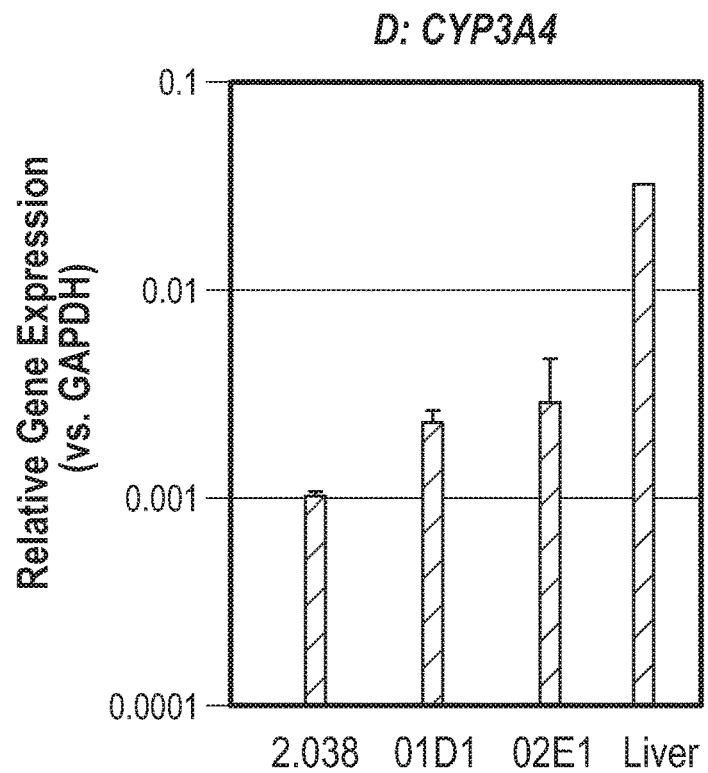

Preliminary data revealed that substitution of PP1 instead of SB431542/DAPT facilitated the maturation of hepatocytes. FIG. 23 depicts the morphology and FIG. 24 depicts the purity of cultures post thaw.

Generation of Liver organoids: Aggregates consisting of hepatocytes and other liver relevant cell types—specifically macrophages, MSC, and endothelial cells—designed to mimic liver organoid culture were established and maintained for 5-10 days. Aggregates were established in hepatocyte Stage 3 media (Table 2) supplemented with 1 µM of H1152, with the non-hepatocyte cells undergoing adaptation to Stage 3 media prior to initiation of co-cultures. For co-culture initiation, end of Stage 1 cells Hepatocytes were recovered from cryopreservation and aggregated at 500,000 cells/mL in Stage 2 media (Table 2) supplemented with 1 µM of rho kinase (rock) inhibitor H1152. After 24 hours, the media was changed to Stage 2 media with 3 µM CHIR99021. Cells were maintained in Stage 2 media for the total of 8 days with first 4 days under hypoxic conditions and then 4 days under normoxia. Cryopreserved macrophages were plated in low attachment plates at ~100,000 cells/cm$^2$ in Serum Free Defined (SFD) Media and slowly acclimatized to hepatocyte Stage 3 media (without either SB431542/DAPT, or PP1) by addition of Stage 3 media (2 mL/well of a 6 wp every other day) to the culture. Similarly, cryopreserved MSCs were thawed onto standard tissue culture plates at 50,000 cells/cm$^2$ in MSC media (SFD with 50 ng/mL each of PDGF-BB and bFGF). The cells were adapted to hepatocyte Stage 3 media (without either SB431542/DAPT or PP1) for 7 days by increasing ratio of Stage 3 media to MSC media starting on day 1 post thaw (75% MSC/25% Stage 3 on day 1, 50% MSC/50% Stage 3 on day 2, 25% MSC/75% Stage 3 on day 3, 100% Stage 3 on day 4-7). Cryopreserved endothelial cells were thawed and plated onto tissue culture plates coated with fibronectin (2 µg/cm$^2$) at ~25,000 cells/cm$^2$ in endothelial cell media (SFD with 50 ng/mL each VEGF and bFGF). The cells were adapted to hepatocyte Stage 3 hepatocyte media for 7 days by increasing the ratio of Stage 3 media to Serum Free Defined (SFD) endothelial cell media containing 50 ng/mL VEGF and 50 ng/mL FGF. The cells were adapted to hepatocyte Stage 3 media (without either SB431542/DAPT or PP1) for 7 days by increasing ratio of Stage 3 hepatocyte media to endothelial media starting on day 1 post thaw (75% endothelial cell media/25% Stage 3 on day 1, 50% endothelial cell media/50% Stage 3 on day 2, 25% endothelial cell media/75% Stage 3 on day 3, 100% Stage 3 on day 4-7). On day 8 after hepatocyte aggregate formation, hepatocyte aggregates were dissociated with 0.5% Trypsin-EDTA for 7 minutes at 37° C. At the same time, macrophages, MSCs, and endothelial cells were dissociated with TrypLE Select (5-7 minutes at 37° C.) followed by washing, spinning the cell suspension and determining the viable cell concentration. All cell types were suspended to 1,000,000 cells/mL in hepatocyte Stage 3 media (without SB431542/DAPT or PP1). Cells were then plated in ultra-low attachment (ULA) round bottom 96 well plates at the ratio of 1:0.5:2:0.2 hepatocyte: macrophage: MSC: endothelial cell. In all aggregate conditions (FIG. 28A), the total number of cells per well was kept constant. The cells were then pelleted at 200 g for 3 minutes and overlaid with equal volume of Stage 3 media containing 2 µM H1152, 0.6 mg/mL MATRIGEL®, and either SB431542/DAPT (20 µM/4 µM, respectively) or PP1 (10 µM) to bring the final concentrations of the compounds to 1 µM H1152, 0.3 mg/mL MATRIGEL® and either 10 µM SB431542/2 µM DAPT or 5 µM PP1. The cells were then pelleted again at 200 g for 3 minutes and placed in a normoxic incubator. Media was exchanged every other day by removing 50% of the media without disturbing the aggregates and replacing with equal amount of Stage 3 media containing either SB431542/DAPT or PP1.

Lipidosis Assay: iPSC-derived hepatocytes: 2.038, 54A (both normal), 01D1 and 02E1 (both NASH) lines at the end of Stage 3 were subjected to intracellular lipidosis induction assay. At the end of Stage 2 of hepatocyte differentiation, aggregates were dissociated using 0.5% Trypsin-EDTA for 7 minutes at 37° C. and quenched with IMDM media supplemented with 10% FBS. Cells were then pelleted at 200 g for 3 minutes and seeded at 200,000 cells/cm$^2$ onto Collagen I coated plates and maintained in Stage 3 medium (Table 2) for 4-5 days prior to the lipidosis induction with media exchanges every other day. Alternatively, cells were dissociated at the end of Stage 1 with TrypLE Select for 5-7 minutes at 37° C., quenched with IMDM media supplemented with 10% FBS. Cells were then pelleted at 200 g for 3 minutes and seeded at 100,000 cells/cm$^2$ onto collagen I coated plates and placed into a under hypoxic conditions. The cells were maintained in Stage 2+CHIR99021 media (Table 2) for 8 days with media exchanges every other day. On day 4 of Stage 2 differentiation, the cells were placed under normoxic conditions. After 8 days, the cells were switched to Stage 3 media in 2D plated conditions. For lipidosis induction, cells were treated with 50-600 µM fatty acids, linoleic acid or oleic acid-linoleic acid mixture diluted in Stage 3 media for 24 hours at 37° C. under normoxic conditions. Cells were washed with DPBS twice and fixed with 4% PFA for 20 minutes at room temperature. After 3 washes with DPBS, cells were stained with solution containing 1 µg/mL Bodipy 493/503, Actin-555 and DAPI in DPBS with 0.1% Triton-X for 20 min at room temperature in dark followed by washing with DPBS three times. The lipid droplets, cellular matrix and nuclei were stained and captured by FITC (Lipids), Texas Red (Actin-555) and DAPI (nuclei) filters on the high content confocal microscope respectively. Images were captured at 20× magnification and were subsequently subjected to quantification analysis using MetaXpress software. Lipidosis per cell was calculated by Lipidosis per cell=sum of integrated intensity of FITC/total number of nuclei.

Generating End Stage Hepatocytes from Cryopreserved End of Stage 1 Hepatoblasts or definitive endoderm (DE) cells: Cryopreserved hepatoblasts (end of Stage 1 cells) were thawed to form aggregates at 500,000 cells/mL in Stage 2 Hepatocyte media in the presence of rock inhibitor H1152 (1 µM) under hypoxic conditions. After 24 hours, media was changed to Stage 2+CHIR99021 (Table 2, Stage 2 media+3 µM CHIR99021). The aggregates were maintained in Stage 2+3 µM CHIR99021 media for 8 days with media exchanges every other day. On day 4, the aggregates were placed in normoxic conditions in the presence of Stage 2 media. On day 8, the aggregates were switched to Stage 3 hepatocyte media and cultured for 5-10 days to mature and the aggregates were harvested to perform various end stage assays. Alternately, aggregates can also be dissociated at the end of Stage 2 using 0.5% Trypsin-EDTA (~7 minutes at 37° C.) and plated onto Collagen I coated plates in Stage 3 media (Table 2) in the presence of rock inhibitor (H1152, 1 µM). After 24 hours, the cells can be cultured in a 2D format in Stage 3 hepatocyte media (Table 2) for additional 7-10 days with media changes every other day. The end Stage 2D cells can be used for various end point assays for hepatocytes.

Generation of end of Stage 3 hepatocytes from Cryopreserved Definitive Endoderm (DE) cells: Cryopreserved DE cells were thawed, plated on MATRIGEL® coated plates at 100,000 cells/cm2 in T3-T6 media (Table 2) in the presence of rock inhibitor (H1152, 1 µM), under hypoxic conditions. After 24 hours, media was changed to T3-T6 without rock inhibitor and maintained in this media for additional 1-2 days before being changed to Stage 1 hepatocyte media (Table 2). Cells were maintained in Stage 1 hepatocyte media for 6 days under hypoxic conditions with media exchanges every other day. After 6 days, the cells were dissociated with TrypLE for 5-7 minutes at 37° C., quenched, washed and placed into Ultra low attachment (ULA) static vessels or spinner flasks to generate 3D aggregates for 8 days with media exchanges every other day. On day 4, the aggregates were placed in normoxic conditions in the presence of Stage 2 media. On day 8, the aggregates were switched to Stage 3 hepatocyte media and cultured for 5-10 days to mature and the aggregates were harvested to perform various end stage assays. The end stage alpha-1 antitrypsin (AAT) and albumin expression was quantified by flow cytometry with typical results shown in Table 3.

TABLE 3

Typical AAT and albumin (ALB) purity in cells cryopreserved at the end of DE induction or end of Stage 1, thawed and differentiated to the end of Stage 3.

| Line | Cryopreservation Point | AAT | ALB |
| --- | --- | --- | --- |
| 2.038 (Healthy) | End of DE | 97 | 38 |
| 01D1 (NASH) | End of DE | 89 | 45 |
| 02E1 (NASH) | End of DE | 97 | 80 |
| 2.038 (Healthy) | End of Stage 1 | 99 | 87 |
| 01D1 (NASH) | End of Stage 1 | 95 | 80 |

Preliminary data revealed that substitution of PP1 instead of SB431542/DAPT facilitated the maturation of hepatocytes. FIG. 23 depicts the morphology and FIG. 24 depicts the purity of cultures post thaw. PP1 also enhances the maturation of Hepatocytes in the presence of MSCs, macrophages and endothelial cells.

Figure 27:
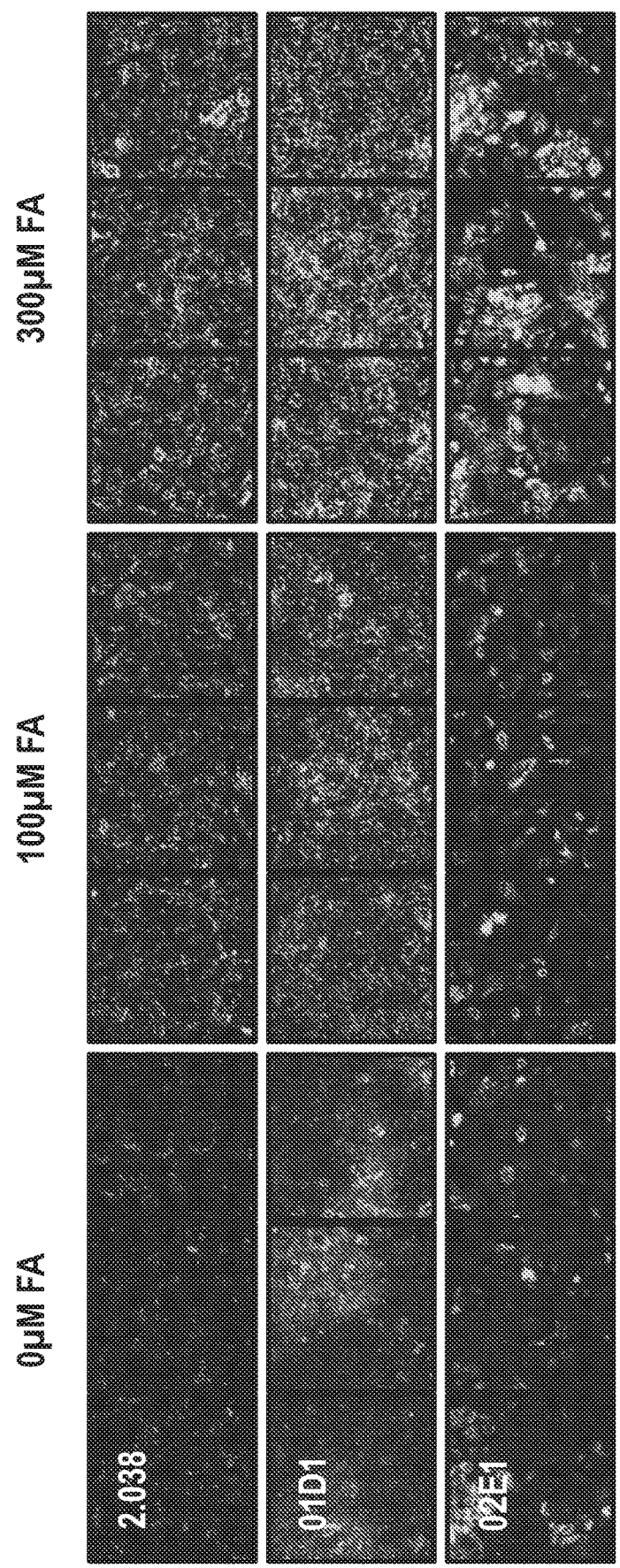
FIG. 27: Intracellular lipid accumulation in hepatocytes at the end of Stage 3. End of Stage 2 hepatocytes from apparently healthy normal iPSC (2.038) and two NASH iPSCs (01D1 and 02E1) were seeded onto Collagen I coated 96 well plates and maintained in Stage 3 media (Table 2) for 5 days with media exchanges every other day. The cells were then treated for 24 hours with 0, 100, or 300 µM fatty acids (FA, combination of oleic and linoleic acids) diluted in Stage 3 media (Table 2), fixed and stained with Bodipy (green) to visualize lipid droplets and DAPI (blue) to visualize the nuclei. Cells were imaged using confocal ImageExpress high content imager (Molecular Devices) under a 20× objective.

Lipidosis data using live end stage hepatoctyes revealed manifestation of spontaneous Lipidosis in NASH specific hepatocytes (FIG. 27). This result showcases a measurable phenotype for modeling Fatty Liver phenotypes using iPSC derived Hepatocytes. This feature can be supplemented with other in vitro NASH specific assays for drug development and screening applications.

Figure 28B:
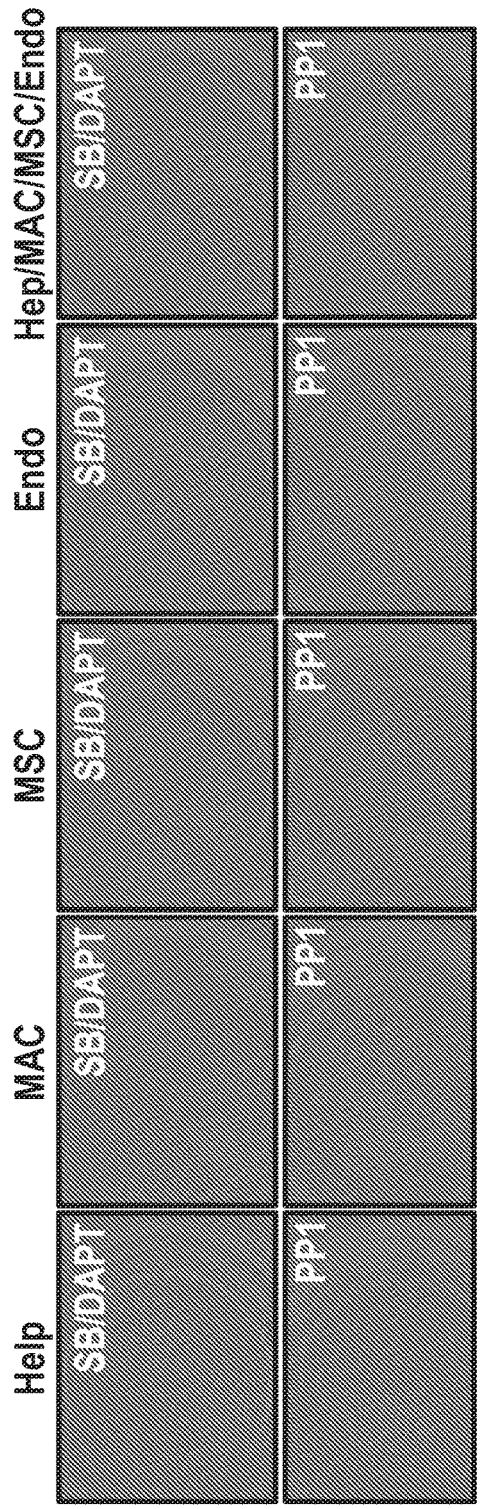
Figure 28C:
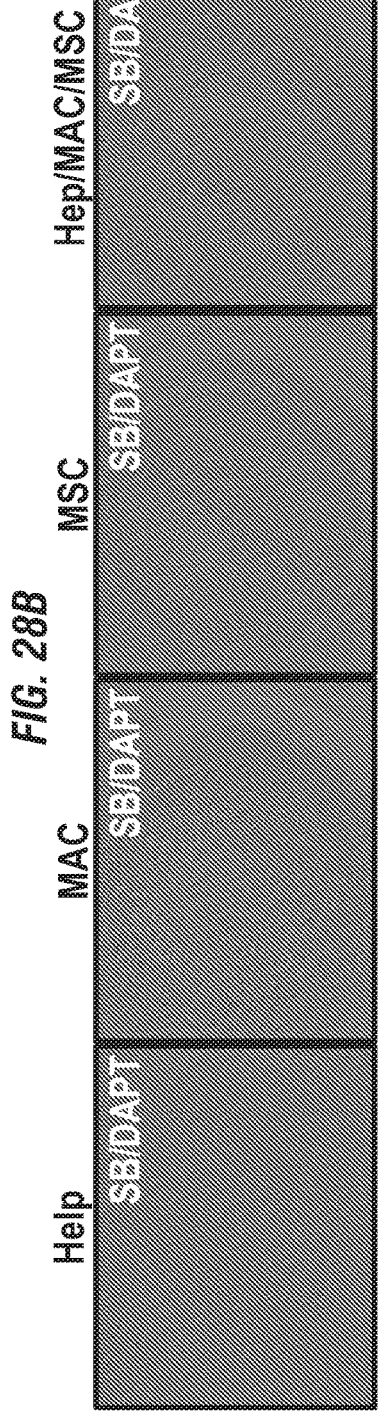
Figure 28D:
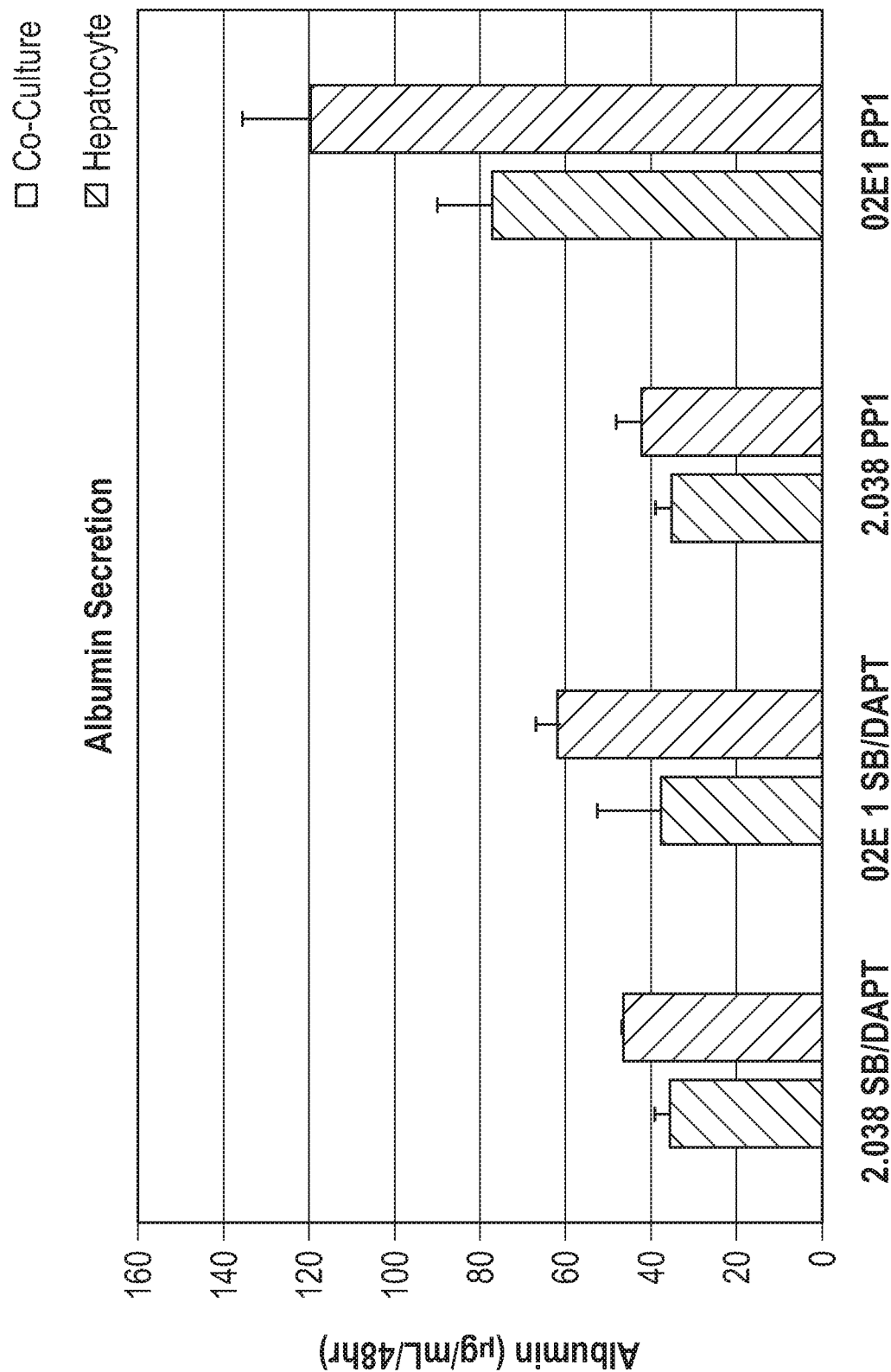

Co-culture of end stage hepatocytes derived from normal and NASH specific iPSCs can be paired with mesenchymal stem cells, isogenic macrophages, isogenic endothelial cells to develop 3D liver organoids (FIG. 28 A-C).

3D co-cultures of hepatocytes along with ancillary cell types can be used to enhance maturation and function of hepatocytes (FIG. 28D), disease modelling for fibrosis, Omics based analysis and high throughput screening applications and for drug development for NASH.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Arcila et al., *Clin Cancer Res* 18:4910-8, 2012.
Arcila et al., *Mol Cancer Ther* 12(2):220-229, 2013.
Austin-Ward and Villaseca, *Revista Medica de Chile*, 126 (7):838-845, 1998.

Ausubel et al., *Current Protocols in Molecular Biology,* John Wiley & amp; Sons, New York, N.Y., 2003.
Bose et al., Cancer Discov 2013; 3:224-37.
Bukowski et al., *Clinical Cancer Res.,* 4(10):2337-2347, 1998.
Camacho et al. *J Clin Oncology* 22(145): Abstract No. 2505 (antibody CP-675206), 2004.
Cai et al, *Methods Mol Biol* 997:141-7, 2013.
Cha et al. *Int J Cancer* 130:2445-54, 2012.
Chee et al., *Science,* 274:610-614, 1996.
Chen et al., *Hepatology.* 55(4): 1193-1203, 2012.
Cho et al., *Cancer Res* 73:6770-9, 2013.
Christodoulides et al., *Microbiology,* 144(Pt 11):3027-3037, 1998.
Church and Gilbert, *Proc. Natl. Acad. Sci. USA* 81:1991-1995 (1988).
Cotton et al., *Proc. Natl. Acad. Sci. USA* 85:4397-4401 (1985).
Davidson et al., *J. Immunother.,* 21(5):389-398, 1998.
Davies et al., *Plos One* 8, 2013.
Del Tito et al., *Clinical Chemistry* 44:731-739, 1998.
Drmanac et al., *Nat. Biotechnol.,* 16:54-58, 1998.
Drmanac et al., *Science,* 260:1649-1652, 1993.
Flavell et al., *Cell* 15:25 (1978).
Fu et al., *Nat. Biotechnol.,* 16:381-384, 1998/
Geever et al., *Proc. Natl. Acad. Sci. USA* 78:5081 (1981).
Greulich et al., Proc Natl Acad Sci USA 2012; 109:14476-81.
Hainsworth et al., J Clin Oncol 2018; 36:536-42.
Hanibuchi et al., *Int. J. Cancer,* 78(4):480-485, 1998.
Hellstrand et al., *Acta Oncologica,* 37(4):347-353, 1998.
Hollander, *Front. Immun.,* 3:3, 2012.
Hong et al., *J Biol Chem* 282:19781-7, 2007.
Hui and Hashimoto, *Infection Immun.,* 66(11):5329-5336, 1998.
Hurwitz et al. *Proc Natl Acad Sci USA* 95(17): 10067-10071, 1998.
Hyman et al., *Nature* 2018; 554:189-94.
International Patent Publication No. WO 99/57318
International Patent Publication No. WO1995001994
International Patent Publication No. WO1998042752
International Patent Publication No. WO2000037504
International Patent Publication No. WO2001014424
International Patent Publication No. WO2009/101611
International Patent Publication No. WO2009/114335
International Patent Publication No. WO2010/027827
International Patent Publication No. WO2011/066342
International Patent Publication No. WO2015016718
International Patent Publication No. WO 00/37504
International Patent Publication No. WO01/14424
International Patent Publication No. WO98/42752
Kosaka et al., *Cancer Res* 2017.
Kris et al., Ann Oncol 2015; 26:1421-7.
Leal, M., *Ann N Y Acad Sci* 1321, 41-54, 2014.
Li et al., J Clin Oncol 2018; 36:2532-7.
Lynch et al., *N Engl J Med.* 350(21):2129-2139, 2004.
Maemondo et al., *N Engl J Med* 362:2380-8, 2010.
Mallanna and Duncan, *Curr Protoc Stem Cell Biol* 26, 2013.
Mazieres et al., J Clin Oncol 2015; 33.
Mitsudomi and Yatabe, *Cancer Sci.* 98(12):1817-1824, 2007.
Mokyr et al. *Cancer Res* 58:5301-5304, 1998.
Nagano et al., Clin Cancer Res 2018.
Oxnard et al., *J Thorac Oncol.* 8(2):179-184, 2013.
Paez et al., *Science* 304(5676):1497-1500, 2004.
Pao et al., *Proc Natl Acad Sci USA* 101(36):13306-13311, 2004.
Pardoll, *Nat Rev Cancer,* 12(4): 252-64, 2012.
Perera et al., *Proc Natl Acad Sci USA* 106:474-9, 2009.
Phillips et al., *J Comput Chem* 2005; 26:1781-802.
Qin et al., *Proc. Natl. Acad. Sci. USA,* 95(24):14411-14416, 1998.
Raca et al., *Genet Test* 8(4):387-94, 2004.
Ramasamy et al., *Tissue Eng Part A.* 19(3-4):360-7, 2013.
Robichaux et al., *Nat Med* 2018; 24:638-46.
Sanger et al., *Proc. Natl. Acad. Sci. USA* 74:5463-5467, 1977.
Sears et al., *Biotechniques,* 13:626-633, 1992.
Shan et al. *Nat Chem Biol.* 9(8): 514-520, 2013.
Sheffield et al., *Proc. Natl. Acad. Sci. USA* 86:232-236 (1989).
Shen et al., *J Recept Signal Transduct Res* 36:89-97, 2016.
Thress et al., *Nat Med* 21:560-2, 2015.
U.S. Pat. No. 4,870,287
U.S. Pat. No. 5,288,644
U.S. Pat. No. 5,739,169
U.S. Pat. No. 5,760,395
U.S. Pat. No. 5,801,005
U.S. Pat. No. 5,824,311
U.S. Pat. No. 5,830,880
U.S. Pat. No. 5,844,905
U.S. Pat. No. 5,846,945
U.S. Pat. No. 5,869,245
U.S. Pat. No. 5,885,796
U.S. Pat. No. 6,207,156
U.S. Pat. No. 8,008,449
U.S. Pat. No. 8,017,114
U.S. Pat. No. 8,119,129
U.S. Pat. No. 8,188,102
U.S. Pat. No. 8,329,867
U.S. Pat. No. 8,354,509
U.S. Pat. No. 8,735,553
U.S. Patent Publication No. 2004/0014095
U.S. Patent Publication No. 2005/0260186
U.S. Patent Publication No. 2006/0104968
U.S. Patent Publication No. 20110008369
U.S. Patent Publication No. 20130071452
U.S. Patent Publication No. 2014022021
U.S. Patent Publication No. 20140294898
Underhill et al., *Genome Res.* 7:996-1005 (1997).
Yang et al., *Int J Cancer* 2016.
Yasuda et al., *Sci Transl Med* 5(216):216ra177, 2013.
Zimmerman et al., *Methods Mol. Cell. Biol.,* 3:39-42, 1992.

What is claimed is:

1. A method for producing hepatocytes comprising:
   (a) culturing induced pluripotent stem cells (iPSCs) in the presence of a GSK3 inhibitor to provide pre-conditioned iPSCs;
   (b) differentiating the pre-conditioned iPSCs to definitive endoderm (DE) cells, wherein differentiating to DE cells comprises sequentially culturing the iPSCs in a first endoderm induction media (EIM) comprising Activin A, a second EIM comprising BMP4, VEGF, and bFGF, and a third EIM comprising VEGF and DMSO;
   (c) culturing the DE cells to induce formation of hepatoblasts; and
   (d) differentiating the hepatoblasts to hepatocytes by culturing the hepatoblasts in hepatocyte differentiation media (HDM) comprising a GSK3 inhibitor to produce the hepatocytes.

2. The method of claim 1, wherein the iPSCs are pre-conditioned for 1-3 days in step (a).

3. The method of claim 1, wherein the GSK3 inhibitor is CHIR99021, BIO, SB216763, CHIR98014, TWS119, SB415286, or Tideglusib.

4. The method of claim 1, wherein the iPSCs are pre-conditioned in media essentially free of ascorbic acid.

5. The method of claim 1, wherein one or more of steps (a)-(d) are performed under xeno-free conditions, feeder-free conditions, and/or conditioned-media free conditions.

6. The method of claim 1, wherein the DE cells are positive for CXCR4, CD117, FOXA1, FOXA2, EOMES, and/or HNF4α.

7. The method of claim 1, wherein step (c) comprises culturing DE cells in hepatocyte induction media (HIM) comprising HGF, BMP4, FGF10, FGF2, VEGF, EGF, dexamethasone, and/or DMSO.

8. The method of claim 1, wherein the method comprises forming aggregates after inducing hepatoblasts.

9. The method of claim 8, wherein steps (a) and (b) are essentially free of aggregates.

10. The method of claim 1, wherein the cells are cultured on an extracellular matrix.

11. The method of claim 10, wherein the extracellular matrix is basement membrane extract (BME) purified from murine Engelbreth-Holm-Swarm tumor.

12. The method of claim 10, wherein the extracellular matrix is collagen, or laminin.

13. The method of claim 1, wherein the hepatoblasts are digested prior to step (d).

14. The method of claim 1, wherein the hepatocyte differentiation media (HDM) comprises bFGF, HGF, oncostatin M, and DMSO.

15. The method of claim 1, wherein steps (a)-(c) are performed under hypoxic conditions.

16. The method of claim 1, wherein step (d) comprises culturing the cells under hypoxic conditions for a first differentiation period and under normoxic conditions for a second differentiation period.

17. The method of claim 1, further comprising culturing the hepatocytes in maturation media comprising dexamethasone and oncostatin M.

18. The method of claim 17, wherein the hepatocytes are cultured on collagen during maturation.

19. The method of claim 17, wherein the maturation media further comprises a SRC kinase inhibitor, EPO, a TGFβ inhibitor, a MEK inhibitor, a γ-secretase inhibitor, EPO, IGF1, IGF2, and/or TGFα.

20. The method of claim 1, further comprising selecting for CD133-positive cells.

21. The method of claim 1, wherein at least 70% of the mature hepatocytes are positive for alpha anti trypsin (AAT) and/or at least 60% of the mature hepatocytes are positive for albumin.

22. The method of claim 1, further comprising co-culturing the mature hepatocytes in the presence of mesenchymal stem cells (MSCs), macrophages, endothelial cells or MSC conditioned medium supplemented with one or more Src kinase inhibitors.

23. The method of claim 1, further comprising cryopreserving the mature hepatocytes as 3D aggregates.

24. A composition comprising hepatocyte cells, at least 90% positive for AAT and/or at least 80% positive for albumin.

25. A method of treating a subject with a liver disease comprising administering to the subject hepatocytes produced by the method of claim 1.

* * * * *